United States Patent
Yoshihara et al.

(10) Patent No.: US 8,719,524 B2
(45) Date of Patent: May 6, 2014

(54) STORAGE SYSTEM INCLUDING FLASH DRIVES FOR IMPROVING PERFORMANCE BY CONTROLLING DATA CACHING

(75) Inventors: Tomohiro Yoshihara, Yokohama (JP); Akira Deguchi, Yokohama (JP); Hiroaki Akutsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/264,942

(22) PCT Filed: Oct. 7, 2011

(86) PCT No.: PCT/JP2011/005649
§ 371 (c)(1),
(2), (4) Date: Oct. 17, 2011

(87) PCT Pub. No.: WO2013/051069
PCT Pub. Date: Apr. 11, 2013

(65) Prior Publication Data
US 2013/0091328 A1  Apr. 11, 2013

(51) Int. Cl.
*G06F 12/00* (2006.01)
(52) U.S. Cl.
USPC ............ 711/162; 711/114; 711/138; 711/147
(58) Field of Classification Search
USPC ...................... 707/999.201, 999.202; 711/162
See application file for complete search history.

(56) References Cited

U.S. PATENT DOCUMENTS

| 7,433,898 B1 | 10/2008 | Georgiev |
| 8,151,013 B2 * | 4/2012 | Serizawa et al. ................ 710/21 |
| 2006/0059301 A1 | 3/2006 | Sugino et al. |
| 2006/0155942 A1 | 7/2006 | Nashimoto et al. |
| 2008/0240434 A1 | 10/2008 | Kitamura |
| 2012/0246386 A1 * | 9/2012 | Akutsu et al. ................. 711/103 |

FOREIGN PATENT DOCUMENTS

WO  WO 2010/131373 A1  11/2010

OTHER PUBLICATIONS

PCT International Search Report and Written Opinion on application PCT/JP2011/005649 mailed Sep. 4, 2012; 12 pages.
USPTO Non-final Office Action on U.S. Appl. No. 13/675,658 dated Oct. 7, 2013; 8 pages.

* cited by examiner

*Primary Examiner* — Reginald Bragdon
*Assistant Examiner* — Mehdi Namazi
(74) *Attorney, Agent, or Firm* — Foley & Lardner LLP

(57) ABSTRACT

A storage system in an embodiment of this invention comprises a non-volatile storage area for storing write data from a host, a cache area capable of temporarily storing the write data before storing the write data in the non-volatile storage area, and a controller that determines whether to store the write data in the cache area or to store the write data in the non-volatile storage area without storing the write data in the cache area, and stores the write data in the determined area.

15 Claims, 53 Drawing Sheets

| VOLUME-BY-VOLUME PERFORMANCE BOOST FUNCTION ENABLEMENT TABLE ||
|---|---|
| 221 | 222 |
| LOGICAL VOLUME NO. | PERFORMANCE BOOST FUNCTION ENABLED FLAG |
| 1 | 1 |
| 2 | 0 |
| 3 | 0 |
| ... | ... |

| MEDIUM TYPE TABLE ||
|---|---|
| 231 | 232 |
| RAID GROUP NO. | MEDIUM TYPE |
| 1 | SSD |
| 2 | SATA |
| 3 | SAS |
| ... | ... |

| RAID LEVEL TABLE ||
|---|---|
| 241 | 242 |
| RAID GROUP NO. | RAID LEVEL |
| 1 | 5 |
| 2 | 6 |
| 3 | 1 |
| ... | ... |

Fig. 9

VOLUME-BY-VOLUME HIT RATE TABLE (250)

| LOGICAL VOLUME NO. (251) | HIT RATE [%] (252) | I/O COUNT (253) | HIT COUNT (254) | LOW HIT-RATE FLAG (255) |
|---|---|---|---|---|
| 1 | 1 | 135 | 2 | 1 |
| 2 | 20 | 355 | 40 | 0 |
| 3 | 80 | 1000 | 800 | 0 |
| ... | ... | | | ... |

Fig. 10

HIT RATE THRESHOLD TABLE (260)

| HIT RATE THRESHOLD [%] (261) |
|---|
| 5 |

Fig. 11

MP OPERATION RATE TABLE (270)

| MICROPROCESSOR NO. (271) | OPERATION RATE [%] (272) | OVERLOAD DETERMINATION FLAG (273) | OPERATION TIME [ms] (274) |
|---|---|---|---|
| 1 | 65 | 1 | 650 |
| 2 | 20 | 0 | 200 |
| ... | ... | | |

Fig. 12

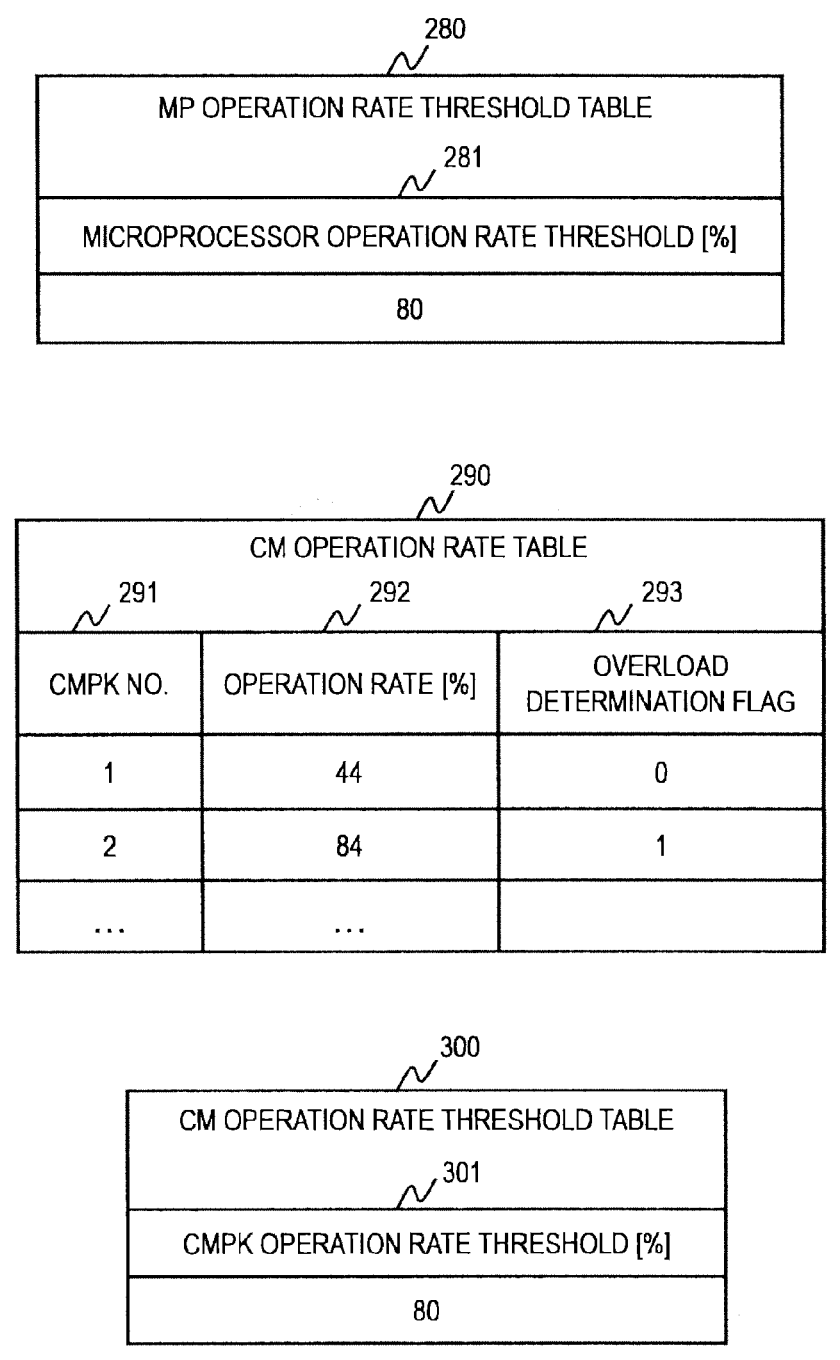

MP OPERATION RATE THRESHOLD TABLE (280)

| MICROPROCESSOR OPERATION RATE THRESHOLD [%] (281) |
|---|
| 80 |

Fig. 13

CM OPERATION RATE TABLE (290)

| CMPK NO. (291) | OPERATION RATE [%] (292) | OVERLOAD DETERMINATION FLAG (293) |
|---|---|---|
| 1 | 44 | 0 |
| 2 | 84 | 1 |
| ... | ... | |

Fig. 14

CM OPERATION RATE THRESHOLD TABLE (300)

| CMPK OPERATION RATE THRESHOLD [%] (301) |
|---|
| 80 |

Fig. 28

DYNAMIC MAPPING TABLE (520)

| POOL NO. (521) | VIRTUAL VOLUME NO. (522) | LOGICAL ADDRESS (523) | POOL VOLUME NO. (524) | LOGICAL ADDRESS (525) | MONITORING INFORMATION INDEX NO. (526) |
|---|---|---|---|---|---|
| 1 | 1 | 0x0000 | 204 | 0x0040 | 1 |
| 1 | 1 | 0x0010 | 201 | 0x0050 | 2 |
| 1 | 2 | 0x0000 | 203 | 0x0020 | 3 |
| 1 | 2 | 0x0030 | 202 | 0x0040 | 4 |
| 1 | 2 | 0x0020 | 201 | 0x0010 | 5 |

Fig. 29

PAGE-BY-PAGE MONITORING TABLE (530)

| MONITORING INFORMATION INDEX NO. (531) | I/O COUNTER (PRESENT) (32 bits) (532) | I/O COUNTER (LAST TIME) (32 bits) (533) |
|---|---|---|
| 1 | 1000 | 2000 |
| 2 | 613 | 12124 |
| 3 | 232 | 123 |
| 4 | 35 | 32 |
| 5 | 2 | 325 |

Fig. 30

PAGE-BY-PAGE MONITORING DIFFERENCE TABLE (320)

| MONITORING INFORMATION INDEX NO. (321) | I/O DIFFERENCE COUNTER (8 bits) (322) |
|---|---|
| 1 | 56 |
| 2 | 61 |
| 3 | 23 |
| 4 | 35 |
| 5 | 2 |

| LM ASYNCHRONOUS REMOTE COPY SEQUENCE NO. MANAGEMENT TABLE | | |
|---|---|---|
| 331 | 332 | 333 |
| JVOL NO. | SEQUENCE NO. | SEQUENCE NO. DIFFERENCE |
| 1 | 312 | 56 |
| 2 | 422 | 61 |
| 3 | 546 | 23 |
| 4 | 470 | 35 |
| ... | ... | |

| SM ASYNCHRONOUS REMOTE COPY SEQUENCE NUMBER MANAGEMENT TABLE | |
|---|---|
| 531 | 532 |
| JVOL NO. | SEQUENCE NO. |
| 1 | 256 |
| 2 | 361 |
| 3 | 523 |
| 4 | 435 |
| ... | ... |

Fig. 42

LM LOCAL COPY DIFFERENCE MANAGEMENT TABLE (340)

| VOLUME NO. (341) | LOGICAL ADDRESS (342) | BIT STRING REPRESENTING DIFFERENCE (343) |
|---|---|---|
| 1 | 0x0000 | 01101111 |
| 1 | 0x0008 | 00000000 |
| 1 | ... | ... |
| 1 | 0xffff | 00000000 |
| 2 | 0x0000 | 11110110 |
| ... | ... | ... |

Fig. 43

SM LOCAL COPY DIFFERENCE MANAGEMENT TABLE (560)

| VOLUME NO. (561) | LOGICAL ADDRESS (562) | BIT STRING REPRESENTING DIFFERENCE (563) |
|---|---|---|
| 1 | 0x0000 | 01101111 |
| 1 | 0x0008 | 00000000 |
| 1 | ... | ... |
| 1 | 0xffff | 00000000 |
| 2 | 0x0000 | 11110110 |
| ... | ... | ... |

Fig. 44

LM LOCAL COPY DIFFERENCE AREA THINNING-OUT OPERATION MANAGEMENT TABLE (350)

| VOLUME NO. (351) | LOGICAL ADDRESS (352) | BIT STRING REPRESENTING THINNING-OUT OPERATION (353) |
|---|---|---|
| 1 | 0x0000 | 01101111 |
| 1 | 0x0040 | 00000000 |
| 1 | ... | ... |
| 1 | 0xffff | 00000000 |
| 2 | 0x0000 | 11110110 |
| ... | ... | ... |

Fig. 45

SM LOCAL COPY DIFFERENCE AREA THINNING-OUT OPERATION MANAGEMENT TABLE (570)

| VOLUME NO. (571) | LOGICAL ADDRESS (572) | BIT STRING REPRESENTING THINNING-OUT OPERATION (573) |
|---|---|---|
| 1 | 0x0000 | 01101111 |
| 1 | 0x0040 | 00000000 |
| 1 | ... | ... |
| 1 | 0xffff | 00000000 |
| 2 | 0x0000 | 11110110 |
| ... | ... | ... |

Fig. 51

X PATH OPERATION RATE TABLE (360)

| X PATH NO. (361) | OPERATION RATE [%] (362) | OVERLOAD DETERMINATION FLAG (363) |
|---|---|---|
| 1 | 44 | 0 |
| 2 | 84 | 1 |
| ... | ... | |

Fig. 52

X PATH OPERATION RATE THRESHOLD TABLE (370)

| X PATH OPERATION RATE THRESHOLD [%] (371) |
|---|
| 80 |

Fig. 57

MP OPERATION RATE TABLE (380)

| MP NO. (381) | OPERATION RATE [%] (382) | OVERLOAD DETERMINATION FLAG ONE (383) | OVERLOAD DETERMINATION FLAG TWO (384) | OPERATION TIME [ms] (385) |
|---|---|---|---|---|
| 1 | 85 | 1 | 1 | 650 |
| 2 | 40 | 0 | 0 | 200 |
| 3 | 68 | 0 | 1 | 340 |
| ... | ... | | | |

Fig. 58

MP OPERATION RATE THRESHOLD TABLE (390)

| MP OPERATION RATE THRESHOLD ONE [%] (391) | MP OPERATION RATE THRESHOLD TWO [%] (392) |
|---|---|
| 80 | 60 |

Fig. 63

RESPONSE TABLE (410)

| TYPE (411) | RESPONSE TIME (412) |
|---|---|
| CMPK | 0.1ms |
| SSD | 1ms |
| SATA 7.2krpm | 10ms |
| SAS 15krpm | 5ms |
| ... | ... |

Fig. 64

CM USE THRESHOLD TABLE (420)

| RESPONSE IMPROVEMENT (421) |
|---|
| 0.8ms |

# STORAGE SYSTEM INCLUDING FLASH DRIVES FOR IMPROVING PERFORMANCE BY CONTROLLING DATA CACHING

TECHNICAL FIELD

This invention relates to a storage system and, in particular, relates to control of a storage system.

BACKGROUND ART

PCT International Publication No. WO 2010/131373 (Patent Literature 1) discloses a technique that each processor in charge of I/O of a volume caches control information on data caching in a shared memory to a local memory (control caching) to improve performance of a storage system.

When updating control information in a local memory, a processor synchronously updates the control information in the shared memory. This operation allows another processor that takes over the assignment of the processor at some failure to acquire the latest data caching control information from the shared memory, preventing performance degradation in the storage system because of a lowered cache hit rate.

In addition to this, data caching, which caches user data from a non-volatile storage medium to a cache memory to improve the performance of a storage system, is widely applied to storage systems.

CITATION LIST

Patent Literature

PTL 1: WO 2010/131373 A

SUMMARY OF INVENTION

Technical Problem

In the meanwhile, such updating control information in the shared memory for the purpose of improvement in performance increases overhead between the shared memory of the access target and the processor that controls the accesses. Data caching for the purpose of improvement in performance increases overhead between the shared memory of the access target and the processor that controls the accesses.

Solution to Problem

A storage system of an aspect of the present invention comprises a plurality of processors in charge of different pieces of control information, local memories allocated to the plurality of processors one by one, the local memories each holding control information assigned to the allocated processor, and a shared memory accessible from the plurality of processors, the shared memory holding control information assigned to a first processor of the plurality of processors. The first processor updates the control information in a first local memory allocated to the first processor. The first processor determines whether to reflect the update of the control information in the first local memory to the control information in the shared memory. The first processor reflects the update of the control information in the first local memory determined to be reflected to the control information in the shared memory to the control information in the shared memory.

Advantageous Effects of Invention

An aspect of this invention achieves low overhead in a storage system to improve the performance of the storage system.

BRIEF DESCRIPTION OF DRAWINGS

FIG. 6 is a drawing illustrating an example of a volume-by-volume performance boost function enablement table in the first embodiment.

FIG. 7 is a drawing illustrating an example of a medium type table in the first embodiment.

FIG. 8 is a drawing illustrating an example of a RAID level table in the first embodiment.

FIG. 9 is a drawing illustrating an example of a volume-by-volume hit rate table in the first embodiment.

FIG. 10 is a drawing illustrating an example of a hit rate threshold table in the first embodiment.

FIG. 11 is a drawing illustrating an example of a MP operation rate table in the first embodiment.

FIG. 12 is a drawing illustrating an example of a MP operation rate threshold table in the first embodiment.

FIG. 13 is a drawing illustrating an example of a CM operation rate table in the first embodiment.

FIG. 14 is a drawing illustrating an example of a CM operation rate threshold table in the first embodiment.

FIG. 28 is a drawing illustrating an example of a dynamic mapping table in the second embodiment.

FIG. 29 is a drawing illustrating an example of a page-by-page monitoring table in the second embodiment.

FIG. 30 is a drawing illustrating an example of a page-by-page monitoring difference table in the second embodiment.

FIG. 36 is a drawing illustrating an example of a LM asynchronous remote copy sequence number management table in the third embodiment.

FIG. 37 is a drawing illustrating an example of a SM asynchronous remote copy sequence number management table in the third embodiment.

FIG. 42 is a drawing illustrating a LM local copy difference management table in the fourth embodiment.

FIG. 43 is a drawing illustrating a SM local copy difference management table in the fourth embodiment.

FIG. 44 is a drawing illustrating a LM local copy difference area thinning-out operation management table in the fourth embodiment.

FIG. 45 is a drawing illustrating a SM local copy difference area thinning-out operation management table in the fourth embodiment.

FIG. 51 is a drawing illustrating an example of an X path operation rate table in the fifth embodiment.

FIG. 52 is a drawing illustrating an example of an X path operation rate threshold table in the fifth embodiment.

FIG. 57 is a drawing illustrating an example of a MP operation rate table in the sixth embodiment.

FIG. 58 is a drawing illustrating an example of a MP operation rate threshold table in the sixth embodiment.

FIG. 63 is a drawing illustrating an example of a response table in the seventh embodiment.

FIG. 64 is a drawing illustrating an example of a CM use threshold table in the seventh embodiment.

DESCRIPTION OF EMBODIMENTS

This invention relates to a technique to improve the performance of a storage system. Hereinafter, preferred embodiments of this invention will be described with reference to the accompanying drawings. For clarity of explanation, the following descriptions and the accompanying drawings contain omissions and simplifications as appropriate and repetitive explanations are omitted if not necessary. The embodiments are merely examples for embodying this invention and are not to limit the technical scope of this invention.

First Embodiment

A storage system in this embodiment includes multiple processors each of which takes charge of input and output (I/O) to and from a different volume. Each processor is allocated a local memory. The storage system in this embodiment includes a shared memory accessible by a plurality of processors in charge of different volumes. The local memories and the shared memory are typically volatile semiconductor memories.

Data caching control information for a volume assigned to a processor is held in the local memory for the processor (control data caching). Moreover, the shared memory stores data caching control information for the volume.

The processor refers to and updates the caching control information in the local memory to control the data caching for the assigned volume, which achieves speedier processing in the data caching control.

As described, the shared memory can be accessed by a plurality of processors each in charge of different volumes. If a failure occurs to a processor in charge of any one of the volumes, a different processor takes over the assignment and loads the relevant data caching control information from the shared memory to its own local memory. The different processor uses the data caching control information obtained from the shared memory to control the data caching of the taken-over volume.

In this embodiment, a processor determines whether to reflect update of caching control information in the local memory to the control information in the shared memory based on predetermined conditions. Reflecting only essential update of control information in the local memory to the control information in the shared memory achieves lower overhead in communication between the processor and the shared memory, resulting in improvement in the performance of the storage system.

The storage system in this embodiment further determines whether to cache read data and write data based on predetermined conditions. Selective caching of read data and write data achieves efficient use of a cache area and lower overhead on the cache memory and the processor to perform data caching, resulting in improvement in the performance of the storage system.

Figure 1:
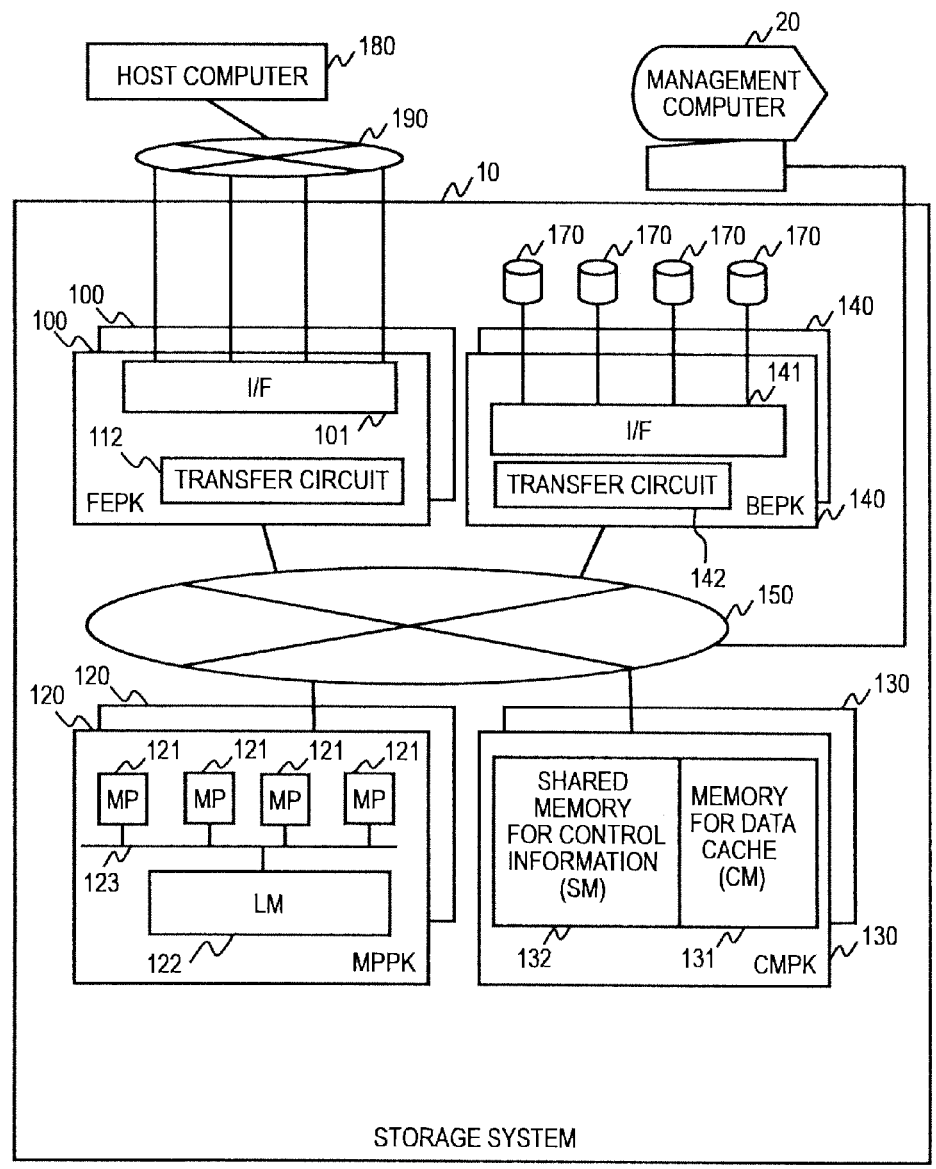
FIG. 1 is a block diagram schematically illustrating a configuration of an overall computer system in the first embodiment.

Hereinafter, this embodiment will be specifically described with reference to FIGS. 1 to 25. FIG. 1 illustrates an example of a computer system including a storage system 10 of this embodiment, a host computer 180 for processing data and computing, and a management computer 20 for managing the storage system 10. The computer system can include a plurality of host computers 180.

The storage system 10 and the host computer 180 are connected to each other via a data network 190. The data network 190 is, for example, a storage area network (SAN). The data network 190 may be an IP network or any other kind of network for data communication.

The storage system 10, the host computer 180, and the management computer 20 are interconnected via a management network (not shown). The management network is, for example, an IP network. The management network may be a SAN or any other kind of network. The data network 190 and the management network may be the same network.

The storage system 10 accommodates multiple storage drives 170. The storage drives 170 include hard disk drives (HDDs) having non-volatile magnetic disks and solid state drives (SSDs) having non-volatile semiconductor memories (such as flash memories). The storage drives 170 store data (user data) transmitted from the host computer 180. A plurality of storage drives 170 achieve redundancy of data using RAID computing, so that data loss at a failure in a storage drive 170 can be prevented.

The storage system 10 includes a front end package (FEPK) 100 for connecting to the host computer 180, a back-end package (BEPK) 140 for connecting to the storage drives 170, a cache memory package (CMPK) 130 for mounting a cache memory, and a microprocessor package (MPPK) 120 for mounting microprocessors that perform internal processing, and an internal network 150 for interconnecting them. As shown in FIG. 1, the storage system 10 of this example includes a plurality of FEPKs 100, a plurality of BEPKs 140, a plurality of CMPKs 130, and a plurality of MPPKs 120.

Each FEPK 100 includes an interface 101 for connecting to the host computer 180 and a transfer circuit 112 for transferring data in the storage system 10 on a board. The interface 101 can include a plurality of ports; each port can connect to a host computer. The interface 101 converts a protocol used in communication between a host computer and the storage system 10, such as Fibre Channel over Ethernet (FCoE), into a protocol used in the internal network 150, such as PCI-Express.

Each BEPK 140 includes an interface 141 for connecting to drives 170 and a transfer circuit 142 for transferring data in the storage system 10 on a board. The interface 141 can include a plurality of ports; each port can connect to a drive 170. The interface 141 converts a protocol used in communication with the storage drives 170, such as FC, into a protocol used in the internal network 150.

Each CMPK 130 includes a cache memory (CM) 131 for temporarily storing user data read from or written to the host computer 180 and a shared memory (SM) 132 for storing control information handled by one or more MPPKs 120 on a board. (Microprocessors in) a plurality of MPPKs 120 in charge of different volumes can access the shared memory 132. Data or programs used by an MPPK 120 are loaded from a non-volatile memory (not shown) in the storage system 10 or storage drives 170. The cache memory 131 and the shared memory 132 associated with each other may be mounted on separate boards (packages).

Each MPPK 120 includes one or more microprocessors 121, a local memory (LM) 122, and a bus 123 for connecting them. This example includes a plurality of microprocessors 121. The number of microprocessors 121 may be one. A plurality of microprocessors 121 can be regarded as one processor. The local memory 122 stores programs executed by the microprocessors 121 and control information used by the microprocessors 121.

As described above, a shared memory 132 stores control information to be handled by one or more MPPKs 120. An MPPK 120 stores control information it requires to its own local memory 122 (control caching). The control information stored in the local memory 122 enhances the speed of accesses from the microprocessors 121 to control information, achieving improvement in the performance of the storage system 10.

A microprocessor 121 updates the control information in the local memory 122, and it reflects the update to the control information in the shared memory 132 as necessary. One of the features of this embodiment is this control of update. If predetermined conditions are satisfied, the microprocessor 121 reflects the update of the control information in the local memory 122 to the control information in the shared memory 132.

In this configuration example, the microprocessors 121 in an MPPK 120 take charge of volumes which are provided by the storage system 10 to the host computer 180. The local memory 122 and the shared memory 132 allocated to the microprocessors 121 store data caching control information for the volumes on which the microprocessors are in charge of I/O.

The control information this invention can be applied is any control information with which a MP failure will not lead to host data loss even if the control information in the shared memory 132 is not updated. Examples of such control information other than the data caching control information in this embodiment will be explained in the other embodiments. This embodiment describes an example where the microprocessors are assigned volumes but the objects assigned to the microprocessors are not limited to volumes. The microprocessors may be provided with assignments of control information.

Figure 2:
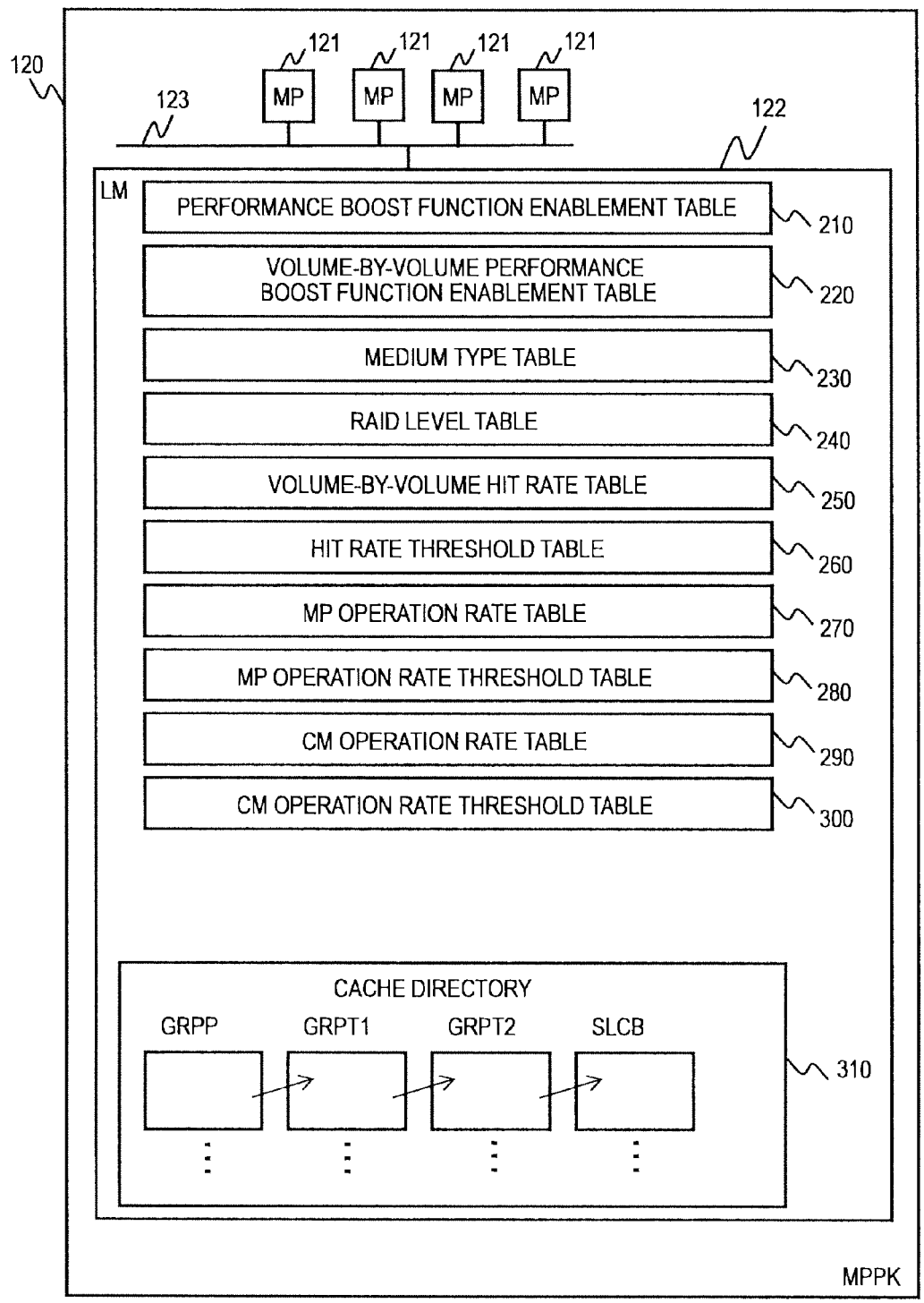
FIG. 2 is a drawing illustrating information held in a local memory in a storage system in the first embodiment.

FIG. 2 is a block diagram illustrating information held in each local memory 122. The local memory 122 stores a performance boost function enablement table 210, a volume-by-volume performance boost function enablement table 220, a medium type table 230, a RAID level table 240, a volume-by-volume hit rate table 250, a hit rate threshold table 260, and a microprocessor (MP) operation rate table 270.

The local memory 122 further includes a microprocessor (MP) operation rate threshold table 280, a cache memory (CM) operation rate table 290, and a cache memory (CM) operation rate threshold table 300. For example, a microprocessor 121 obtains at least a part of these tables from a storage drive 170 or any other non-volatile storage area in the storage system 10 and stores them in the local memory 122, and newly creates some other tables. Details of these tables will be explained later.

Figure 3:
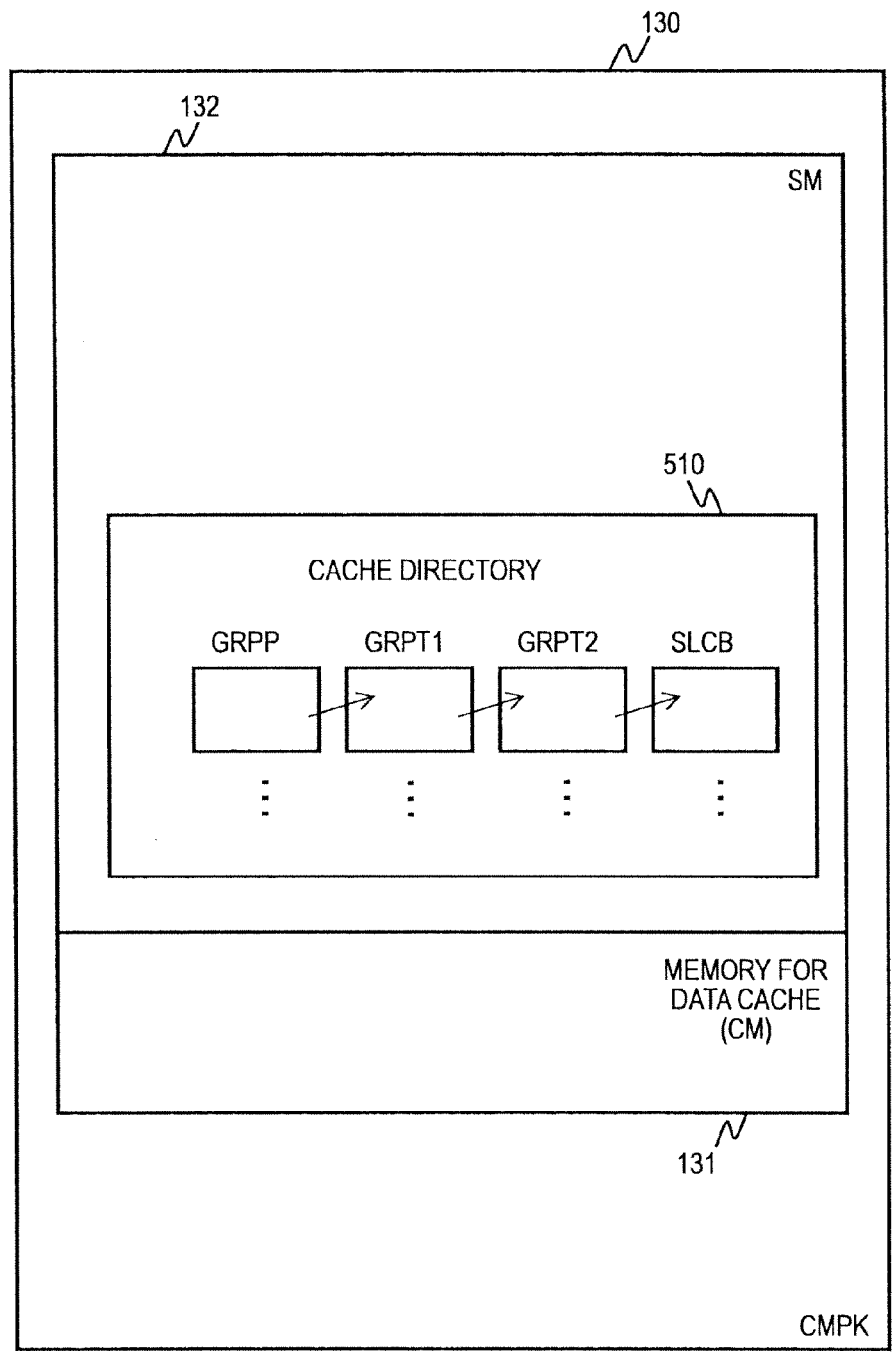
FIG. 3 is a drawing illustrating information held in a shared memory in the storage system in the first embodiment.

The local memory 122 further holds a cache directory 310. FIG. 3 is a block diagram illustrating a cache directory 510 in the shared memory 132. A microprocessor 121 caches the cache directory 510 from the shared memory 132 to its own local memory 122 and reflects update of the cache directory 310 in the local memory 122 to the cache directory 510 in the shared memory 132 as necessary. The cache directory 510 is backup data of the cache directory 310.

Upon receipt of a read command from the host computer 180, the microprocessor 121 refers to the cache directory 310 in its local memory 122 to determine whether the object data are in the cache memory 131 (cache hit). The cache directory 310 provides information to search cache data held in the cache memory 131.

The cache directory 310 consists of reference tables GRPP (GRouP Pointer), GRPT (GRouP Table)1, and GRPT2 and a slot control block (SLCB) as a management table. The reference tables GRPP, GRPT1, and GRPT2 are tables to be referred to by the microprocessor 121 to search for a cache segment and have directory structures. The reference table GRPP is at the highest level and the reference table GRPT2 is at the lowest level. A higher-level table includes pointers to the next-level table. The GRPT2 includes pointers to the SLCB.

The SLCB is a table for managing control information on segments, which are the smallest units in cache management, and holds information on whether data specified by a read command is in the cache memory 131, information on the addresses of cache data in the cache memory 131, and the like.

One or more segments can be associated with a slot. For example, one segment can store 64 KB of data. The smallest unit in cache management is a segment but the cache may be managed in units of slots. Typically, transition between the states of dirty data (a state before being written to a physical disk) and clean data (a state after being written to a physical disk) is performed in units of slots. Reserving and releasing a cache area is performed in units of slots or segments.

Upon receipt of a read access from the host computer 180, the microprocessor 121 sequentially searches the tables with the logical block address (LBA) included in the access to ascertain whether the requested data is in the cache memory 131, and further, the address of the data, if it is.

If the requested data is in the cache memory 131, the microprocessor 121 transmits the data to the host computer 180. If the requested data is not in the cache memory 131, the microprocessor 121 retrieves the data requested by the host computer 180 from the storage drive 170 and stores it in one or more slots in the cache area. Write data is cached in the similar way. It should be noted that searching cache data using a cache directory is a widely known technique; detailed explanation is omitted in this description.

Figure 4:
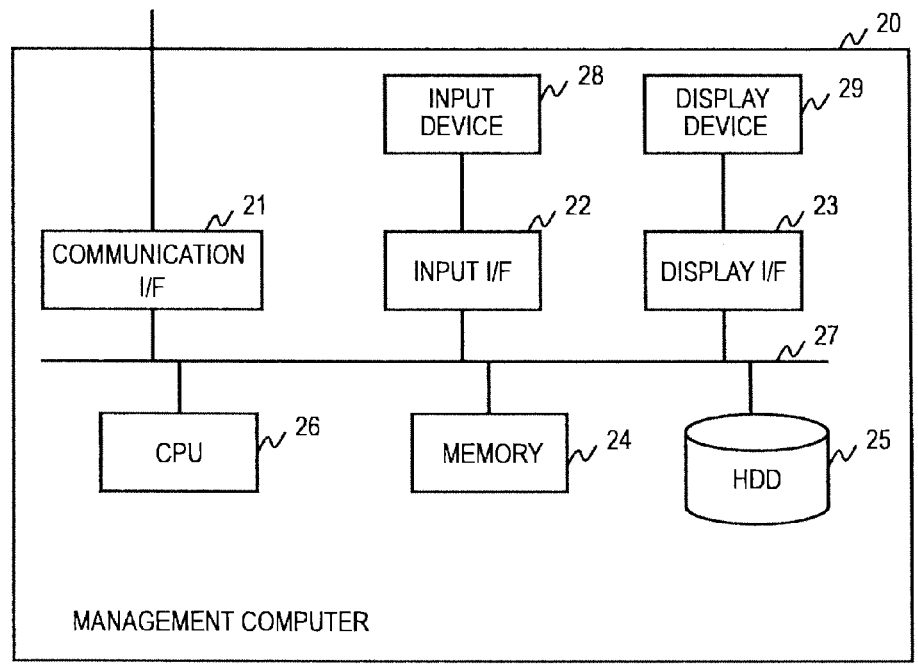
FIG. 4 is a drawing schematically illustrating a configuration of a management computer in the first embodiment.

FIG. 4 is a block diagram schematically illustrating a configuration of the management computer 20. The management computer 20 includes an input interface 22, an input device 28, a display interface 23, a display device 29, a CPU 26, a communication interface 21, a memory 24, and an HDD 25. Typical examples of the input device 28 are a keyboard and a pointer device but the input device 28 may be a different device. The display device 29 is typically a liquid display device.

An administrator (user) inputs necessary data with the input device 28 while checking results of processing by sight with the display device 29. The information to be inputted by the administrator and an example shown by the display device 29 will be described later. In the computer system in FIG. 1, the management system is configured with one management computer 20, but the management system may include a management console in addition to the management computer 20. The management console includes an input device and a display device and connects to the management computer 20 via a network.

The administrator accesses the management computer 20 from the management console and instructs the management computer 20 to perform processing. Furthermore, the administrator obtains the result of the processing of the management computer 20 to show it at the management console. The management system may include a plurality of computers each having a part or all of the functions of the management computer 20. The CPU 26 is a processor for executing programs stored in the memory 24. The communication I/F 21 is an interface with the management network, and transmits and receives data and control commands to and from the host computer 180 and the storage system 10 for system management.

Figure 5:
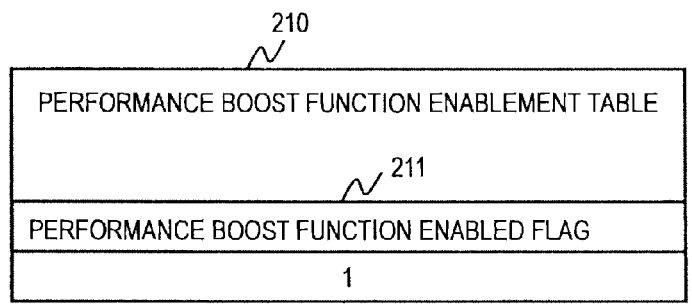
FIG. 5 is a drawing illustrating an example of a performance boost function enablement table in the first embodiment.

FIG. 5 exemplifies a configuration of the performance boost function enablement table 210. The performance boost function enablement table 210 has a column of performance boost function enabled flag 211. The performance boost function enabled flag indicates whether the performance boost function for the overall storage system 10 is active or not. If this flag is 1, the performance boost function for the overall storage system 10 is active.

In this embodiment, the performance boost function is a function to control reflection (backup) of update of control information stored in a local memory 122 to a shared memory 132 and to control data caching. This function will be described later. The data for the performance boost function enablement table 210 is set, for example, from the management computer 20 by the administrator.

FIG. 6 exemplifies a configuration of the volume-by-volume performance boost function enablement table 220. The volume-by-volume performance boost function enablement table 220 manages the performance boost function in each volume. The volume-by-volume performance boost function enablement table 220 has columns of logical volume numbers 221 and performance boost function enabled flags 222. The logical volume numbers are the identifiers of logical volumes.

The value 1 of a performance boost function enabled flag means that the performance boost function for the volume is active. If the performance boost function enabled flags for both of the overall system and the volume are ON (1), the performance boost function for the volume is enabled. Such volume-by-volume management and control of the performance boost function allow control depending on the volume characteristics. The data for the volume-by-volume performance boost function enablement table 220 are set, for example, from the management computer 20 by the administrator.

FIG. 7 exemplifies a configuration of the medium type table 230. The medium type table 230 manages the medium types of RAID groups. In this embodiment, a constituent including storage areas provided by one or more storage drives 170 and an interface for the drives is called a medium. The medium type table 230 includes columns of RAID group numbers 231 and medium types 232.

The RAID group numbers are identifiers for uniquely identifying RAID groups. It should be noted that, in this description, identifiers, names, and IDs may be used as identification information for identifying objects; they are replaceable with one another. The data in the medium type table 230 are set, for example, from the management computer 20 by the administrator.

FIG. 8 exemplifies a configuration of the RAID level table 240. The RAID level table 240 manages RAID levels of the RAID groups. The table 240 includes columns of RAID group numbers 241 and RAID levels 242. The data in the RAID level table 240 are set, for example, from the management computer 20 by the administrator.

FIG. 9 exemplifies a configuration of the volume-by-volume hit rate table 250. The volume-by-volume hit rate table 250 manages cache hit rates on individual volumes. The volume-by-volume hit rate table 250 includes columns of logical volume numbers 251, hit rates 252, I/O counts 253, hit counts 254, and low hit-rate flags 255.

The I/O counts are the numbers of read commands issued to the individual logical volumes. The hit counts are the numbers of read commands that result in cache hit. The value 1 of a low hit-rate flag means that the hit rate on the entry is lower than a predetermined threshold. A microprocessor 121 counts read accesses to individual volumes and cache hits, and updates the data in the fields in the volume-by-volume hit rate table 250.

The microprocessor 121 may monitor the hit rates in units of those smaller than logical volumes. For example, pages, which are used in a virtual volume function or a tiering function, may be used as units in monitoring the hit rates.

Calculation of hit rates may include hit rates in write cache in addition to hit rates in read cache. The microprocessor 121 may manage the hit rates in read cache and the hit rates in write cache separately. The hit rate in write cache [%] can be calculated by 100*(1−the number of writes to storage drives/the write command I/O count). For example, in later-described read caching control and write caching control, the microprocessor 121 refers to the respective hit rates.

FIG. 10 exemplifies a configuration of the hit rate threshold table 260. The hit rate threshold table 260 includes a column of hit rate threshold 261. If a hit rate on a volume is equal to or lower than the threshold registered in this column, the low hit-rate flag for the entry in the volume-by-volume hit rate table 250 is set at 1 (ON flag). The hit rate threshold is set, for example, from the management computer 20 by the administrator.

FIG. 11 exemplifies a configuration of the MP operation rate table 270 to manage operation rates of the microprocessors 121. A MP operation rate is a processing time of a microprocessor 121 per unit time and represents a load to the microprocessor. The MP operation rate table 270 includes columns of microprocessor numbers 271, operation rates 272, overload determination flags 273, and operation times 274. The microprocessor numbers are to uniquely identify the microprocessors in the storage system 10.

Each microprocessor 121 monitors its own operation conditions and stores values of the operation rate and the operation time in the respective fields of the own entry in the columns of the usages rates 272 and operation times 274. The operation time is an operation time per unit time (one second in this example). An operation rate is a value obtained by dividing the operation time by the unit time. The microprocessor 121 compares its own operation rate with a predetermined threshold and if the operation rate is equal to or higher than the threshold, it sets the value in the field of the overload determination flag of the own entry at 1 (ON flag).

FIG. 12 exemplifies a configuration of the MP operation rate threshold table 280 having a column 281 for storing a value of the above-mentioned threshold. In this example, the MP operation rate threshold is common to all the microprocessors, but different threshold values may be used among the microprocessors.

FIG. 13 exemplifies a configuration of the CM operation rate table 290 to manage operation rates of cache memories. A CM operation rate is an access time to a cache memory 131 per unit time. The CM operation rate table 290 includes columns of CMPK numbers 291, operation rates 292, and overload determination flags 293. The CMPK numbers are the identifiers of the CMPKs in the storage system 10.

A microprocessor 121 obtains a value of the operation rate from the controller in each CMPK 130 and stores it to the relevant field in the column of operation rates 292. The microprocessor 121 compares the obtained value of the operation rate with a predetermined threshold and if the value of the operation rate is equal to or higher than the threshold, it sets the value in the field of the overload determination flag of the entry at 1 (ON flag).

FIG. 14 exemplifies a configuration of the CM operation rate threshold table 300 to store a value of the above-mentioned threshold. In this example, the CM operation rate threshold is common to all the CMPKs, but different threshold values may be used among the CMPKs.

With reference to the flowchart of FIG. 15, processing of a read command which the storage system 10 receives from the host computer 180 will be explained. A microprocessor 121 which receives a read command from the host computer 180 (S101) determines whether it has a right to access the logical volume (also referred to as LDEV) designated by the read command (S102). If it does not have the right to access (NO at S102), the microprocessor 121 transfers the read command to the MPPK 120 that has a right to access (S103).

If the microprocessor 121 has the right to access (YES at S102), the microprocessor 121 searches the cache directory 310 in the local memory 122 of the same MPPK 120 (S104). If it finds the address (data) designated by the read command (YES at S105), the microprocessor 121 retrieves the read data from the cache memory 131 in accordance with the information in the cache directory 310 and transmits them to the host computer 180 (S106).

If the microprocessor 121 cannot find the address (data) designated by the read command (cache miss) (NO at S105), the microprocessor 121 checks an uncached flag for the local memory 122 (S107). The uncached flag is a flag to indicate whether all the data in the cache directory 510 in the shared memory 132 have been cached to the local memory 122 and is held in the local memory 122. If a part of the data have not been loaded, the value is ON. For example, if control data have not been loaded from the shared memory 132 to the local memory 122 as a failover has just occurred, the uncached flag is ON.

If the uncached flag is ON (YES at S107), a part of the data in the cache directory 510 in the shared memory 132 have not been cached. The microprocessor 121 transfers the cache directory (control information) from the shared memory 132 to the local memory 122 via the controller of the CMPK 130 (S108).

The microprocessor 121 searches the cache directory 310 in the local memory 122 (S109). If it finds the data designated by the read command (YES at S110), the microprocessor 121 retrieves the read data from the cache memory 131 in accordance with the information in the cache directory 310 and transmits them to the host computer 180 (S111).

In the case of a cache miss (NO at S110) or if the uncached flag is OFF (NO at S107), the microprocessor 121 allocates segments in the cache memory 131 as a slot for the read data and further, updates the cache directory 310 in the local memory 122 (S112).

The microprocessor 121 determines whether to reflect the update of the cache directory 310, which is control information on data caching, to the data 510 in the shared memory 132 (S113). The specific method of this determination will be described later in detail. If it determines to update the control information in the shared memory 132 (YES at S114), the microprocessor 121 updates the cache directory 510 in the shared memory 132 (S115) and proceeds to the next step S116.

If the microprocessor 121 determines not to update the control information in the shared memory 132 (NO at S114), it proceeds to step S116 without updating the control information in the shared memory 132. At step S116, the microprocessor 121 determines whether to cache the read data (host data). The method of this determination will be described later.

If the microprocessor 121 determines that it stores the read data in the cache memory 131 and then transmits them to the host computer 180 (YES at S117), the microprocessor 121 retrieves the read data from a storage drive 170 (persistent medium) with the BEPK 140 and the CMPK 130 and stores them in the allocated segments in the cache memory 131. Thereafter, the microprocessor 121 transmits the cache data to the host computer 180 with the CMPK 130 and the FEPK 100 (S118).

If it determines to transmit the read data to the host computer 180 without caching (NO at S117), the microprocessor 121 transfers the read data retrieved from the drive 170 (persistent medium) to the host computer 180 with the BEPK 140 and the FEPK 100 not through the CMPK 130 (S119). It is efficient to manage segments such that segments for data bypassing the cache memory 131 are more likely to be reused than segments for data passing through the cache memory 131. An example is, if LRU queue management is performed, to connect them to a LRU queue.

Figure 15:
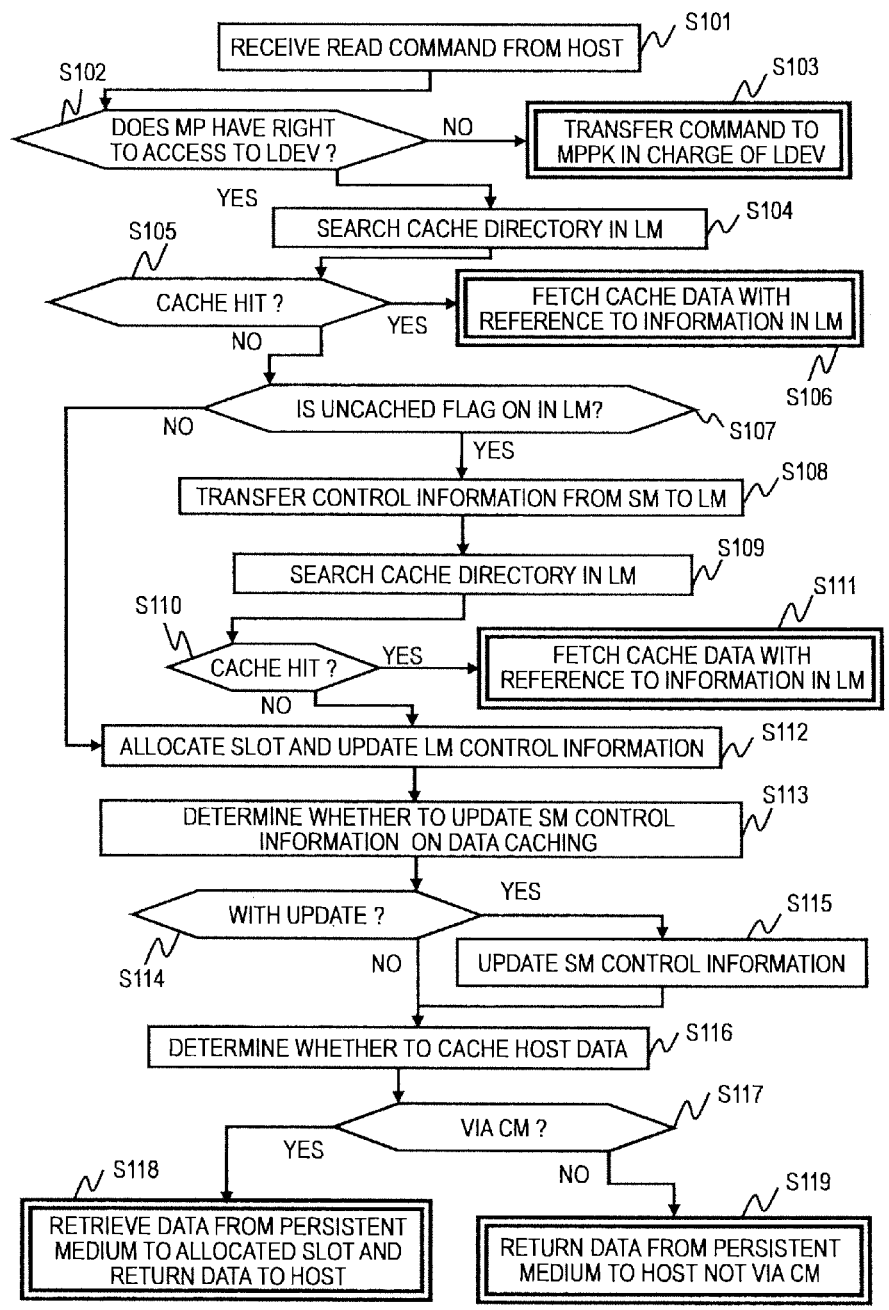
FIG. 15 is a flowchart of processing a read command from the host in the first embodiment.
Figure 16:
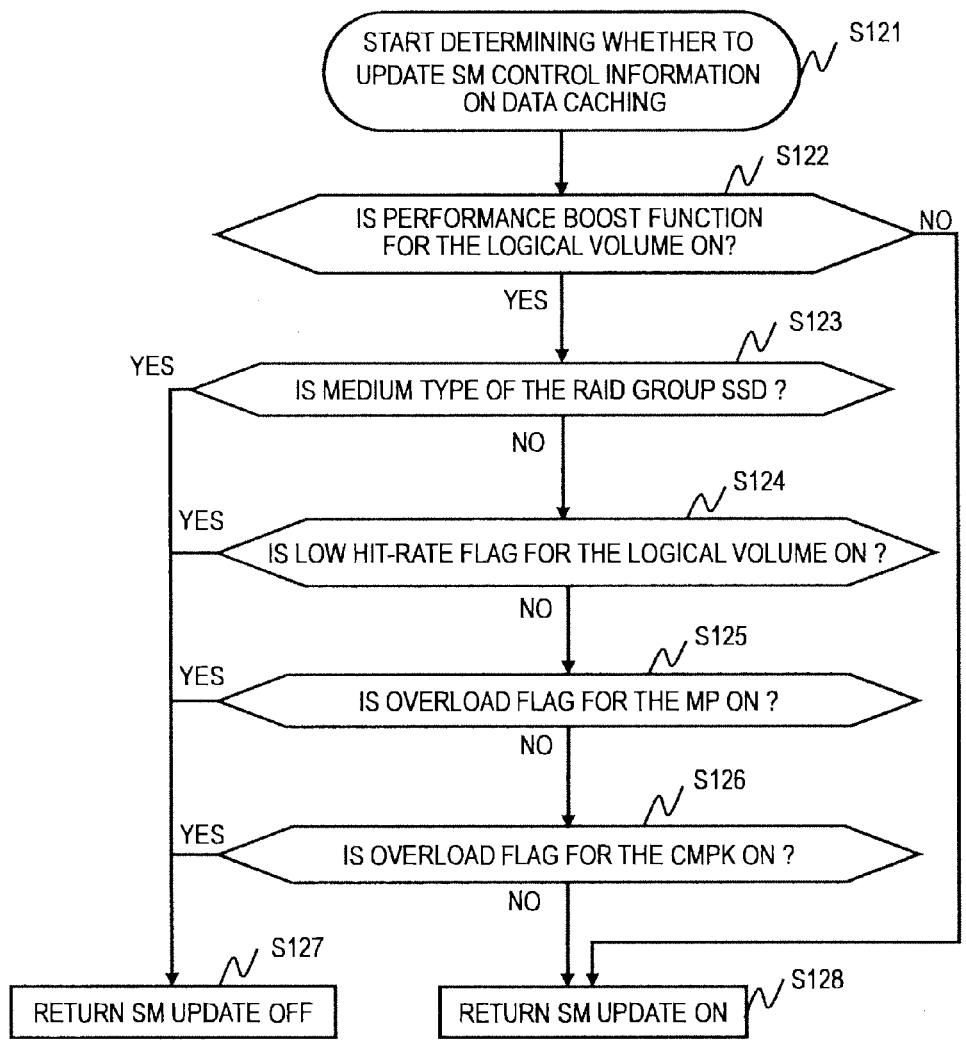
FIG. 16 is a flowchart of determining whether to update SM control information on data caching in the first embodiment.

With reference to FIG. 16, the determining whether to update the data caching control information in the shared memory 132 (S113) in the flowchart of FIG. 15 will be explained. The microprocessor 121 starts this step S113 (S121) and determines whether the performance boost function for the logical volume designated by the read command is ON with reference to the performance boost function enablement table 210 and the volume-by-volume performance boost function enablement table 220 (S122). If either one of the tables indicates that the performance boost function is OFF, the performance boost function for the volume is OFF.

If the performance boost function for the logical volume is not ON (NO at S122), the microprocessor 121 determines to update the control information (cache directory) in the shared memory 132 (S128). If the performance boost function for the logical volume is ON (YES at S122), the microprocessor 121 refers to the medium type table 230 with a key of the RAID group number to determine whether the medium type of the RAID group holding the designated data is SSD (S123).

The microprocessor 121 has configuration management information on volumes in the local memory 122 and can ascertain to which RAID group each area in the volumes belongs to with reference to the information.

If the medium type is SSD (YES at S123), the microprocessor 121 determines not to update the control information (cache directory) in the shared memory 132 (S127). If the medium type is not SSD (NO at S123), the microprocessor 121 refers to the volume-by-volume hit rate table 250 with a key of the logical volume number to determine whether the low hit-rate flag for the logical volume holding the designated data is ON (S124).

If the low hit-rate flag is ON (YES at S124), the microprocessor 121 determines not to update the control information (cache directory) in the shared memory 132 (S127). If the low hit-rate flag is OFF (NO at S124), the microprocessor 121 determines whether its own overload flag is ON with reference to the MP operation rate table 270 with a key of the microprocessor number (S125).

If the overload flag is ON (YES at S125), the microprocessor 121 determines not to update the control information (cache directory) in the shared memory 132 (S127). If the overload flag is OFF (NO at S125), the microprocessor 121 refers to the CM operation rate table 290 with a key of the CMPK number to determine whether the overload flag for the CMPK 130 the microprocessor 121 accesses is ON (S126).

If the overload flag is ON (YES at S126), the microprocessor 121 determines not to update the control information (cache directory) in the shared memory 132 (S127). If the overload flag is OFF (NO at S126), the microprocessor 121 determines to update the control information (cache directory) in the shared memory 132 (S128).

As described, if predetermined conditions are satisfied, the microprocessor 121 determines not to reflect the update of the cache directory 310 in the local memory 122 to the cache directory 510 in the shared memory 132. This determination lowers the load to the microprocessor 121 and the CMPK 130 to improve the throughput of the system.

Unless update of the control information (in this example, the cache directory) in a local memory is reflected to a shared memory 132, an occurrence of a failure to the MPPK 120 in charge of the control information causes a problem. In normal operations, a microprocessor 121 can refer to the updated latest control information as it refers to its own local memory 122. However, if a failure occurs to its MPPK 120, another MPPK 120 takes over the assignment of the MPPK 120 (failover).

Since the data in the local memory 122 in the MPPK 120 which has developed the failure get lost, (the microprocessors 121 in) the MPPK 120 of the successor can obtain only the old control information that are held in the shared memory 132. For this reason, the data which are held in the shared memory 132 and can be omitted to be updated (backed up to the shared memory 132) are control information with which a failure of the MPPK 120 will not lead to user data loss.

The above-described preferable configuration omits update in the shared memory 132 that affects a little at a failure in an MPPK 120. Specifically, if the storage drive 170 from which read data is retrieved because of a cache miss is an SSD (YES at S123), the microprocessor 121 determines to omit update in the shared memory 132 (S127).

A failure in the MPPK 120 causes the information indicating that the data retrieved from an SSD are in cache to be lost; however, SSDs show higher access performance than the other medium types of drives 170. Accordingly, adverse effect of a cache miss caused by the lost control information is small and the effect of lower overhead on the MPPK 120 and the CMPK 130 leading to improvement in system performance is greater.

In this configuration, the medium type to omit update in the shared memory 132 is the SSD, but this medium type depends on the system design. The types of media (drives) installed in the system are not limited only to the SSD and the HDD, but instead of these or in addition to these, different types of drives can be installed. Among the plurality of installed medium types, the type to satisfy the conditions to omit update in the shared memory 132 is selected depending on the design. The types of media showing the higher access performance, including the highest access performance, than the rest of one or more types of media are selected.

In this configuration, if the cache hit rate on the logical volume holding the data designated by the read command is low (YES at S124), the microprocessor 121 determines not to update the control information in the shared memory 132 (S127). Even if the cache control information for the data in a volume with a low cache hit rate is lost, the effect on the access performance of the volume is small and the effect of lower overhead on the MPPK 120 and CMPK 130 leading to improvement in the system performance is greater.

Furthermore, this configuration determines whether to update the control information in the shared memory 132 based on the current load to the MPPK 120 and the CMPK 130 (S125, S126). If the load to the MPPK 120 or the CMPK 130 is high, omission of update in the shared memory 132 produces greater effect on performance improvement.

As described, this configuration omits update of the cache control information in the shared memory 132 if the performance boost function for the object volume is ON and any one of the above-described four conditions is satisfied. The microprocessor 121 may determine whether to update the control information in the shared memory 132 based on conditions different from the foregoing conditions. The microprocessor 121 may determine satisfaction of a plurality of conditions out of the foregoing four conditions to be the conditions to omit to update the control information in the shared memory 132.

Figure 17:
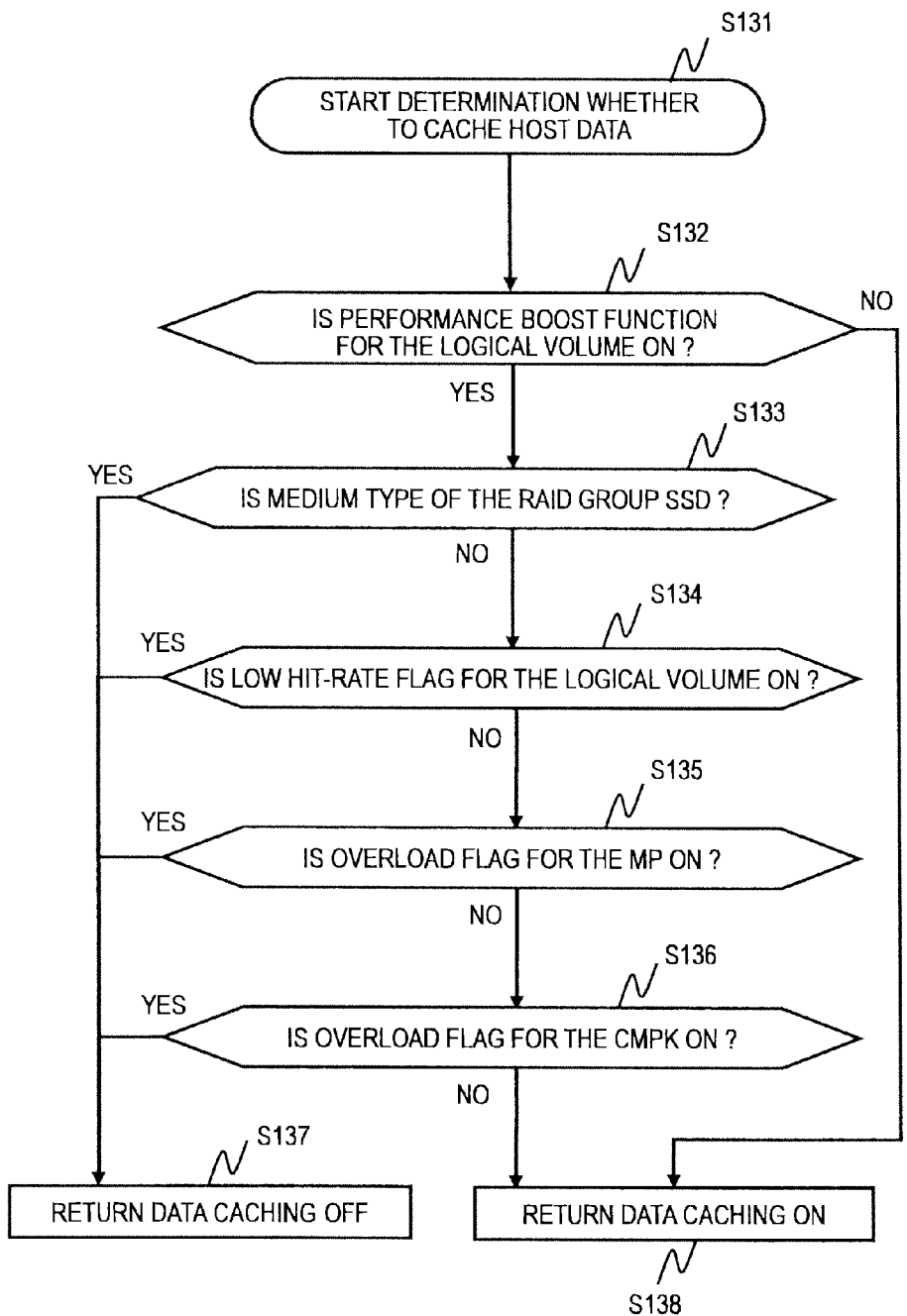
FIG. 17 is a flowchart of determining whether to cache host data in the first embodiment.

FIG. 17 is a flowchart illustrating the determining whether to cache the host data (read data) (S116) in the flowchart of FIG. 15. The flowchart of this step is substantially similar to the flowchart of FIG. 16. Accordingly, differences from this step will be mainly explained.

In FIG. 17, steps S132 to S136 are the same as the steps S122 to S126 in the flowchart of FIG. 15. At step S137, the microprocessor 121 determines to transmit the host data (read data) retrieved from a storage drive 170 to the host computer 180 without storing them in the cache memory 131. On the other hand, at step S138, the microprocessor 121 determines to store (cache) the host data retrieved from the storage drive 170 in the cache memory 131.

In this example, the conditions to determine whether to cache the read data is the same as the conditions to determine whether to update cache control information in the shared memory 132. Such control of read data caching achieves lower overhead on the MPPK 120 and the CMPK 130 leading to improvement in the system performance. The determination conditions for cache control may be different from the determination conditions for update control of control information.

Figure 18A:
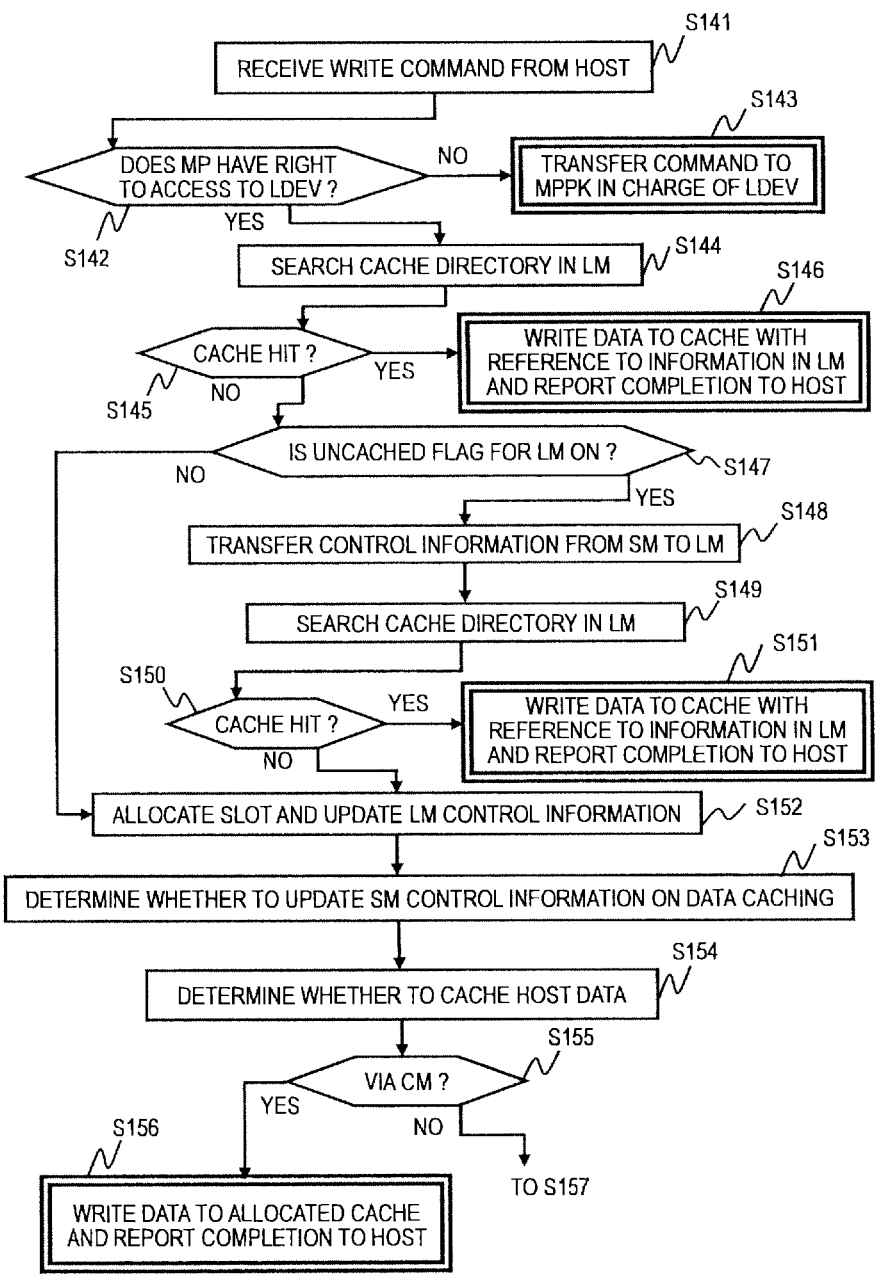
FIG. 18A is a part of a flowchart of processing a write command from the host in the first embodiment.
Figure 18B:
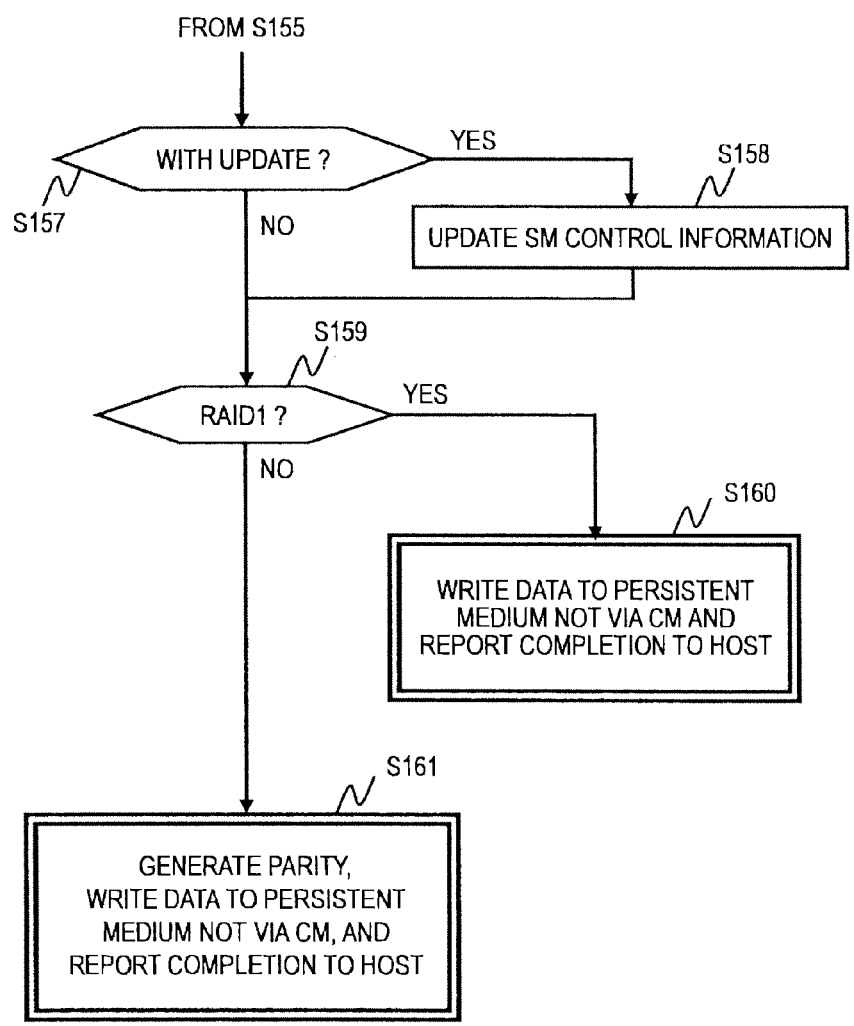
FIG. 18B is the other part of a flowchart of processing a write command from the host in the first embodiment.

Now, processing a write command received from the host computer 180 will be explained with reference to the flowcharts of FIGS. 18A and 18B. When a microprocessor 121 receives a write command from the host computer 180 (S141), the microprocessor 121 determines whether it has a right to access the volume (LDEV) at the designated address (S142).

If the microprocessor 121 does not have the right to access (NO at S142), the microprocessor 121 transfers the write command to a different MPPK 120 in charge of the volume (S143). If the microprocessor 121 has the right to access (YES at S142), the microprocessor 121 searches the cache directory 310 in the local memory 122 on the same board (S144).

If the address designated by the write command is found (YES at S145), the microprocessor 121 writes the write data to the cache memory 131 in accordance with the information in the cache directory 310 and reports the completion of the command to the host computer 180 (S146).

If the address designated by the write command cannot be found (cache miss) (NO at S145), the microprocessor 121 checks the uncached flag for the local memory 122 (S147). If the uncached flag is ON (YES at S147), the microprocessor 121 transfers the cache directory (control information) from the shared memory 132 to the local memory 122 with the controller in the CMPK 130 (S148).

The microprocessor 121 searches the cache directory 310 in the local memory 122 (S149). If the address designated by the write command is found (YES at S150), the microprocessor 121 writes the write data to the cache memory 131 in accordance with the information in the cache directory 310 and reports the completion of the command to the host computer 180 (S151).

In the case of cache miss (NO at S150) or if the uncached flag is OFF (NO at S147), the microprocessor 121 allocates segments in the cache memory 131 as a slot for the write data and further, updates the cache directory 310 in the local memory 122 (S152).

The microprocessor 121 determines whether to reflect update of the cache directory 310, which is control information on data caching, to the data 510 in the shared memory 132 (S153). The specific method of this determination is the same as the method explained with reference to FIG. 15. The microprocessor 121 further determines whether to cache the write data (host data) (S154). This determination method is the same as the method explained with reference to FIG. 16.

If the microprocessor 121 determines to cache the write data (YES at S155), the microprocessor 121 writes the write data to the newly allocated area in the cache memory 131 and notifies the host computer 180 of the completion of the command (S156). The microprocessor 121 updates the cache directory 510 in the shared memory 132 in synchronization with the update of the cache directory 310 in the local memory 122, notwithstanding the result of the determination at S153.

If the microprocessor 121 determines not to cache the write data (NO at S155), the microprocessor 121 updates the control information in the shared memory 132 or omits the update based on the result of the determination at step S153. If the microprocessor 121 determines to update the cache control information (cache directory 510) in the shared memory 132 (YES at S157), the microprocessor 121 reflects the update of the cache directory 310 in the local memory 122 to the cache directory 510 in the shared memory 132 (S158) and proceeds to the next step S159.

If the microprocessor 121 determines not to update the cache control information in the shared memory 132 (NO at S157), the microprocessor 121 identifies the RAID level of the write destination with reference to the RAID level table 240 (S159). If the RAID level is 1 (YES at S159), the microprocessor 121 writes the data in the storage drive 170 with the BEPK 140 without storing the write data in the cache memory 131 and reports the completion of the command to the host computer 180 (S160).

If the RAID level is different from 1 (NO at S159), the microprocessor 121 generates a parity and writes the parity and the write data to the storage drive 170 with the BEPK 140 without storing the write data in the cache memory 131. Furthermore, the microprocessor 121 notifies the host computer 180 of the completion of the command (S161).

As described, in handling a write command in this example, it is necessary to omit to store the write data in the cache memory 131 in order to omit update in the cache directory 510 in the shared memory 132. This is because the write data cannot be located in the cache memory 131 if the cache control information gets lost before destaging the cached write data (writing to the drive 170).

As described above, in this example, the conditions to determine whether to cache the write data at step S154 are the same as those at step S116 in FIG. 15. The conditions to determine whether to update the cache control information in the shared memory 132 at S153 are the same as those at step S113 in FIG. 15. These may be different.

Such control of caching write data and updating the cache control information achieves lower overhead on the MPPK 120 and the CMPK 130 leading to improvement of the performance in the storage system 10.

Figure 19:
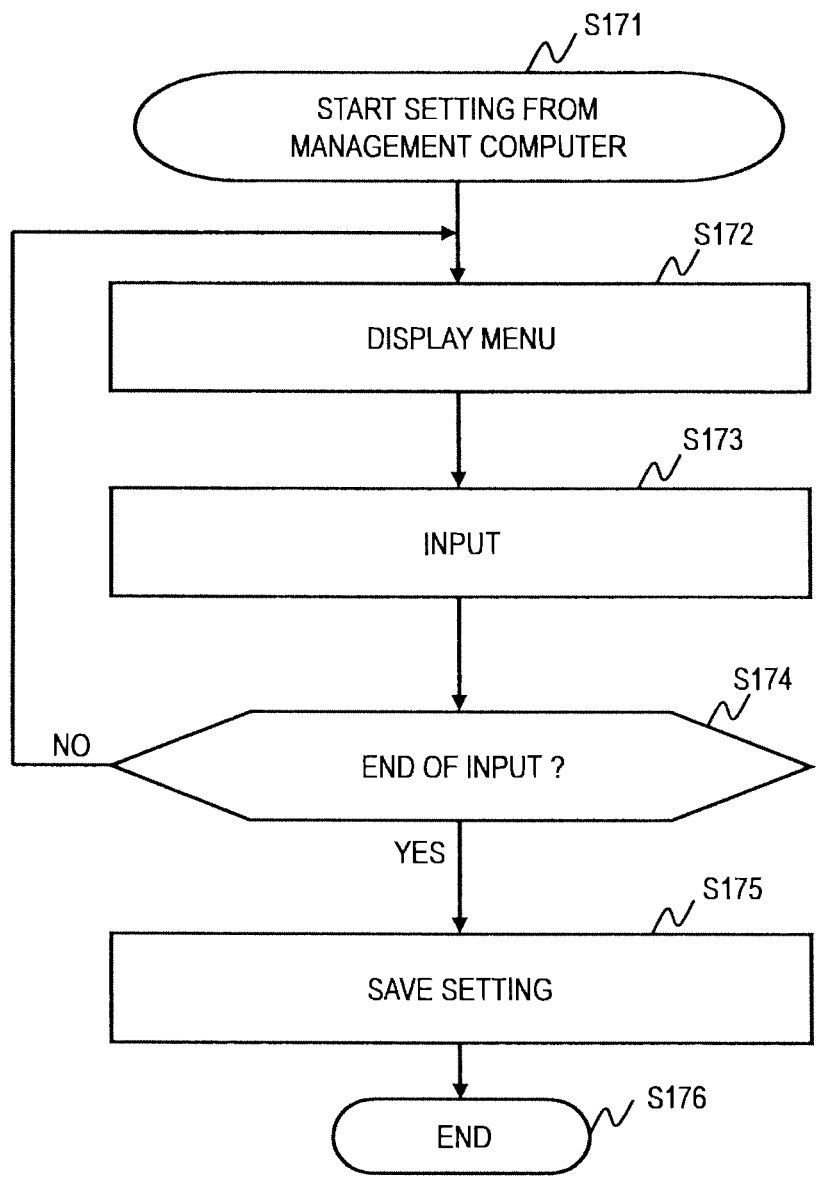
FIG. 19 is a flowchart of setting from the management computer in the first embodiment.

Next, with reference to the flowchart of FIG. 19, setting from the management computer 20 will be explained. The management computer 20 operates in accordance with a management program executed therein. Accordingly, the descriptions having subjects of the management computer 20 can have subjects of a management program or the CPU 26. The management computer 20 starts setting (S171) and displays a menu for inputting setting data on the display device 29 (S172). The administrator inputs required setting data with the input device 28 (S173 and NO at S174).

If all the required data are inputted (YES at S174), the management computer 20 saves the setting data in response to the selection of the save button (S175). The setting data are transmitted from the management computer 20 to the storage system 10 in response to a request from the storage system 10. The administrator may select the cancel button to input the setting data again.

Figure 20:
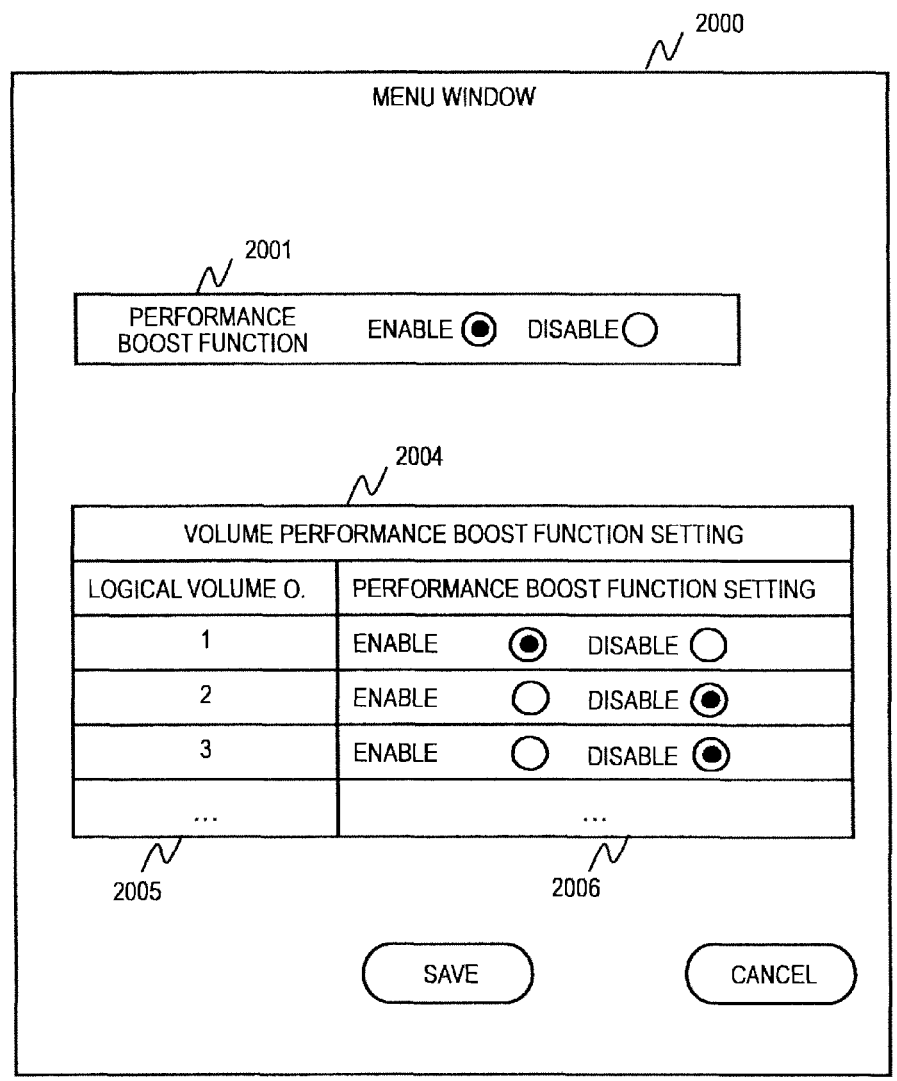
FIG. 20 is a drawing showing an example of a setting menu window in the management computer in the first embodiment.

FIG. 20 shows an example of a menu window 2000. The menu window 2000 includes a performance boost function setting area 2001 and a volume-by-volume performance boost function setting area 2004.

The administrator selects either one of "ENABLE" or "DISABLE" in the performance boost function setting area 2001 with the input device 28 to enable or disable the performance boost function (the above-described function to control updating the control information and caching user data) of the storage system 10. This setting is reflected to the performance boost function enablement table 210. If this function is disabled, none of the performance boost functions in the storage system 10 are used.

The volume-by-volume performance boost function setting area 2004 includes a column of logical volume numbers 2005 and a column of performance boost function settings 2006. The administrator can select enabling/disabling the performance boost function for each logical volume with the input device 28.

This setting is reflected to the volume-by-volume performance boost function enablement table 220. If the performance boost function for the system is enabled and the performance boost function is enabled for a volume, the performance boost function in this embodiment is used for the volume.

FIG. 20 exemplifies a setting window of the performance boost function; in addition, the management computer 20 may display a setting window of the threshold values included in the determination conditions and transmit setting data inputted by the administrator to the storage system 10, for example. Typically, the storage system 10 has default values on the items presettable by the administrator and updates the data on the item set by the administrator with the input data.

Figure 21:
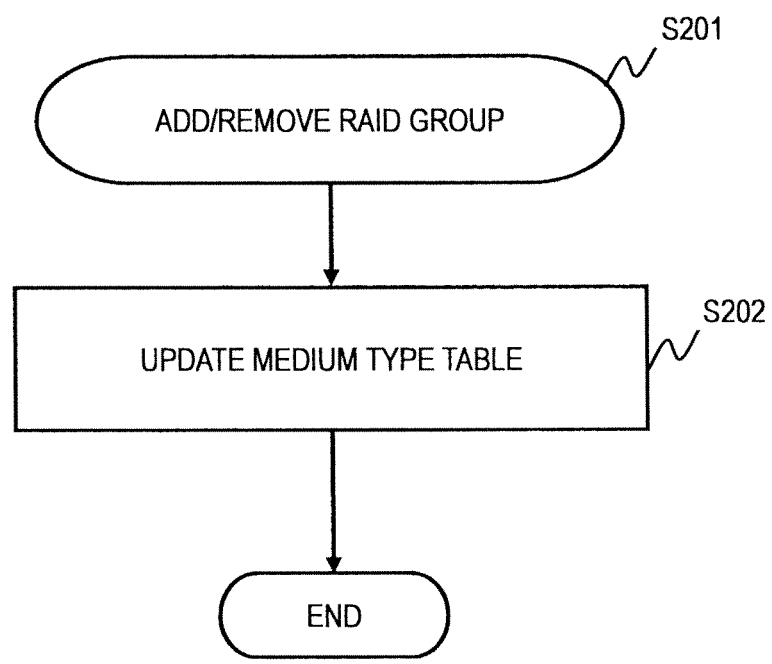
FIG. 21 is flowchart of updating a medium type table in the first embodiment.

Hereinafter, with reference to FIGS. 21 to 24, updating the tables in the storage system 10 will be described. FIG. 21 is a flowchart of updating the medium type table 230. When a RAID group is added or removed (S201), the BEPK 140 transmits information on it to any one of the microprocessors 121. The microprocessor 121 that has received the update information updates the medium type table 230 and the RAID level table 240 in the local memory 122 and further, updates these tables in the non-volatile storage area (S202) and informs the other MPPKs 120 of the update. The management computer 20 may provide the MPPKs 120 with the information.

Figure 22:
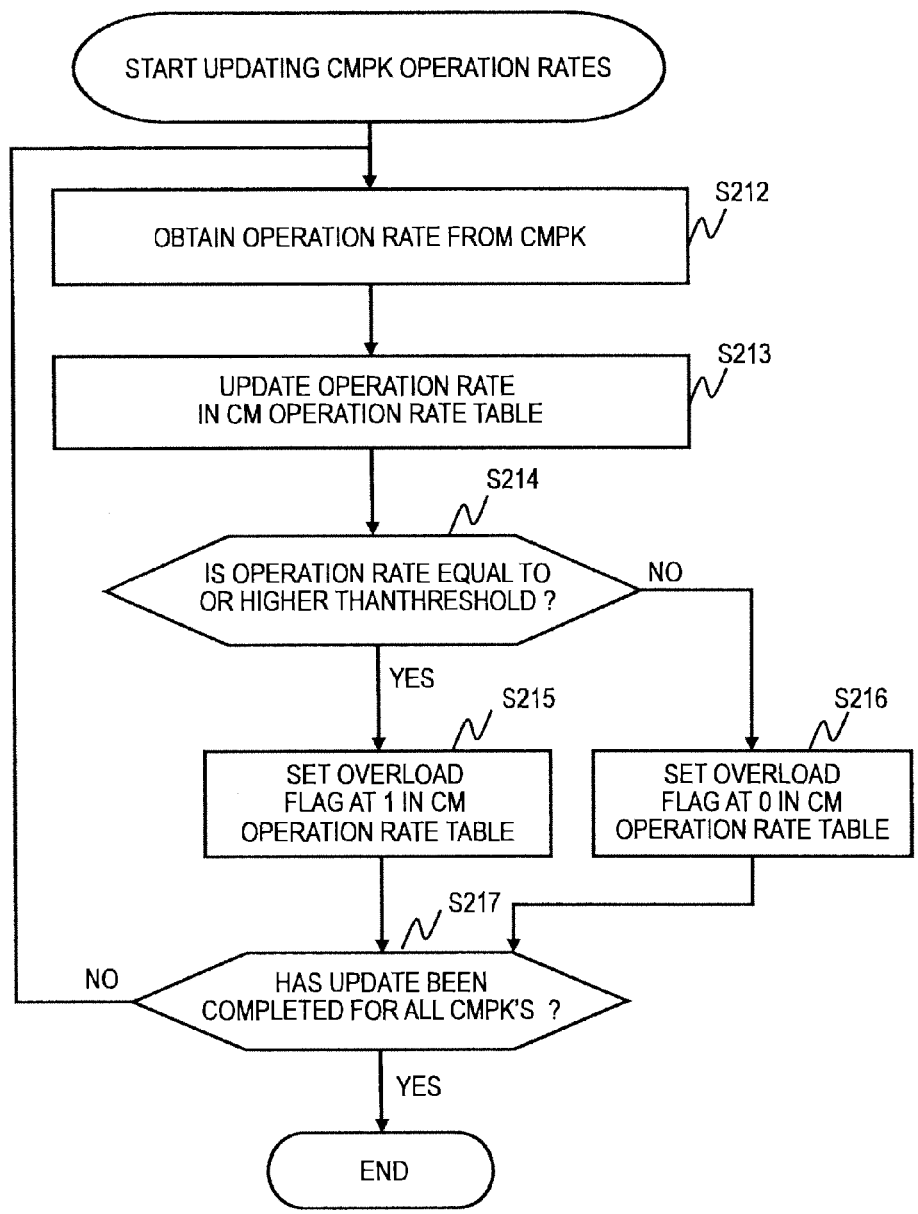
FIG. 22 is flowchart of updating CMPK operation rates in the first embodiment.

With reference to FIG. 22, updating the CM operation rate table 290 will be described. Any one of the microprocessors 121 in an MPPK 120 performs this processing, typically on a periodic basis (for example, every one second). The microprocessor 121 obtains information on the operation rate from a CMPK 130 which the microprocessor 121 accesses (S212). Specifically, the microprocessor 121 requests a value indicating the operation rate of the CMPK 130 (CM operation rate) to the controller (not shown) in the CMPK 130 and obtains it from the controller in the CMPK 130.

The microprocessor 121 updates the field of the operation rate column 292 for the relevant entry in the CM operation rate table 290 with the value of the operation rate obtained from the CMPK 130 (S213). Moreover, the microprocessor 121 determines whether the update value of the operation rate is equal to or higher than the threshold in the CM operation rate threshold table 300 (S214).

If the operation rate is equal to or higher than the threshold (YES at S214), the microprocessor 121 sets the overload flag for the entry at 1 (ON) in the CM operation rate table 290 (S215). If the operation rate is lower than the threshold (NO at S214), the microprocessor 121 sets the overload flag for the entry at 0 (OFF) (S216). The microprocessor 121 executes steps S212 to S216 for all of the CMPKs 130 which the microprocessor 121 can access (S217).

Figure 23:
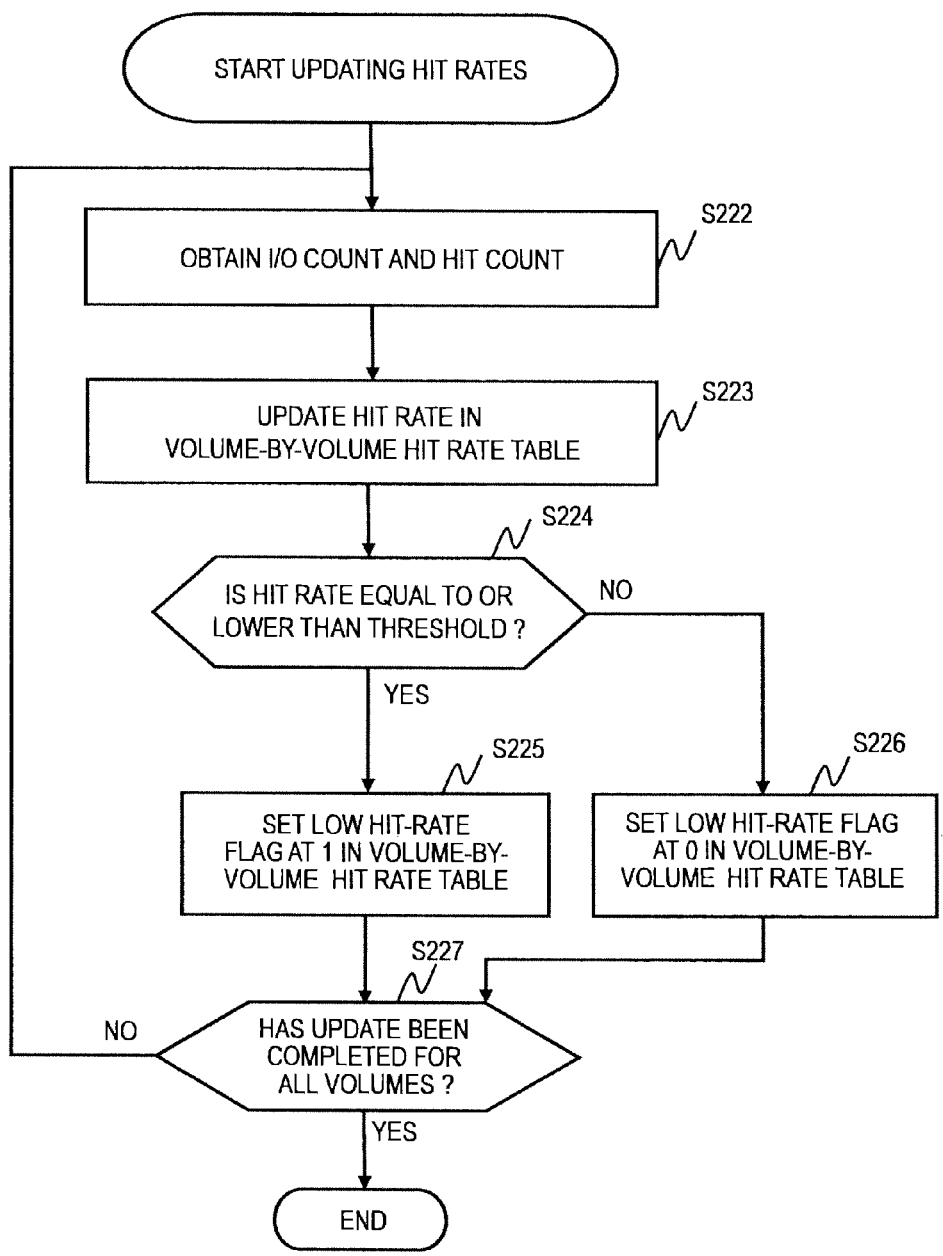
FIG. 23 is flowchart of updating hit rates in the first embodiment.

With reference to FIG. 23, updating the volume-by-volume hit rate table 250 will be explained. Any one of the microprocessors 121 in an MPPK 120 performs this processing, typically on a periodic basis (for example, every one second). The microprocessor 121 obtains the I/O count and the hit count on one of the assigned logical volumes from the local memory 122 (S222). This particular microprocessor 121 or another microprocessors 121 counts the I/O counts (for example, the number of read commands) and the cache hit counts on each assigned logical volume after the previous update, store those values in the local memory 122. The particular microprocessor 121 obtains the values at step S222.

The microprocessor 121 updates the field of the hit rate and sets the fields of the I/O count and the hit count at 0 for the relevant entry in the volume-by-volume hit rate table 250 with the obtained values (S223). The microprocessor 121 further compares the hit rate with the threshold in the hit rate threshold table 260 (S224).

If the hit rate is equal to or lower than the threshold (YES at S224), the microprocessor 121 sets the low hit-rate flag for the entry at 1 (ON) (S225). On the other hand, if the hit rate is higher than the threshold (NO at S224), the microprocessor 121 sets the low hit-rate flag for the entry at 0 (OFF) (S226). The microprocessor 121 executes steps S222 to S226 on every volume assigned to itself (S227).

Figure 24:
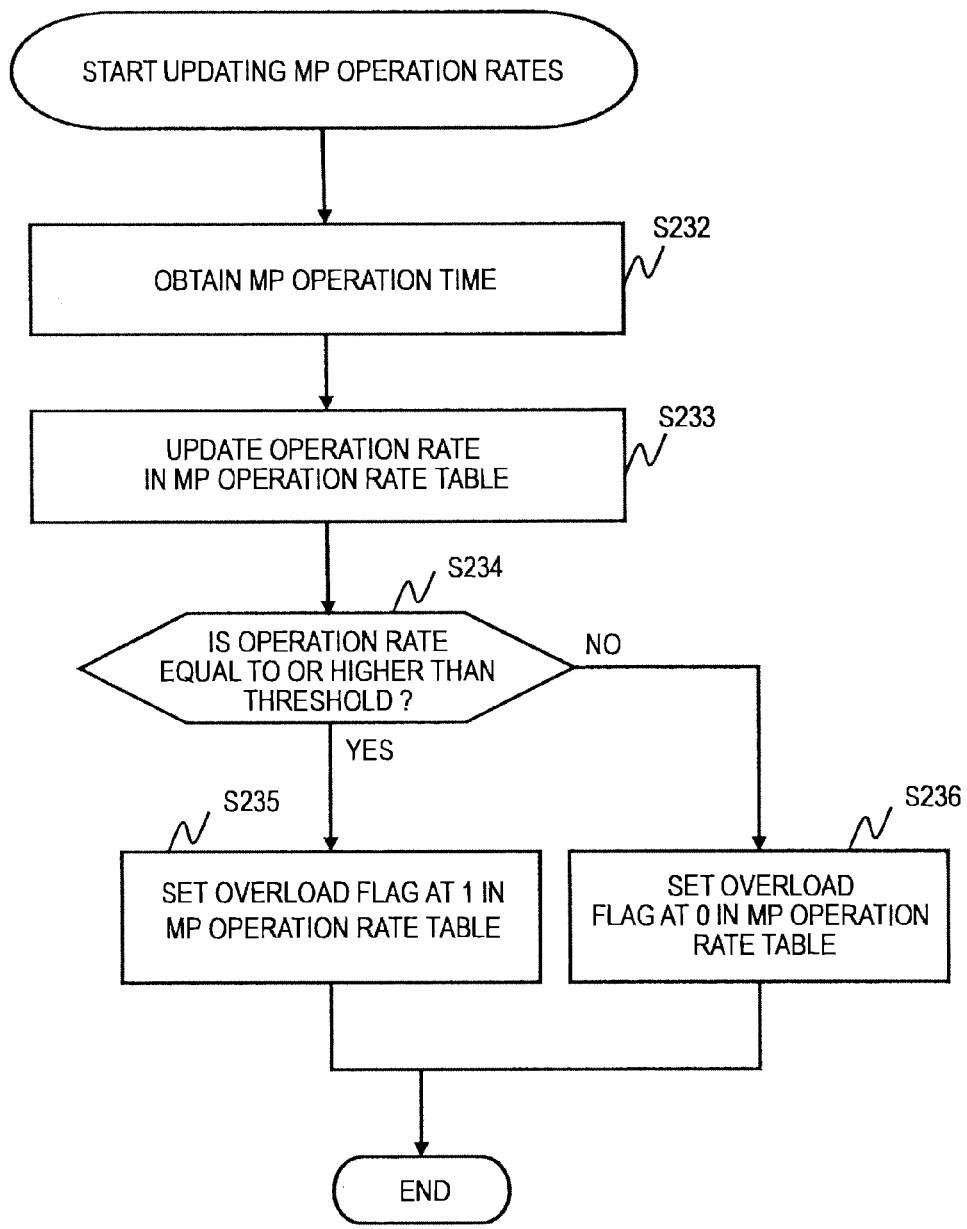
FIG. 24 is flowchart of updating MP operation rates in the first embodiment.

With reference to FIG. 24, updating the MP operation rate table 270 will be explained. Each microprocessor 121 performs this processing, typically on a periodic basis (for example, every one second). The microprocessor 121 monitors its own operation time per unit time (in this example, one second) and stores the value in the local memory 122. The microprocessor 121 obtains the value from the local memory 122 (S232).

The microprocessor 121 updates the field of the operation rate for the entry with the obtained value and set 0 value to the field of the operation time (S233). Moreover, the microprocessor 121 compares the updated operation rate with the threshold in the MP operation rate threshold table 280 (S234). If the operation rate is equal to or higher than the threshold (YES at S234), the microprocessor 121 sets the overload flag for the entry at 1 (ON) (S235). If the operation rate is lower than the threshold (NO at S234), the microprocessor 121 sets the overload flag for the entry at 0 (OFF) (S236).

Figure 25:
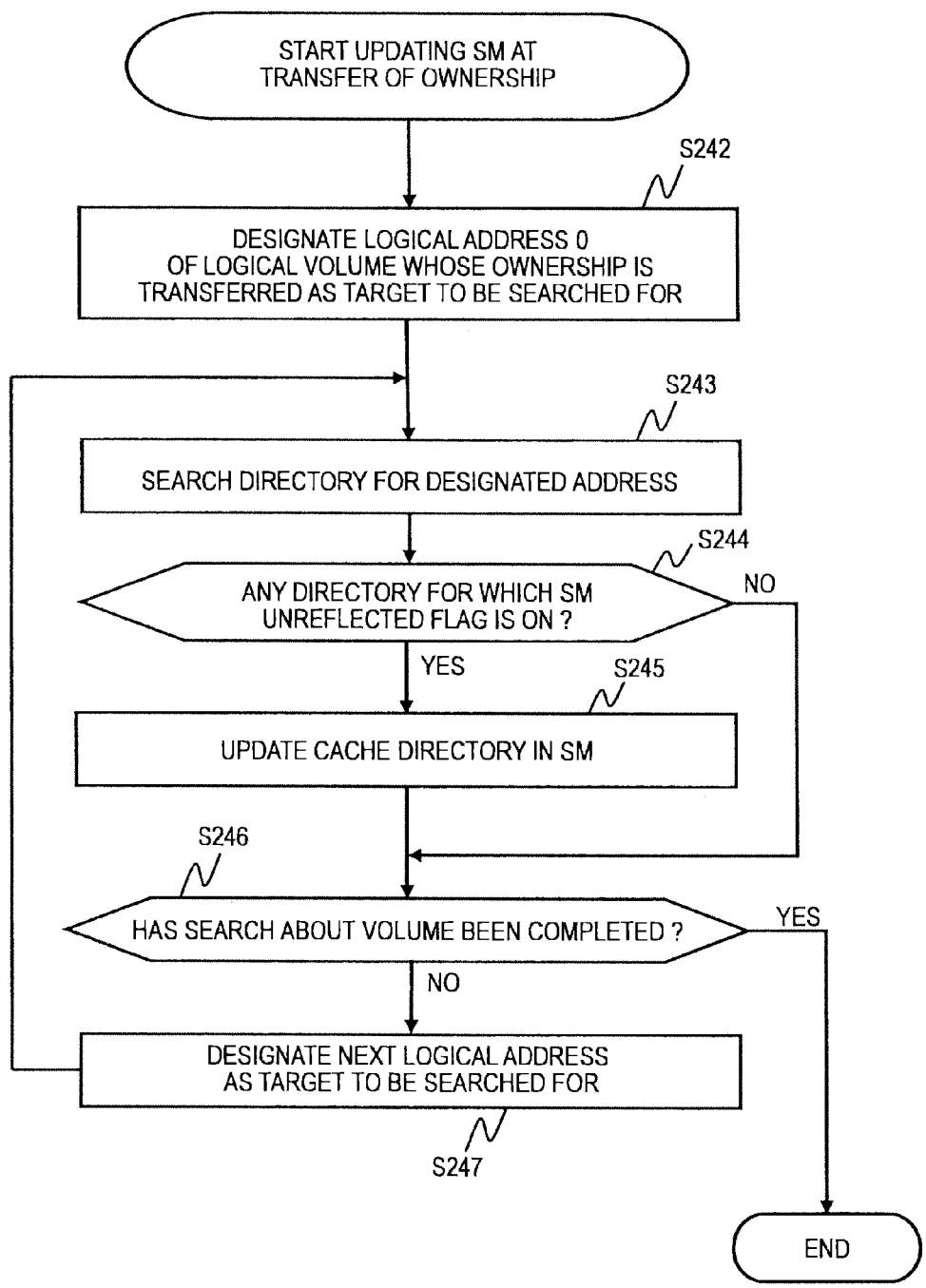
FIG. 25 is flowchart of updating an SM in transferring the ownership in the first embodiment.

With reference to FIG. 25, transferring the ownership of logical volumes from a current MPPK 120 to another MPPK 120 will be described. Before transferring the ownership, the current MPPK 120 reflects the unreflected part in the cache directory 310 held in the local memory 122 to the shared memory 132. This operation allows the next MPPK 120 to use the latest cache directory in cache control, so that a high cache hit rate is attained.

A microprocessor 121 in the MPPK of the current owner designates the logical address zero of a logical volume whose ownership is transferred as a target to be searched for in the cache directory 310 (S242). The microprocessor 121 searches the cache directory 310 for the address (S243).

If the address exists in a directory for which a shared memory unreflected flag is ON (YES at S244), the microprocessor 121 updates the directory in the shared memory 132 (S245) and proceeds to step S246. The shared memory unreflected flag is a flag to indicate whether update in the object directory has been reflected to the shared memory 132; if it is ON, it indicates that the update in the object directory has not been reflected to the shared memory 132.

If the designated address exists in the directory for which the shared memory unreflected flag is OFF (NO at S244), the microprocessor 121 proceeds to step S246 without updating the directory in the shared memory 132.

At step S246, the microprocessor 121 determines whether the search of the cache directory 310 about the volume has been through. If all the addresses have been searched for (YES at S246), the microprocessor 121 terminates the processing. If any address has not been searched for (NO at S246), the microprocessor 121 alters the designation of the address to the next logical address (S247) and repeats steps S243 to S246.

Second Embodiment

This embodiment explains a storage system 10 having a tiered storage virtualization function. The storage system 10 in this embodiment configures a pool including a plurality of pool volumes (real volumes). The pool includes a plurality of media different in performance in the storage system 10 and is tiered into a plurality of tiers depending on access performance. Each tier consists of one or more pool volumes.

The storage system 10 provides a host computer 180 with virtual volumes configured from the pool. The storage system 10 manages the pool in units of pages having the specific capacity. Each pool volume is separated into a plurality of pages and data are stored in the pages. In response to write to a virtual volume from the host computer 180, the storage system 10 allocates one or more pages in the required capacity from the pool.

The storage system 10 can make the capacities of the virtual volumes recognized by the host computer 180 larger than the real capacities allocated to the virtual volumes and also can make their real capacities to provide the capacities allocated to the host computer 180 smaller than the allocated capacities (thin provisioning).

The storage system 10 analyzes I/O load from the host computer 180 to the virtual volumes, and automatically allocates pages with high I/O load to a tier of high level, which is composed of resources configured with high-performance high-cost media, and the other pages to tiers of lower level, which are composed of resources configured with lower-performance lower-cost media. This configuration achieves satisfactory access performance at a lower system cost.

Figure 26:
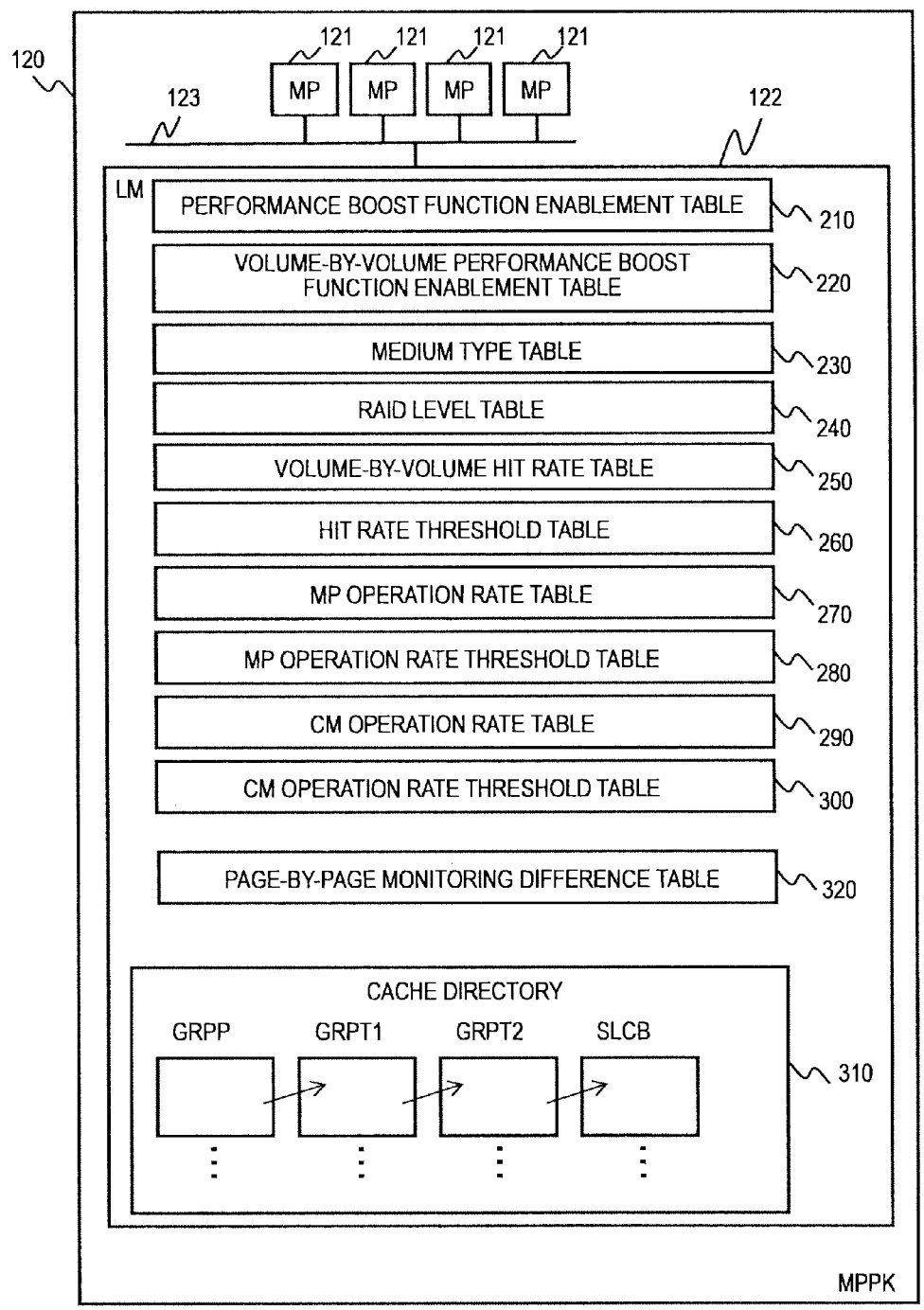
FIG. 26 is a drawing illustrating information held in a local memory in the second embodiment.
Figure 27:
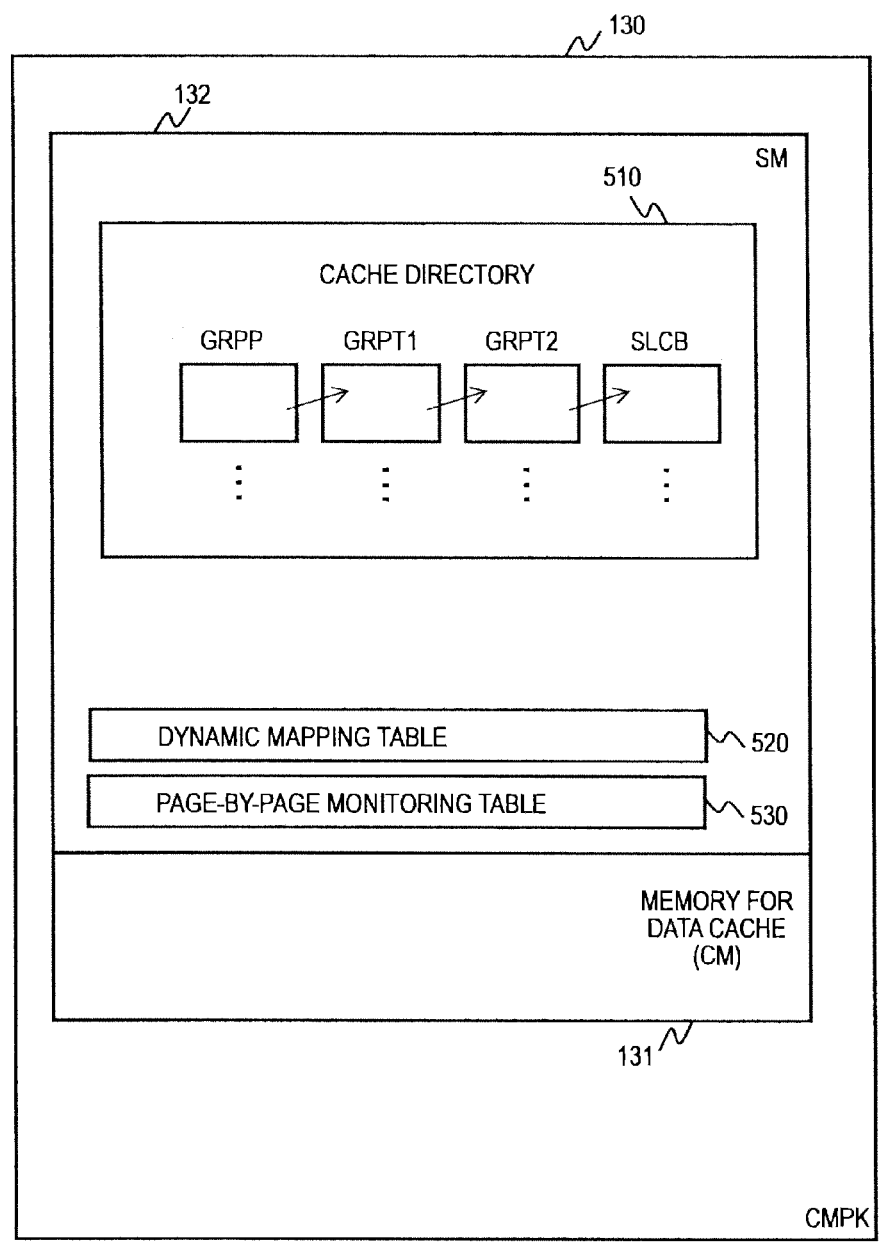
FIG. 27 is a drawing illustrating information held in a shared memory in the second embodiment.

Hereinafter, differences from the first embodiment will be mainly described. FIG. 26 shows information held by each local memory 122 in this embodiment. The control information in the local memory 122 includes a page-by-page monitoring difference table 320 in addition to the information described in the first embodiment. FIG. 27 shows data stored in each shared memory 132 in this embodiment. The control information in the shared memory 132 includes a dynamic mapping table 520 and a page-by-page monitoring table 530 in addition to the information described in the first embodiment.

FIG. 28 exemplifies the dynamic mapping table 520. The dynamic mapping table 520 is a table for managing entries (entries of storage areas) to count the number of accesses in each virtual volume. For example, one page is an entry in the dynamic mapping table 520. In this description, this example will be explained.

The dynamic mapping table 520 includes columns of pool numbers 521, virtual volume numbers 522, logical addresses 523, pool volume numbers 524, logical addresses 525, and monitoring information index numbers 526. The pool numbers and the virtual volume numbers are identifiers to uniquely identify pools and virtual volumes, respectively, in the storage system 10. The monitoring information index numbers are entry identifiers in the dynamic mapping table 520.

The logical address column 523 stores the beginning logical addresses in the virtual volumes for the individual entries. The logical address column 525 stores the beginning logical addresses in the pool volumes for the individual entries. In this example, the capacities of the entries are the same, but do not need to be the same.

FIG. 29 exemplifies the page-by-page monitoring table 530. The page-by-page monitoring table 530 manages I/O counts in individual pages. The microprocessor 121 refers to this table to determine the tier in which the data of each page are to be stored.

The page-by-page monitoring table 530 includes columns of monitoring information index numbers 531, I/O counters (present) 532, and I/O counters (last time) 533. The microprocessor 121 monitors accesses to the pages to count the I/O (the number of accesses) in a given monitoring period (for example, one second) and stores the counts in the page-by-page monitoring table 530. The monitoring period successively continues.

The I/O counter (last time) column 533 stores the I/O counts in the last monitoring period. The I/O counter (present) column 532 stores the I/O counts in the current monitoring period. The microprocessor 121 repetitively updates the values in the I/O counter (present) column 532 within the current monitoring period.

In this configuration, the microprocessor 121 counts I/O using the page-by-page monitoring difference table 320 in the local memory 122 and reflects the update of the values to the page-by-page monitoring table 530 in the shared memory 132. This will be described later. When the current monitoring period ends, the microprocessor 121 moves the I/O counts in the current monitoring period to the fields of the I/O counts in the last monitoring period.

FIG. 30 exemplifies a page-by-page monitoring difference table 320. The page-by-page monitoring difference table 320 is used to count accesses to each page. The page-by-page monitoring difference table 320 includes columns of monitoring information index numbers 321 and I/O difference counters 322. The microprocessor 121 monitors accesses to each page and increments the value of the relevant field in the I/O difference counter column 322 in response to every access.

When the value in a field in the column the I/O difference counters 322 reaches a predetermined value (in this example, the maximum value), the microprocessor 121 adds the value to the value in the field in the column of I/O counters (present) 532 of the corresponding entry in the page-by-page monitoring table 530 to update the field. The microprocessor 121 returns the value in the field of the column of I/O difference counters 322 which has reached to the maximum value to the initial value (zero value). As understood, the I/O difference counter indicates the difference in the I/O count after the previous update of the page-by-page monitoring table 530.

As indicated in FIGS. 30 and 29, the column of I/O difference counters 322 in the page-by-page monitoring difference table 320 store 8-bit data and the column of I/O counter (present) in the page-by-page monitoring table 530 stores 32-bit data, which is larger than 8-bit data. The numbers of bits depend on the system design and are not limited to 8 and 32.

Figure 31:
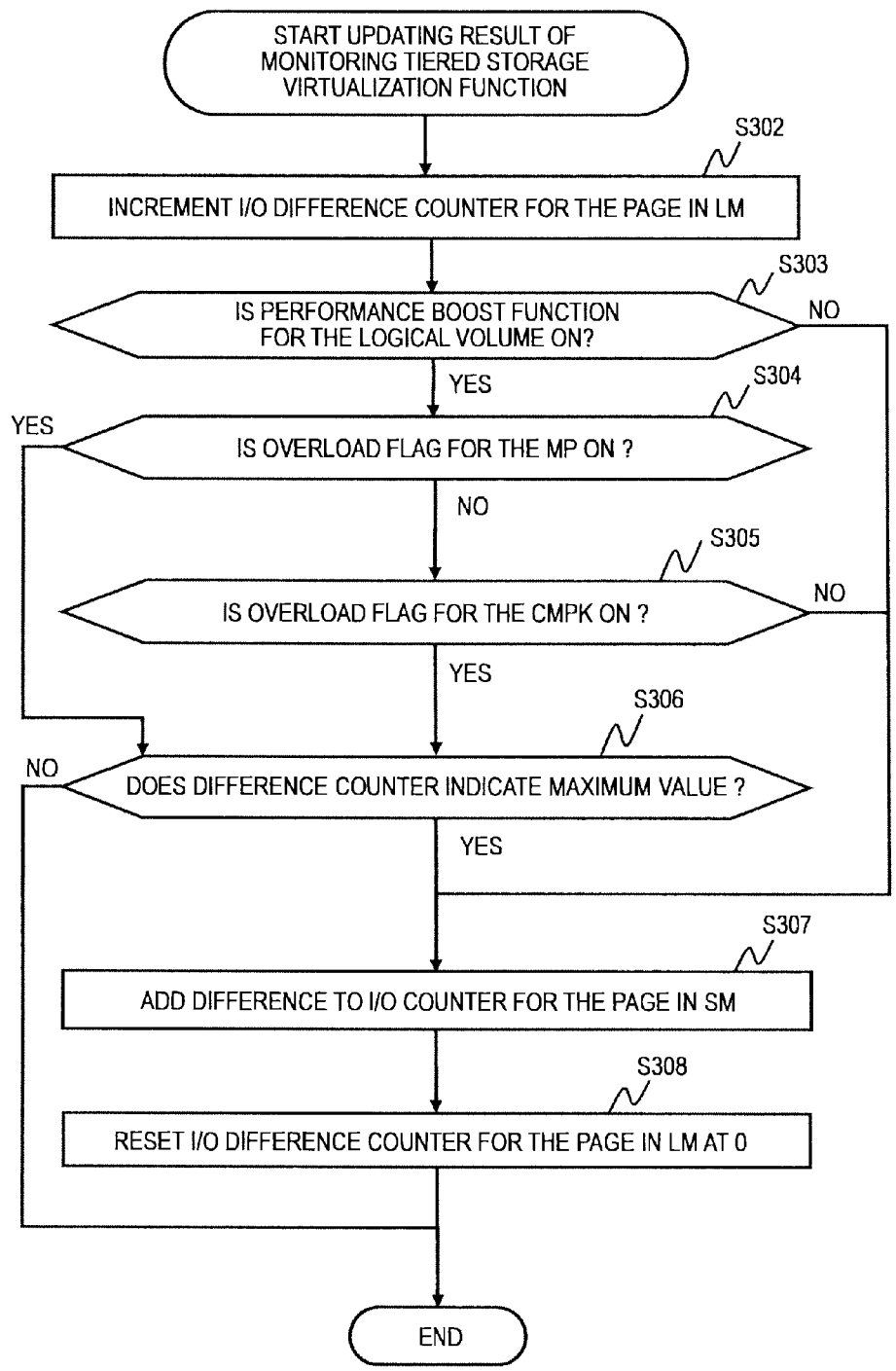
FIG. 31 is a flowchart of updating a result of monitoring a tiered storage virtualization function in the second embodiment.

With reference to the flowchart of FIG. 31, a specific method of updating result of monitoring the tiered storage virtualization function will be described. Upon receipt of an access to a page, a microprocessor 121 increments the I/O difference counter for the page in the page-by-page monitoring difference table 320 (S302). An access to a page is an I/O to/from a storage device mapped to the page or a host I/O to/from the page. The microprocessor 121 counts either one type of I/O.

The microprocessor 121 determines whether the performance boost function for the logical volume is ON (S303). This step is the same as step S122 in FIG. 16. If the volume performance boost function is OFF (NO at S303), the microprocessor 121 proceeds to step S307.

If the volume performance boost function is ON (YES at S303), the microprocessor 121 determines whether its own overload flag is ON (S304). This step is the same as step S125 in FIG. 16.

If the overload flag is ON (YES at S304), the microprocessor 121 proceeds to step S306. If the overload flag is OFF (NO at S304), the microprocessor 121 determines whether the overload flag for the CMPK 130 the microprocessor 121 accesses is ON (S305). This step is the same as step S126 in FIG. 16.

If the overload flag for the CMPK 130 is OFF (NO at S305), the microprocessor 121 proceeds to step S307. The overload flag for the CMPK 130 is ON (YES at S305), the microprocessor 121 proceeds to step S306. At step S306, the microprocessor 121 determines whether the value of the I/O difference counter in the page-by-page monitoring difference table 320 is the maximum value.

If the value of the I/O difference counter is smaller than the maximum value (NO at S306), the flow ends. If the value of the I/O difference counter is the maximum value (YES at S306), the microprocessor 121 adds the maximum value to the value in the field of the column of I/O counter (present) 532 in the corresponding entry in the page-by-page monitoring table 530 to update the field with the value (S307). The microprocessor 121 further resets the value of the field in the column of I/O difference counter 322 that has reached the maximum value at a zero value (initial value) (S308).

This example updates the I/O counter in the shared memory 132 in synchronization with an update of the I/O difference counter in the local memory 122 if the loads to the microprocessor 121 and the CMPK 130 are small. The small loads do not cause degradation in the system performance, and accurate I/O count can be obtained at a failure. The conditions on loads to these two devices may be omitted or satisfaction of the both of them may be the conditions for asynchronous update of the I/O counter. Conditions different from these may be used.

As described above, the microprocessor 121 counts the I/O for the page with the counter in the local memory 122 and when it reaches a predetermined value, the microprocessor 121 reflects the predetermined value to the counter in the shared memory 132. This configuration achieves lower overhead in communication between the microprocessor 121 and the CMPK 130.

The number of bits in the counter in the page-by-page monitoring difference table 320 is smaller than the number of bits in the counter in the page-by-page monitoring table 530. Counting the difference in the local memory can save the capacity required in the local memory 122 to count the I/O. At some failure in the MPPK 120, information on the I/O count for a certain time period gets lost; however, the data loss does not substantially affect the I/O analysis among the pages only because the differences in the I/O count are not reflected to the page I/O counts.

The performance monitoring method in this embodiment can be applied to monitoring of any performance other than the tiered storage virtualization function. For example, it may be applied to monitoring drives such as HDDs and SSDs. The foregoing example initializes the counter when the count reaches the maximum value, but I/O may be counted at initialization. For example, the microprocessor 121 adds the value obtained by adding one to the maximum number to the value of the I/O counter in the page-by-page monitoring table 530 together with the initialization of the I/O difference counter. The same applies to the count methods in the other embodiments.

Third Embodiment

Figure 32:
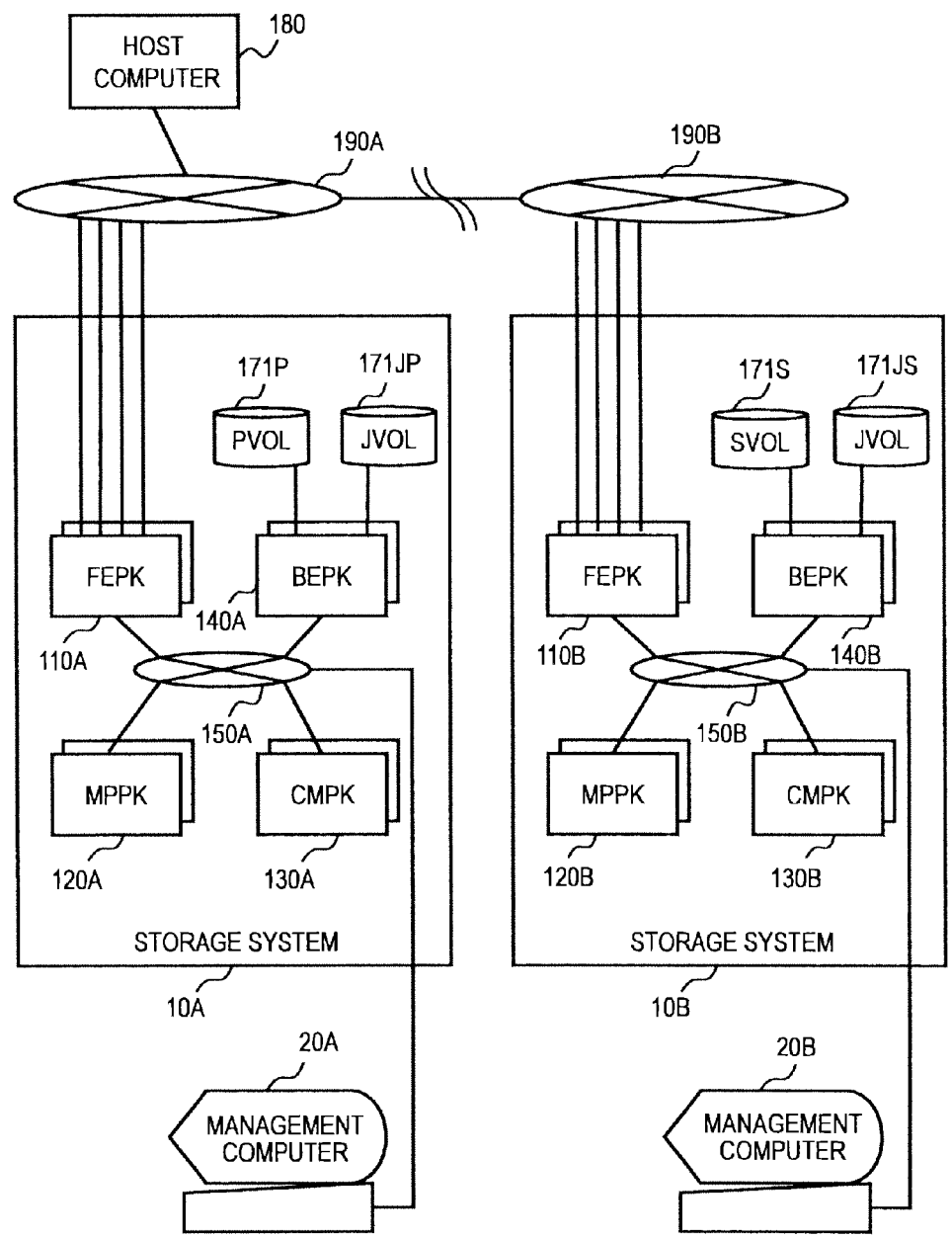
FIG. 32 is a drawing schematically illustrating a configuration of an overall computer system in the third embodiment.

Hereinafter, an example in which this invention is applied to asynchronous remote copy will be described. In this description, differences from the first and the second embodiments are mainly explained. FIG. 32 is a block diagram schematically illustrating a configuration of a computer system in this embodiment. The storage system in this embodiment includes a first storage system 10A and a second storage system 10B. Typically, the first storage system 10A and the second storage system 10B are installed at different sites and they are connected to be able to communicate with each other via a data network (such as a SAN) 190A, a data network (such as a SAN) 190B, and a wide area network.

The first storage system 10A and the second storage system 10B have the same hardware configuration as the one explained with reference to FIG. 1. Specifically, the first storage system 10A includes a plurality of FEPKs 110A, a plurality of MPPKs 120A, a plurality of CMPKs 130A, and a plurality of BEPKs 140A and they are interconnected to one another via an internal network 150A. A first management computer 20A manages the first storage system 10A.

In similar, the second storage system 10B includes a plurality of FEPKs 110B, a plurality of MPPKs 120B, a plurality of CMPKs 130B, and a plurality of BEPKs 140B and they are interconnected to one another via an internal network 150B. A second management computer 20B manages the second storage system 10B.

The first storage system 10A and the second storage system 10B have an asynchronous remote copy function. A primary volume (PVOL) 171P in the first storage system 10A and a secondary volume (SVOL) 171S in the second storage system 10B constitute a copy pair. Each volume is typically composed of one or more storage areas in one or more RAID groups.

The primary volume 171P is the copy source volume and the secondary volume 171S is the copy destination volume; data in the primary volume 171P is copied to the secondary volume 171S. The order of data copy to the secondary volume 171S is the same as the order of data write to the primary volume 171P (conservation of order).

In synchronous copy, in the case where the host computer 180 writes to the primary volume 171P, the host computer 180 is notified of the success of the I/O after the completion of the copy to a secondary volume 171S (typically, after the write to a cache memory). In contrast, in asynchronous copy, the host computer 180 is notified of the success of the I/O after the write to the primary volume 171P and before the completion of the copy to the secondary volume 171S.

The storage system in this embodiment uses journal volumes (JVOLs) 171JP and 171JS as buffers for copy from the primary volume 171P to the secondary volume 171S. In the first storage system 10A, the primary volume 171P and the journal volume 171JP are grouped. In the second storage system 10B, the secondary volume 171S and the journal volume 171JS are grouped.

Update data in the primary volume 171P are transmitted to the secondary volume 171S via the journal volumes 171JP and 171JS. This configuration allows a wide area network, which is unstable in performance, to be used in data transfer for remote copy.

Figure 33:
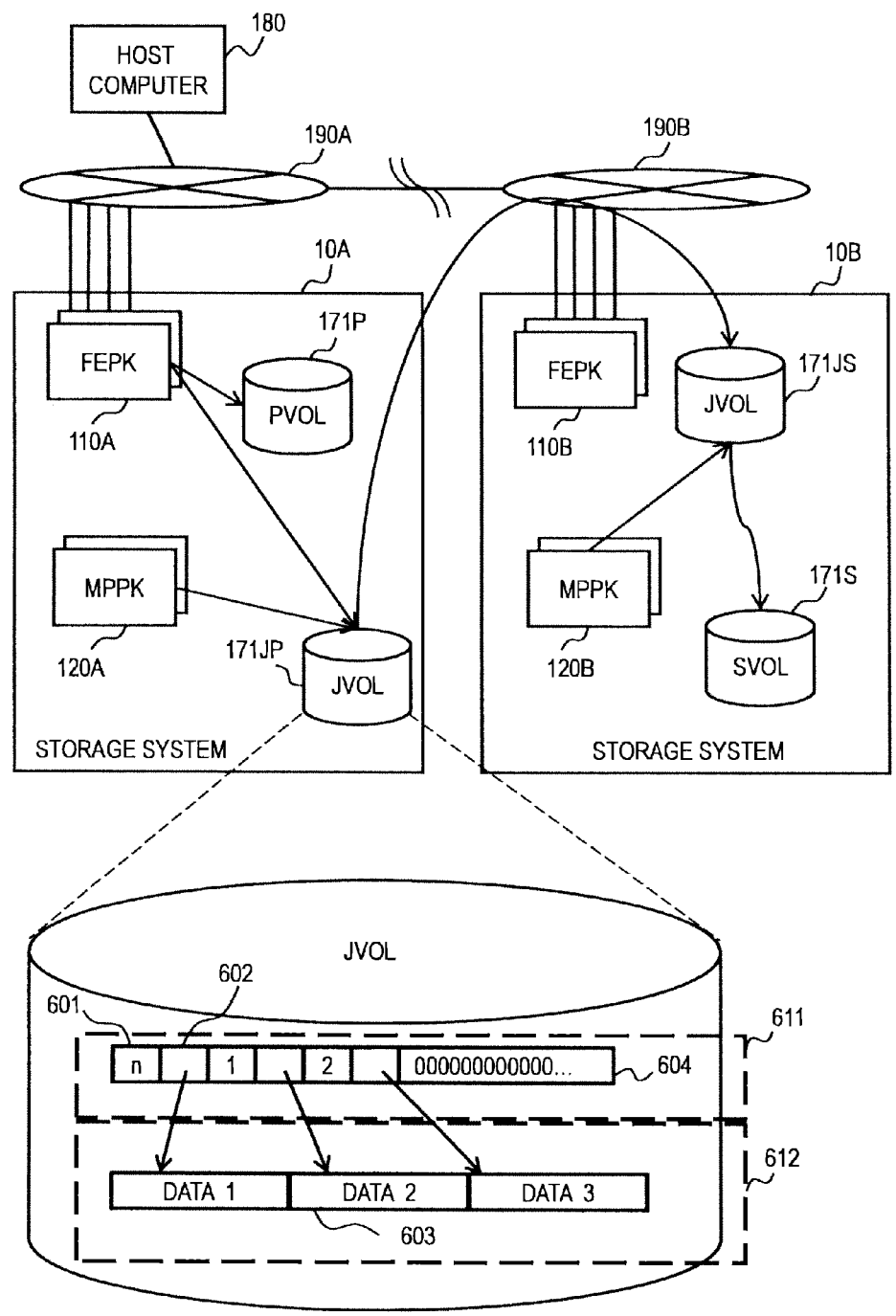
FIG. 33 is a drawing illustrating asynchronous remote copy in the third embodiment.

With reference to FIG. 33, the flow of data write from the host computer 180 to the primary volume 171P and copy of the update data to the secondary volume 1715. An FEPK 110A receives a write command and write data from the host computer 180. A (microprocessor 121 in an) MPPK 120A analyzes the write command and instructs the FEPK 110A and the BEPK 140A (not shown) to write the write data to the primary volume 171P and the journal volume 171JP.

Specifically, the MPPK 120A instructs the FEPK 110A and the BEPK 140A to transfer the write data to the designated next transfer destination. The final transfer destinations are the primary volume 171P and the journal volume 171JP; the write data are written to both of the primary volume 171P and the journal volume 171JP. The order of writing to the journal volume 171JP is the order of writing to the primary volume 171P.

In this drawing, illustration on writing the write data to the cache memory 131 is omitted; alternatively, the write data are stored in the volume without going through the cache memory 131. The MPPK 120A notifies the host computer 180 of the completion of the write in response to the completion of writing the write data to cache memory 131 or to the volume.

The MPPK 120A updates management data of the journal volume 171JP in response to the update of the journal volume 171JP. As shown in FIG. 33, the journal volume 171JP includes a management area 611 and a data area 612, which store journal volume management data and update data, respectively. The journal volume management data may be stored in the outside of the journal volume.

The journal volume management data includes pairs of sequence numbers 601 and pointers 602. A pair of these values is assigned to each write data (update data). In the example of this drawing, the sequence numbers 601 are any value of 1 to n and are assigned to write data in the ascending order of being stored in the data area. The sequence numbers are cyclic; to the write data subsequent to the write data with number n, the number 1 is assigned. A pointer 602 indicates the position (address) where the write data with the associated sequence number in the data area 612.

The management area 611 includes an area where pairs of sequence numbers 601 and pointers 602 have been written and an unused area 604. The unused area 604 holds an initial value; in this example, the initial value is a zero value. After the microprocessor 121 has transferred the update data held in the data area 612 to the second storage system 10B, it updates the values in the area holding the sequence number 601 and the pointer 602 of the data with the initial values (invalid values). The order of transfer of the update data coincides with the order of sequence number and the order of sequence number is the order of write of the update data to the journal volume 171JP.

In the management area 611, the position to write a new next pair of a sequence number 601 and a pointer 602 is predetermined; for example, the pairs are written in the ascending order of the address in the management area 611. The pair subsequent to the pair written at the end address is written to the beginning address.

In the area (also referred to as journal area) for storing the sequence numbers 601 and the pointers 602, the sequence number 601 immediately before the area holding the initial value, namely, the sequence number at the top of the journal area indicates the latest update data. The sequence number 601 immediately after the area holding the initial value, namely, the sequence number in the rear end of the journal area indicates the earliest update data.

The MPPK 120A in the first storage system 10A transfers the update data held in the journal volume 171JP to the second storage system 10B in order of update (write) in response to a copy request for the update data from the MPPK 120B in the second storage system 10B. The MPPK 120B in the storage system 10B sequentially stores the update data received at the FEPK 110B to the journal volume 171JS. In this drawing, caching the data to the cache memory 131 is omitted. The MPPK 120B writes the update data stored in the journal volume 171JS to the secondary volume 171S in the order of update with predetermined timing.

Like the journal volume 171JP, the journal volume 171JS in the second storage system 10B includes a management area and a data area to store journal management data and update data, respectively.

The MPPK 120B stores transferred update data in the journal volume 171JS and then writes transferred sequence numbers and pointers to update the management data. The configuration of the management data is the same as that in the journal volume 171 JP. When update data in the journal volume 171JS is written to the secondary volume 171S, the MPPK 120B alters the values of the relevant sequence number and the pointer to the initial values (invalid values).

Figure 34:
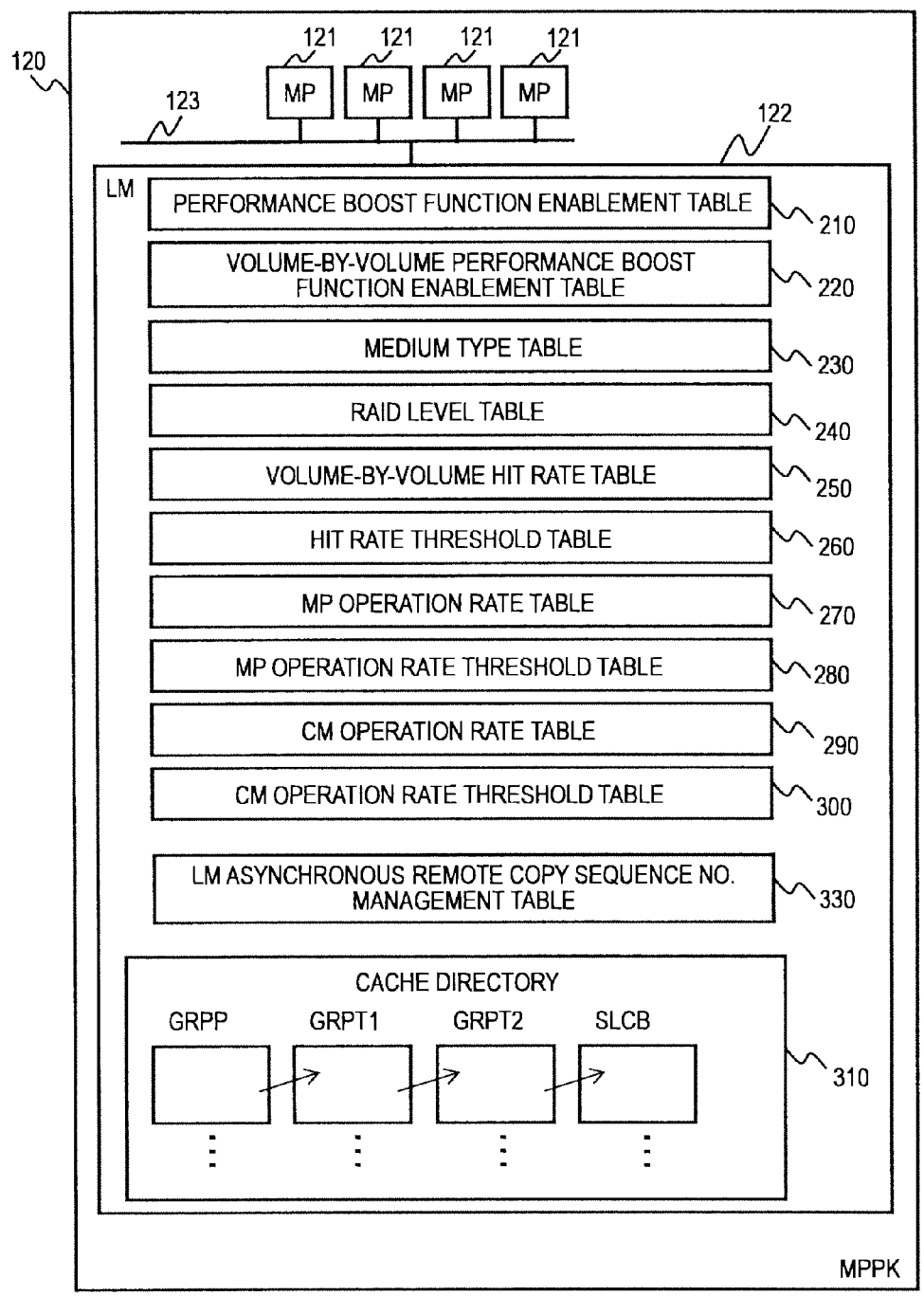
FIG. 34 is a drawing illustrating information held in a local memory in the third embodiment.
Figure 35:
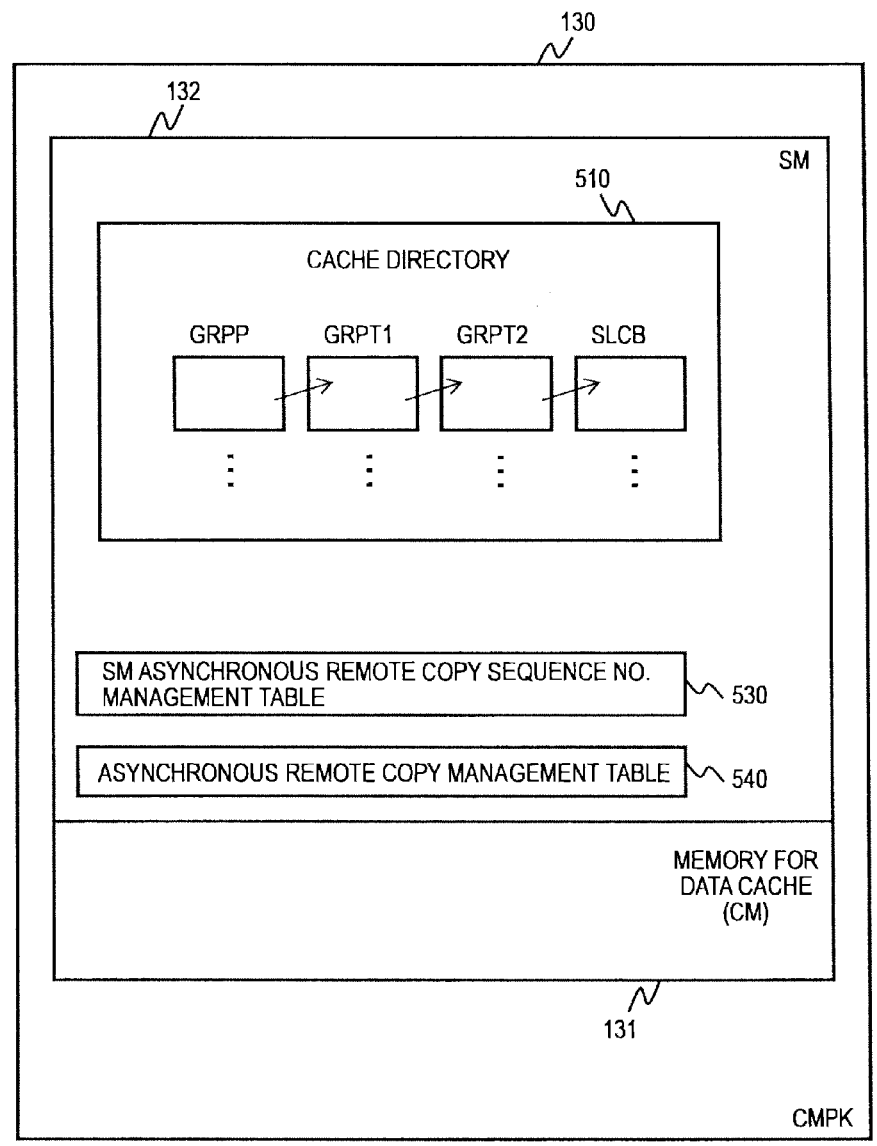
FIG. 35 is a drawing illustrating information held in a shared memory in the third embodiment.
Figure 38:
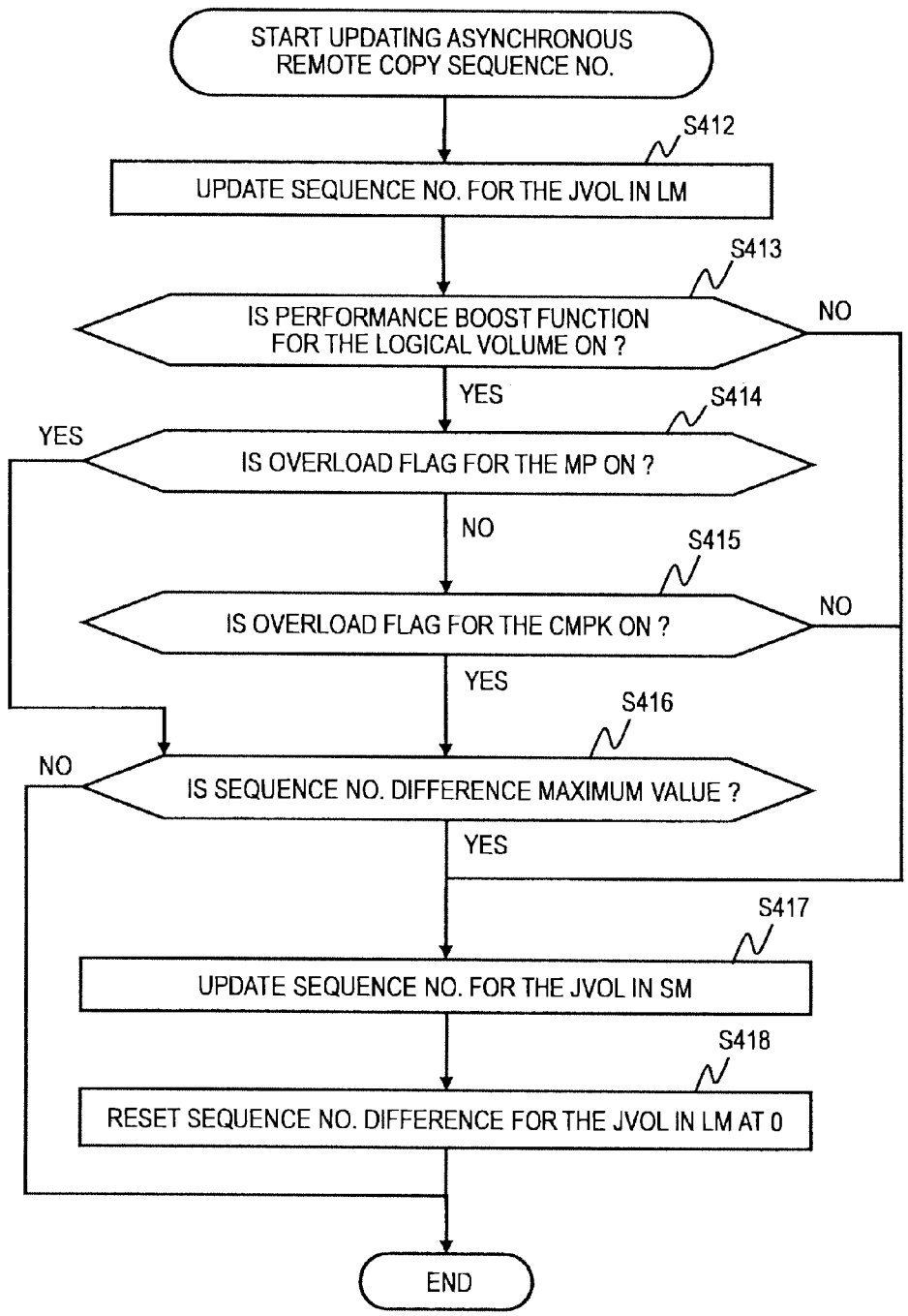
FIG. 38 is a flowchart of updating an asynchronous remote copy sequence number in the third embodiment.

FIG. 34 illustrates control information held by each local memory 122 in the first storage system 10A and the second storage system 10B. In this example, a LM asynchronous remote copy sequence number management table 330 is held in the local memory 122. FIG. 35 illustrates control information held in each shared memory 132 in the first storage system 10A and the second storage system 10B. In this embodiment, an asynchronous remote copy management table 540 and a SM asynchronous remote copy sequence number management table 530 are held.

The asynchronous remote copy management table 540 stores management information for managing pairs, specifically, management information for managing pairs of primary volumes and secondary volumes, information on paths for remote copy, and information on journal volumes to be grouped with the primary volumes and with the secondary volumes. The microprocessor 121 refers to this management table 540 to control execution of remote copy.

FIG. 36 exemplifies the LM asynchronous remote copy sequence number management table 330. The LM asynchronous copy sequence number management table 330 manages the latest sequence numbers in individual journal volumes in the local memory 122. A microprocessor 121 in the MPPK 120A can determine the sequence number of the update data to be newly written to a journal volume 171JS with reference to the LM asynchronous remote copy sequence management table 330.

The LM asynchronous remote copy sequence number management table 330 includes columns of JVOL numbers 331, sequence numbers 332, and sequence number differences 333. The JVOL numbers are identifiers of journal volumes in the first storage system 10A. The column of sequence numbers 332 stores data indicating the top sequence numbers in the JVOLs. The sequence number differences will be described later.

FIG. 37 exemplifies the SM asynchronous remote copy sequence number management table 530. The SM asynchronous remote copy sequence management table 530 manages sequence numbers in individual journal volumes in the shared memory 132. The SM asynchronous remote copy sequence number management table 530 includes columns of JVOL numbers 531 and sequence numbers 532.

The column of sequence numbers 532 holds data indicating the top sequence numbers in the JVOLs. The value in the sequence number column 532 for an entry may be the same as or different from the value in the sequence number column 332 for the corresponding sequence number in the local memory 122 (the example of FIGS. 36 and 37 shows different values in all entries). These values are updated either synchronously or asynchronously.

As shown in FIGS. 36 and 37, in each entry of JVOL, the value in the field of the sequence number difference column 333 is the difference between the value in the relevant field of the sequence number column 332 in the LM asynchronous remote copy sequence number management table 330 and the value in the relevant field in the sequence number column 532 in the SM asynchronous remote copy sequence number management table 530.

As understood from the above, a value in a field of the sequence number difference column 333 indicates the update of the sequence number in the JVOL after the previous update in the relevant field in the sequence number column 532 and the difference between the top sequence number at the previous update stored in the shared memory 132 and the latest top sequence number.

Every time update data is written to a journal volume, the microprocessor 121 in the MPPK 120A increments the values in the sequence number column 332 and the sequence number difference column 333 for the entry of the journal volume. Each field in the sequence number column 332 indicates the latest sequence number (the sequence number assigned for the last time) in the relevant journal volume. The value in each field of the sequence number column 332 returns to the minimum value when it is incremented from the maximum value.

The number of bits (the maximum value) for the sequence number difference column 333 is smaller than the number of bits (the maximum value) for the sequence number column 332. When the value in a field of the sequence number difference column 333 reaches to the maximum value, the microprocessor 121 reflects the update of the entry in the LM asynchronous remote copy sequence number management table 330 to the corresponding entry in the SM asynchronous remote copy sequence number management table 530.

Specifically, the microprocessor 121 changes the sequence number in the entry in the LM asynchronous remote copy sequence number management table 330 to the value equal to the sequence number in the corresponding entry in the SM asynchronous remote copy sequence number management table 530. The update value in the SM asynchronous remote copy sequence number management table 530 is the value obtained by adding the value in the relevant field in the sequence number difference column 333 to the value before the update.

Counting variation in the sequence number up to a predetermined number which is smaller than the maximum number of the sequence number in the local memory 122 and reflecting the variation in the sequence number in the local memory 122 to the sequence number in the shared memory 132 result in reduction in the number of accesses of the microprocessor 121 to the CMPK 130 to reduce the load to the microprocessor 121 and the CMPK 130 caused by the communication therebetween.

With reference to the flowchart of FIG. 3S, updating an asynchronous remote copy sequence number in this embodiment will be described. This process is executed by a microprocessor 121 in the MPPK 120A in charge of a journal volume 171JP.

When update data is written to a journal volume 171JP, the microprocessor 121 adds a new sequence number and a pointer to the management area 611 in the journal volume 171 JP with reference to the LM asynchronous remote copy sequence number management table 330. Moreover, the microprocessor 121 updates values in the sequence number and the sequence number difference (in this example, increments those values) for the entry of the journal volume 171JP in the LM asynchronous remote copy sequence number management table 330 (S412).

The microprocessor 121 determines whether the performance boost function for the volume is ON (S413). If the performance boost function is OFF (NO at S413), the microprocessor 121 proceeds to step S417. If the performance boost function is ON (YES at S413), the microprocessor 121 determines whether its own overload flag is ON (S414).

If the overload flag is ON (YES at S414), the microprocessor 121 proceeds to step S416. If the overload flag is OFF (NO at S414), the microprocessor 121 determines whether the overload flag for the CMPK 130A the microprocessor 121 accesses is ON (S415).

If the overload flag for the CMPK 130A is OFF (NO at S415), the microprocessor 121 proceeds to step S417. If the overload flag for the CMPK 130A is ON (YES at S415), the microprocessor 121 proceeds to step S416. The details of the steps S413 to S415 are the same as those explained in the second embodiment. Controlling the reflection of update of the control information depending on the loads at the microprocessor 121 and/or the CMPK 130A leads to appropriate update in the shared memory with less degradation in the system performance.

At S416, the microprocessor 121 determines whether the sequence number difference in the journal volume 171JP is the maximum value in the LM asynchronous remote copy sequence number management table 330. If the value is not the maximum value (NO at S416), the microprocessor 121 terminates the process.

If the value is the maximum value (YES at S416), the microprocessor 121 updates the sequence number for the journal volume 171JP in the SM asynchronous remote copy sequence management table 530 (S417). Specifically, the microprocessor 121 updates the sequence number for the journal volume 171JP with the value obtained by adding the value of the sequence number difference to the current sequence number. At S418, the microprocessor 121 updates (initializes) the value of the field in the sequence number difference, which has reached the maximum value, with a zero value.

If the updating the sequence number in the shared memory 132 using the foregoing sequence number difference (performance boost function) is not used, the updating the SM asynchronous remote copy sequence number management table 530 is synchronized with the updating the LM asynchronous remote copy sequence number management table 330.

If a failure occurs to the MPPK 120A, the LM asynchronous remote copy sequence number management table 330 in the local memory 122 gets lost. As previously described, this table 330 includes the latest information to indicate the top sequence numbers of journal volumes. For accurate remote copy, the latest top sequence numbers in journal management data are necessary.

Figure 39:
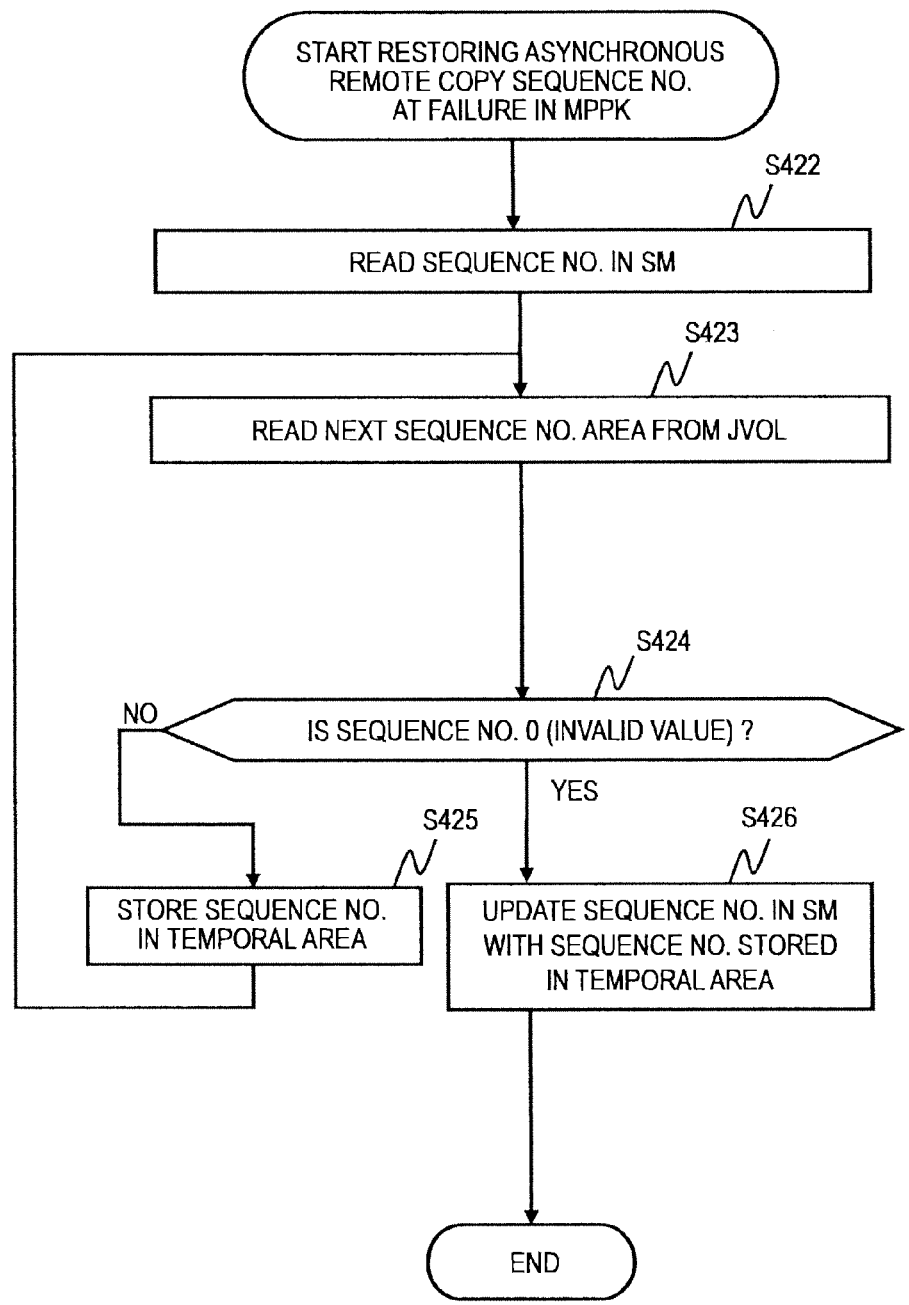
FIG. 39 is a flowchart of restoring an asynchronous remote copy sequence number at an MPPK failure in the third embodiment.

In the first storage system 10A in this embodiment, an MPPK 120A different from the MPPK 120A that has developed a failure refers to the management area 611 in the journal volume 171JP and ascertains the latest top sequence number indicating the top of the journal area. With reference to the flowchart of FIG. 39, restoring an asynchronous remote copy sequence number at an occurrence of an MPPK failure will be explained.

A microprocessor 121 in the normal MPPK 120A that has succeeded the failed MPPK 120A selects a journal volume from the SM asynchronous remote copy sequence number management table 530 held in the shared memory 132 and reads the sequence number (S422). The microprocessor 121 reads data in the sequence number area subsequent to the area of the foregoing sequence number in the journal volume (S423).

The microprocessor 121 determines whether the sequence number read at step S423 is a zero value (invalid value) (S424). If the sequence number is not a zero value (NO at S424), the microprocessor 121 stores the obtained sequence number in a temporal area (typically, an area in the local memory 122) (S425).

If the sequence number is a zero value (YES at S424), the area is an unused area and the microprocessor 121 updates the sequence number of the corresponding journal volume in the SM asynchronous remote copy sequence number management table 530 with the sequence number stored in the temporal area. If the sequence number in the SM asynchronous remote copy sequence number management table 530 is the latest top sequence number, update is not necessary. The microprocessor 121 performs the above-described updating for all of the journal volumes which the failed MPPK 120A was in charge of.

By the above-described flow, the SM asynchronous remote copy sequence number management table 530 is updated to include the latest information so that another MPPK 120A can take over the assignment of the failed MPPK 120A to perform accurate asynchronous remote copy as before.

The foregoing values stored in the sequence number management tables 330 and 530 are merely examples; any values may be stored as long as they can indicate the top sequence numbers or the differences between the top sequence numbers in the tables 330 and 530.

Fourth Embodiment

Figure 40:
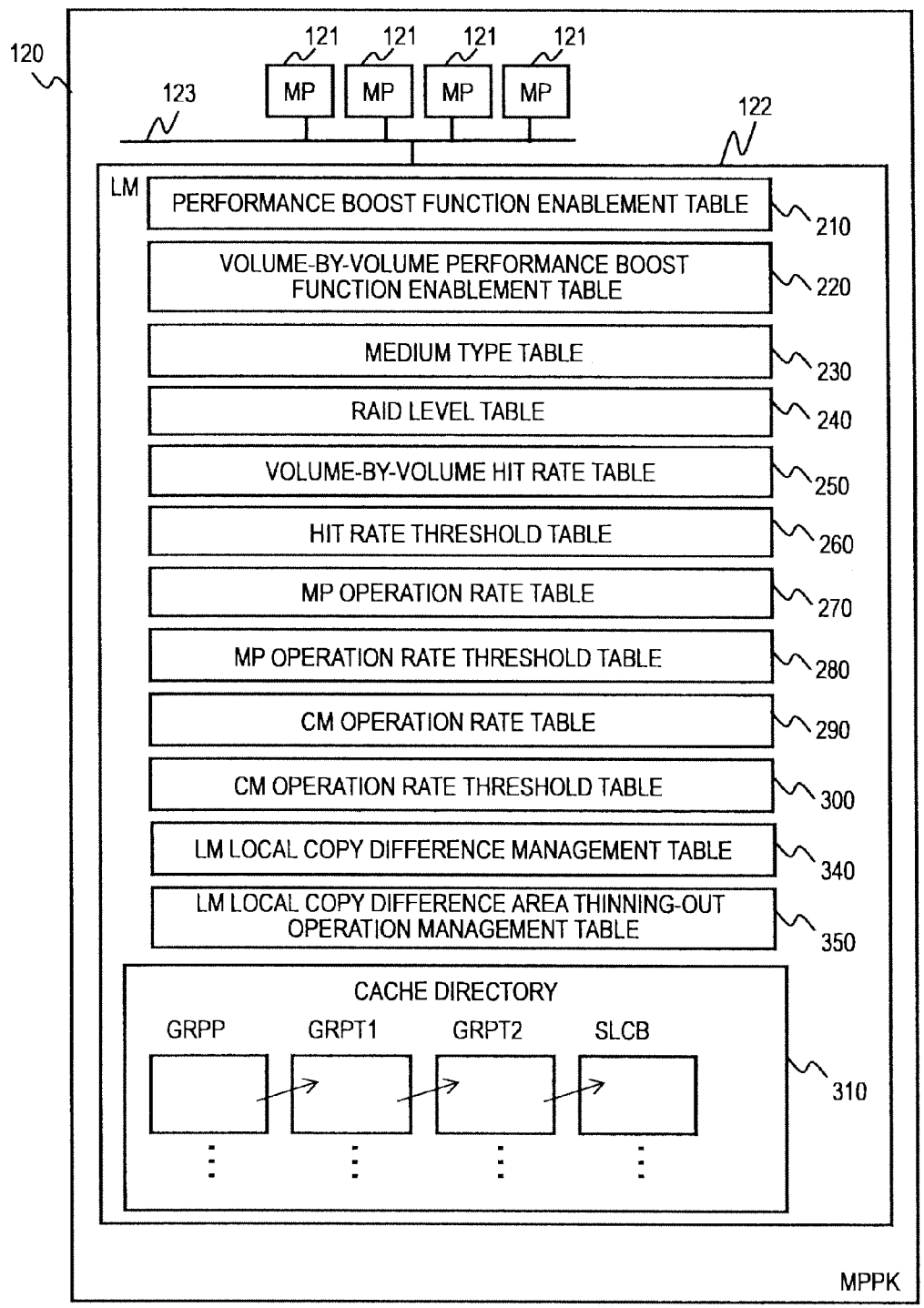
FIG. 40 is a drawing illustrating information held in a local memory in the fourth embodiment.

Hereinafter, an example of this invention applied to asynchronous local copy will be explained. Hereinafter, differences from the foregoing other embodiments will be mainly explained. FIG. 40 illustrates control information held in each local memory 122 in this embodiment. The local memory 122 holds a LM local copy difference management table 340 and a LM local copy difference area thinning-out operation management table 350.

Figure 41:
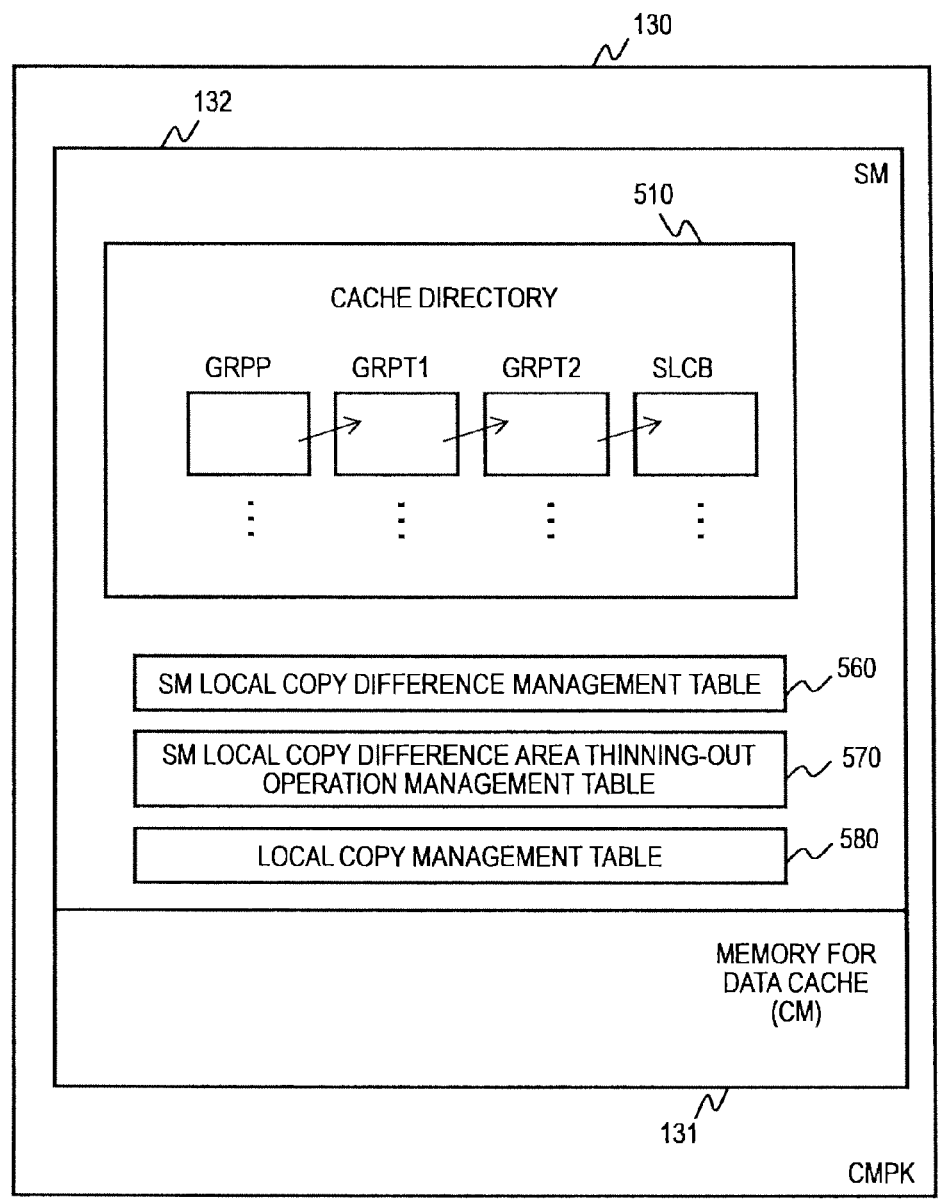
FIG. 41 is a drawing illustrating information held in a shared memory in the fourth embodiment.

FIG. 41 illustrates control information in each shared memory 132 in this embodiment. The control information in the shared memory 132 includes a SM local copy difference management table 560, a SM local copy difference area thinning-out operation management table 570, and a local copy management table 580. A plurality of MPPKs 120 can refer to the tables 560, 570, and 580 in the shared memory 132. In particular, the SM local copy difference management table 560 and the SM local copy difference area thinning-out operation management table 570 are referred to by a different MPPK 120 at a failure of an MPPK 120.

The local copy management table 580 includes management information for managing pairs of primary volumes and secondary volumes. For example, it includes identification information on primary volumes and secondary volumes that constitute individual pairs, address information on them, and information on copy policies. The microprocessor 121 controls the execution of local copy with reference to the local copy management table 580.

The SM local copy difference management table 560 and the SM local copy difference area thinning-out operation management table 570 in the shared memory 132 are the backups of the LM local copy difference management table 340 and the LM local copy difference area thinning-out operation management table 350, respectively, in the local memory 122. The microprocessor 121 reflects update of the tables 340 and 350 in the local memory 122 to the tables 560 and 570 in the shared memory 132 in accordance with predetermined rules.

FIG. 42 exemplifies the LM local copy difference management table 340. The LM local copy difference management table 340 includes columns of volume numbers 341, logical addresses 342, and bit strings representing difference 343. The volume numbers are identifiers of primary volumes in the storage system. Each entry represents a storage area (address range) having a given size in a volume. The logical addresses indicate the beginning logical addresses of the storage areas of the entries. In this example, the sizes of the storage areas are the same among the entries.

A bit string representing difference indicates whether any difference in data exists between the storage area in the primary volume of the entry and the associated storage area in the secondary volume, that is, whether update in the primary volume has been reflected to the secondary volume.

Each bit (also referred to as bit representing difference) in a bit string representing difference indicates whether the data in an area segment in the storage area in the primary volume of the entry are different from those in the associated area segment in the secondary volume. In this example, the area segments corresponding to the individual bits have the same size. In this example, a bit value 1 in a bit string representing difference means the data in the corresponding area in the primary volume are different from those in the secondary volume.

The microprocessor 121 copies the update data in the primary volume to the secondary volume with predetermined timing (asynchronous local copy). In the asynchronous local copy, the microprocessor 121 refers to the LM local copy difference management table 340 and copies the data in the area segments in the primary volume corresponding to the bits representing difference having the values of 1 to the secondary volume.

In response to the asynchronous local copy, the microprocessor 121 updates the bits representing difference for the area segments where the updates have been reflected to the secondary volume with zero values in the LM local copy difference management table 340.

FIG. 43 exemplifies the SM local copy difference management table 560. The SM local copy difference management table 560 is a backup table of the LM local copy difference management table 340; it has the same configuration as the LM local copy difference management table 340. Specifically, it has columns of volume numbers 561, logical addresses 562, and bit strings representing difference 563.

The microprocessor 121 copies updates in the LM local copy difference management table 340 to the SM local copy difference management table 560 in accordance with predetermined rules. In this example, updating the LM local copy difference management table 340 caused by asynchronous local copy from the primary volume to the secondary volume is synchronized with updating the SM local copy difference management table 560. The updating the SM local copy difference management table 560 in response to updating by data write to the primary volume will be described later.

FIG. 44 exemplifies the LM local copy difference area thinning-out operation management table 350. The LM local copy difference area thinning-out operation management table 350 includes columns of volume numbers 351, logical addresses 352, and bit strings representing thinning-out operation 353. Each entry represents a storage area (address area) having a given size in a volume.

The logical addresses indicate the beginning logical addresses of the storage areas of the entries. In this example, the sizes of the storage areas are the same among the entries. The storage areas of the entries in the LM local copy difference area thinning-out operation management table 350 are larger than the storage areas of the entries in the LM local copy difference management table 340.

A bit string representing thinning-out operation indicates whether to reflect update of the bit string representing difference in the LM local copy difference management table 340 to the corresponding bit string representing difference in the SM local copy difference management table 560. As described above, in the LM local copy difference area thinning-out operation management table 350, the bit string representing thinning-out operation is associated with the storage area in the logical volume.

Each bit (also referred to as bit representing thinning-out operation) in a bit string representing thinning-out operation is associated with an area segment in a storage area associated with the bit string representing thinning-out operation. Each bit in a bit string representing thinning-out operation is associated with one or more bits representing difference through the area segment associated therewith.

In this preferred example, a bit representing thinning-out operation is associated with a plurality of bits representing difference. The size of a storage area (address area) for an entry in the LM local copy difference area thinning-out operation management table 350 is larger than a storage area (address area) for an entry in the LM local copy difference management table 340. The number of bits in a bit string representing thinning-out operation is the same as or different from the number of bits in the bit string representing difference (they are the same in the example of FIGS. 43 and 44).

As described above, in the LM local copy difference management table 340, each bit representing difference is associated with a storage area. If at least a part of the storage area associated with a bit representing thinning-out operation matches a storage area of a bit representing difference, and the bit representing thinning-out operation is associated with the bit representing difference.

If a bit representing thinning-out operation indicates 1, update of the bit representing difference associated with the bit representing thinning-out operation in response to update (data write) of the primary volume in the local memory 122 is not reflected to the bit representing difference in the shared memory 132. Specifically, in response to a receipt of a write command to the primary volume, the microprocessor 121 refers to the bit representing thinning-out operation for the area designated by the write command in the LM local copy difference area thinning-out operation management table 350.

If the bit representing thinning-out operation indicates 1, the microprocessor 121 does not reflect the update of the corresponding bit representing difference in the LM local copy difference management table 340 to the SM local copy difference management table 560. This configuration lowers the load to the MPPK 120 and the CMPK 130 caused by communication between the MPPK 120 and the CMPK 130.

FIG. 45 exemplifies the SM local copy difference area thinning-out operation management table 570. The SM local copy difference area thinning-out operation management table 570 is a backup table of the LM local copy difference area thinning-out operation management table 350 and they have the same configuration. Specifically, the table 570 includes columns of volume numbers 571, logical addresses 572, and bit strings representing thinning-out operation 573. The microprocessor 121 updates the SM local copy difference area thinning-out operation management table 570 in synchronization with update of the LM local copy difference area thinning-out operation management table 350.

Figure 46:
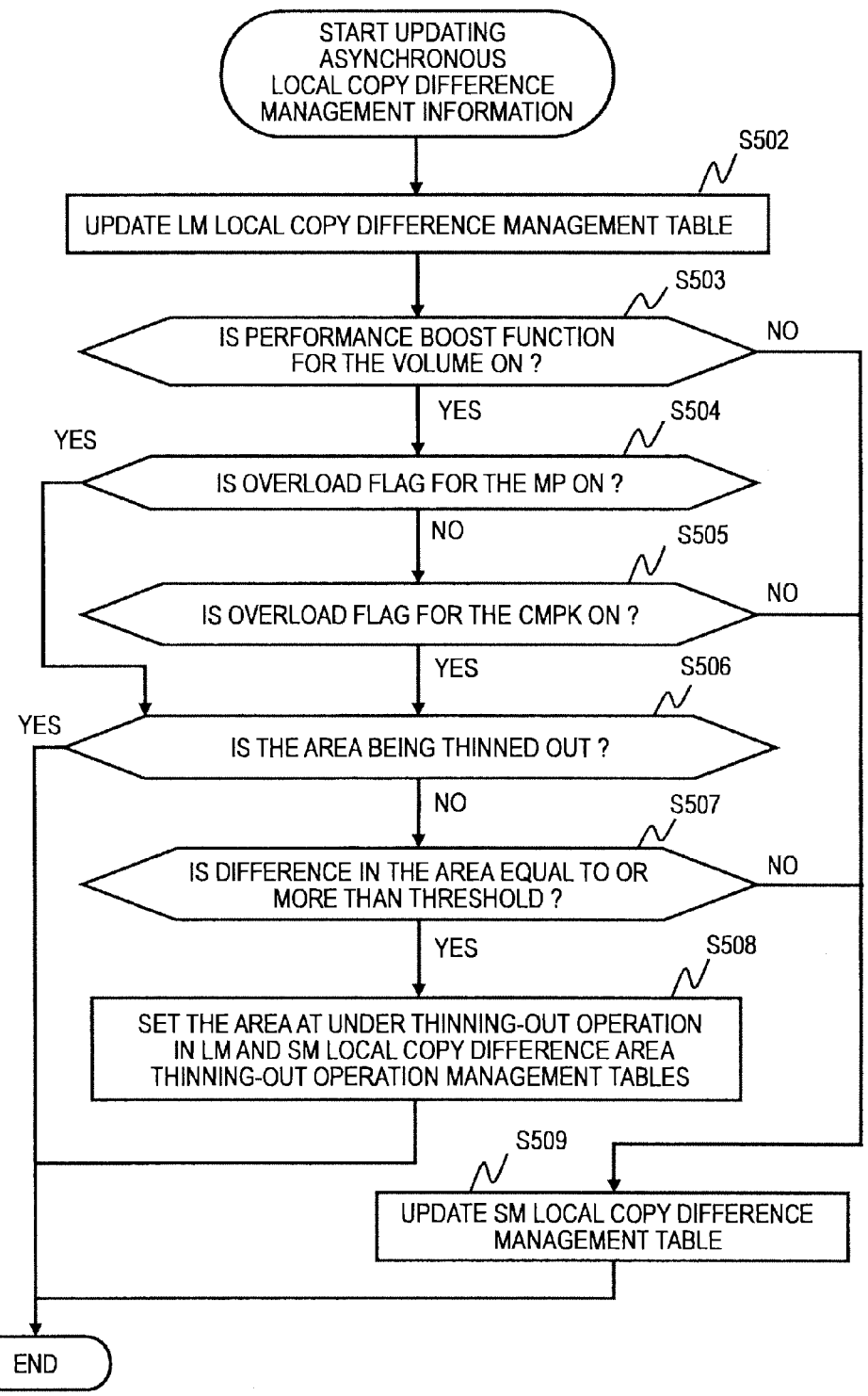
FIG. 46 is a flowchart of updating asynchronous local copy difference management information in the fourth embodiment.

Now with reference to the flowchart of FIG. 46, updating asynchronous local copy difference management information will be explained. Upon a data write to a primary volume, the microprocessor 121 updates the LM local copy difference management table 340 (S502). Specifically, it updates the bit representing difference associated with the updated area in the primary volume.

The microprocessor 121 determines whether the performance boost function for the volume is ON (S503). If the performance boost function is OFF (NO at S503), the microprocessor 121 proceeds to step S509 and updates the SM local copy difference management table 560 (synchronous update). If the performance boost function is ON (YES at S503), the microprocessor 121 determines whether its own overload flag is ON (S504).

If the overload flag is ON (YES at S504), the microprocessor 121 proceeds to step S506. If the overload flag is OFF (NO at S504), the microprocessor 121 determines whether the overload flag for the CMPK 130 the microprocessor 121 accesses is ON (S505).

If the overload flag for the CMPK 130 is OFF (NO at S505), the microprocessor 121 proceeds to step S509 and updates the SM local copy difference management table 560. If the overload flag for the CMPK 130 is ON (YES at S505), the microprocessor 121 proceeds to step S506. The details of steps S503 to S505 are the same as those explained in the second embodiment; the control information in the shared memory 132 is appropriately updated while inhibit degradation in system performance.

At step S506, the microprocessor 121 determines whether the updated area in the primary volume is under thinning-out operation. Specifically, the microprocessor 121 refers to the LM local copy difference area thinning-out operation management table 350 to ascertain the bit representing thinning-out operation for the updated area. If the bit representing thinning-out operation indicates 1 (YES at S506), the microprocessor 121 omits to update the bit representing difference associated with the bit representing thinning-out operation in the SM local copy difference management table 560.

If the bit representing thinning-out operation indicates 0 (NO at S506), the microprocessor 121 determines whether the difference in the area associated with the bit representing thinning-out operation is equal to or more than a threshold (S507). Specifically, the microprocessor 121 refers to the LM local copy difference management table 340 to determine whether the number of bits indicating 1 is equal to or more than the threshold value in the bits representing difference associated with the bit representing thinning-out operation. The criteria for the determination will be explained later in the description of processing at an MPPK failure with reference to FIG. 47.

If the difference is less than the threshold (NO at S507), the microprocessor 121 updates the SM local copy difference management table 560 (S509). If the difference is equal to or more than the threshold (YES at S507), the microprocessor 121 updates the LM local copy difference area thinning-out operation management table 350 and the SM local copy difference area thinning-out operation management table 560 (S508). Specifically, the microprocessor 121 alters the bits representing thinning-out operation from 0 to 1 in the foregoing two tables 350 and 560.

Figure 47:
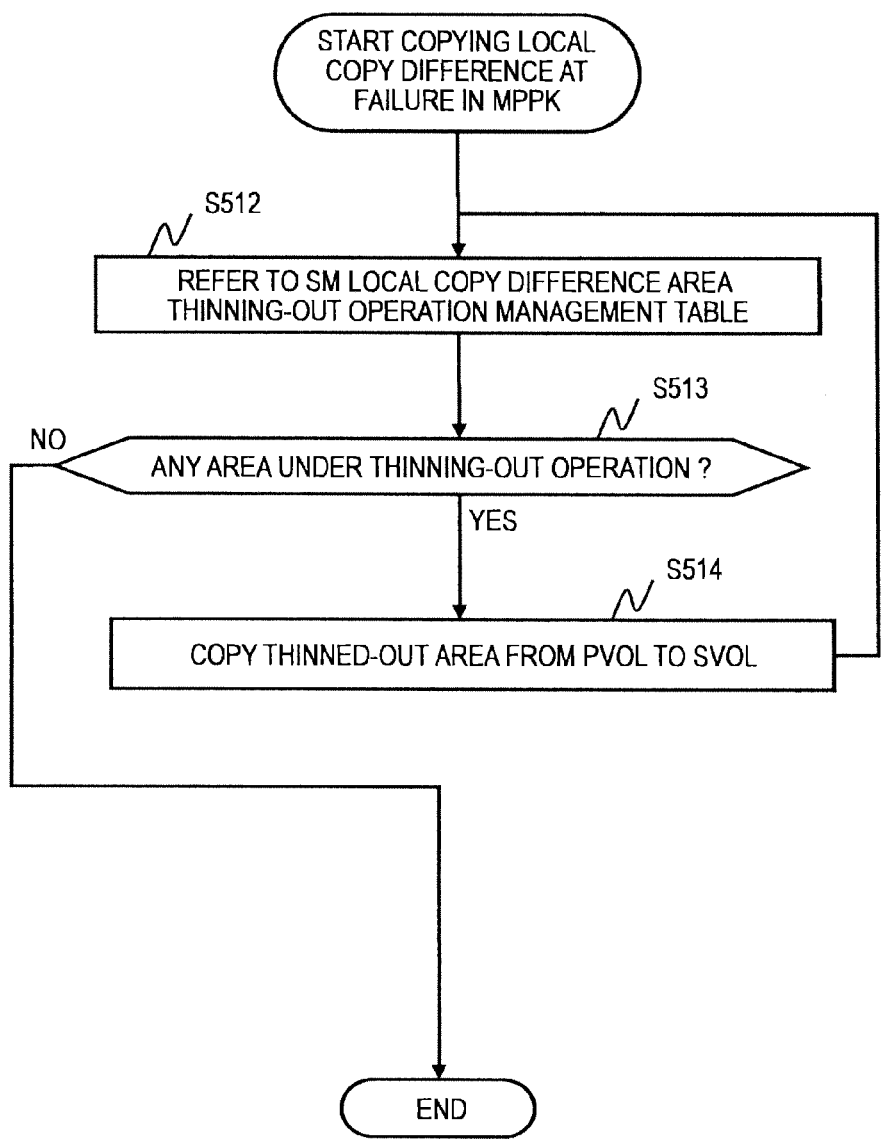
FIG. 47 is a flowchart of copying local copy difference at an MPPK failure in the fourth embodiment.

Next, with reference to the flowchart of FIG. 47, copying local copy difference at a failure in an MPPK 120 will be explained. If a failure occurs to an MPPK 120, a different MPPK 120 copies the difference in a copy pair which had been assigned to the failed MPPK 120 from the primary volume to the secondary volume. This operation secures the identity of the copy pair to achieve a normal asynchronous local copy thereafter.

A microprocessor 121 in the different MPPK 120 refers to the SM local copy difference area thinning-out operation management table 570 (S512) and determines whether any area under thinning-out operation remains (S513). The area under thinning-out operation is an area for which a bit representing thinning-out operation indicates 1. If no area under thinning-out operation remains (NO at S513), this flow ends. If any area under thinning-out operation remains (YES at S513), the microprocessor 121 copies the data in the area in the primary volume to the secondary volume (S514).

As described, the shared memory 132 does not hold the latest bit string representing difference associated with the bit representing thinning-out operation indicating 1. For this reason, when a failure occurs to an MPPK 120, all of the data in the area for which the bit representing thinning-out operation indicates 1 (ON) are copied from the primary volume to the secondary volume. This operation can make the data in the secondary volume identical to the data in the primary volume.

As explained with reference to the flowchart of FIG. 46, if the number of bits indicating 1 in the bits representing difference associated with a bit representing thinning-out operation is equal to or more than a threshold, this example sets the bit representing thinning-out operation at ON (1). Since, in case of a failure, all the data for which the associated bits representing thinning-out operation are ON are copied from the primary volume to the secondary volume, update of areas containing much update data is thinned out to lower the load caused by the update and to achieve efficient failure recovery processing.

In this embodiment, the configurations of the difference management tables and the thinning-out operation management tables are merely examples. As long as the areas with difference and the areas under thinning-out operation can be located, those information can be provided with any data. It can also achieve MPPK failure recovery to set all the bits representing difference in the LM/SM for areas under thinning-out operation at 1 instead of using the SM local copy difference area thinning-out operation management table 570.

Figure 48:
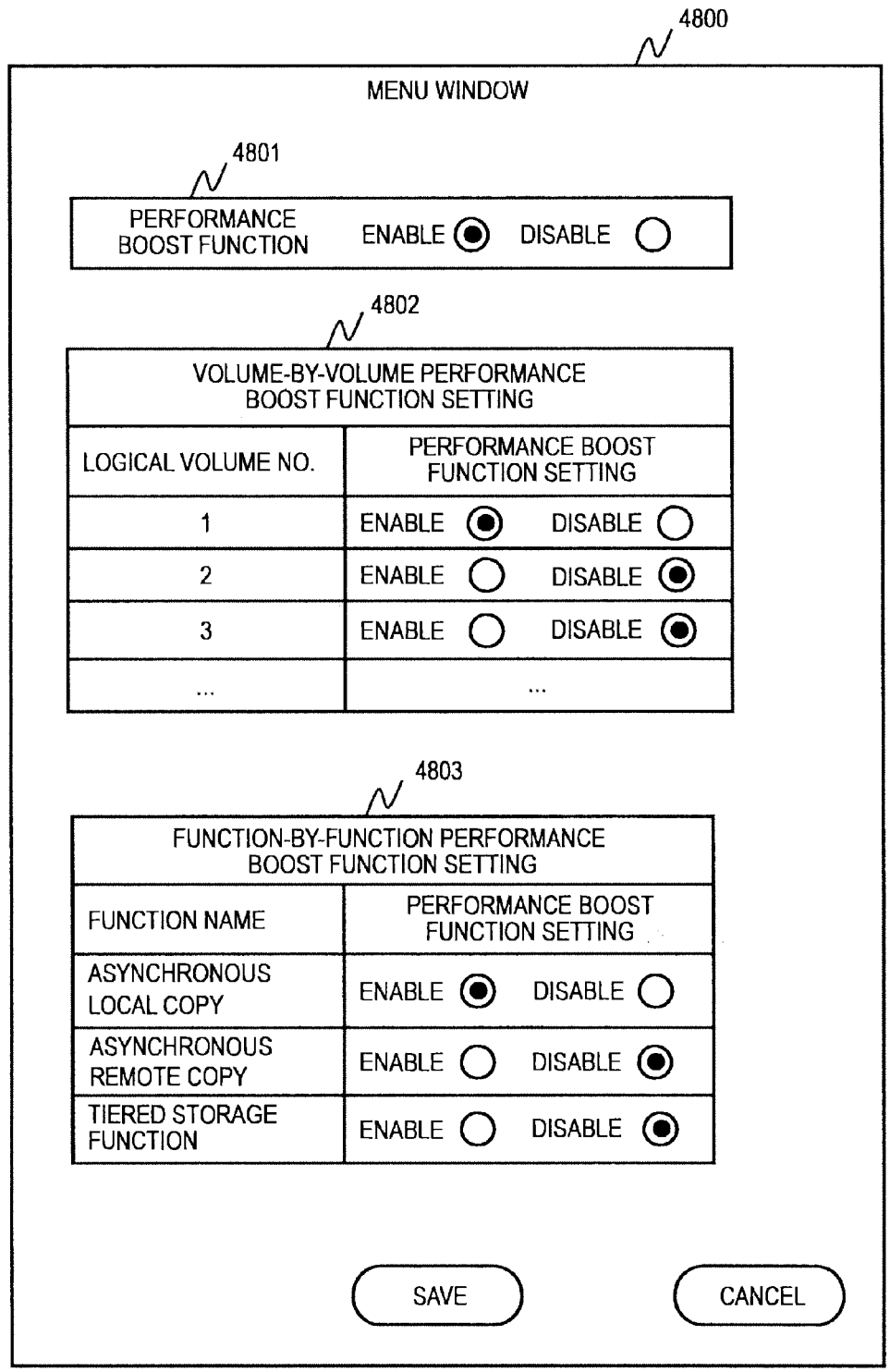
FIG. 48 is a drawing illustrating an example of a setting menu window in the management computer in the fourth embodiment.

FIG. 48 shows an example of a menu window 4800 for setting the performance boost functions applicable to the second to the fourth embodiments. The menu window 4800 includes a performance boost function setting area 4801, a volume-by-volume performance boost function setting area 4802, and a function-by-function performance boost function setting area 4803.

The administrator selects either "ENABLE" or "DISABLE" in the performance boost function setting area 4801 to enable or disable the performance boost functions in the storage system 10. This setting is reflected to the performance boost function enablement table 210.

The volume-by-volume performance boost function setting area 4802 enables selection of enabling/disabling the performance boost functions for each logical volume. The administrator can select, in the volume-by-volume performance boost function setting area 4802, enabling/disabling the performance boost functions for each logical volume with the input device 28. This setting is reflected to the volume-by-volume performance boost function enablement table 220.

The function-by-function performance boost function setting area 4803 enables separate selection of enabling/disabling the performance boost functions. The administrator can select, in the function-by-function performance boost function setting area 4803, enabling/disabling each performance boost function with the input device 28. This setting is reflected to the function-by-function performance boost function enablement table (not shown) in the storage system 10. If a boost function is enabled on all of the system, the volume, and the function, the performance boost function is used in the volume.

Fifth Embodiment

Figure 49:
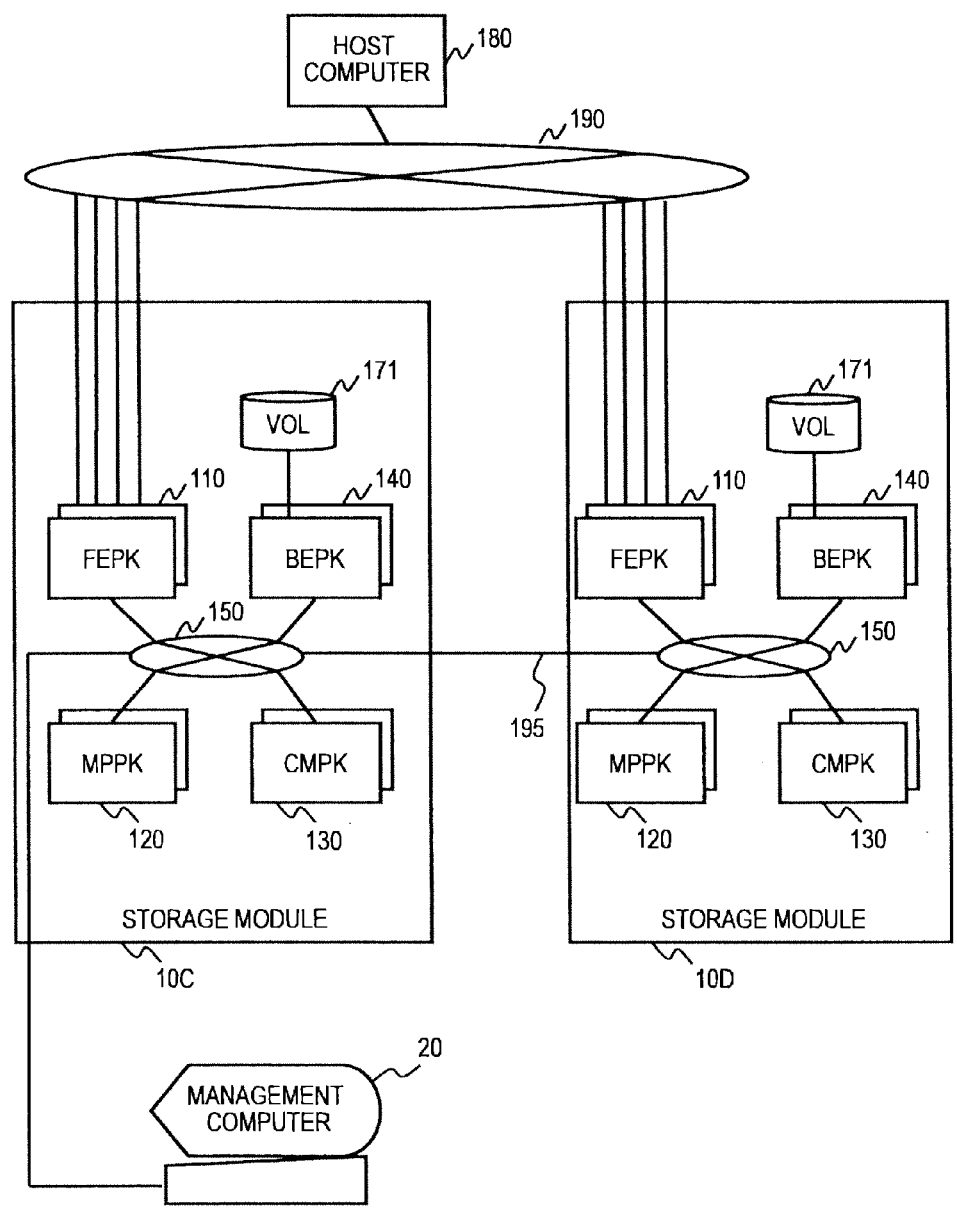
FIG. 49 is a drawing schematically illustrating a configuration of an overall computer system in the fifth embodiment.

In this embodiment, an example in which this invention is applied to a storage system including a plurality of storage modules connected with a switch. This embodiment mainly explains differences from the foregoing other embodiments. FIG. 49 schematically illustrates a configuration of a computer system in this embodiment. A storage module 10C and a storage module 10D are connected to be able to communicate with each other with an inter-module path (switch) 195 (also referred to as X path).

The configuration of the storage modules 10C and 10D each in FIG. 49 is the same as that of the storage system 10 described with reference to FIG. 1. In this example, two connected modules constitute a storage system; but three or more modules may constitute a storage system.

The X path 195 (switch) connecting the storage modules 10C and 10D functions as the same path as the one in the internal network 150; any package in either module can communicate with any package or medium in the other module through the X path 195. The host computer 180 can access either storage module.

The X path uses a narrower bandwidth than the internal network 150 and has a lower data transfer capability. For this reason, the X path is likely to cause a bottle neck in data transfer between packages. Accordingly, determining whether to turn ON or OFF the performance boost function based on the load to the X path achieves smaller degradation in performance in the storage system.

A microprocessor 121 in this embodiment refers to the operation rate of the X path 195 in controlling enabling/disabling the performance boost function. This configuration achieves appropriate improvement in system performance in a storage system composed of a plurality of modules.

Figure 50:
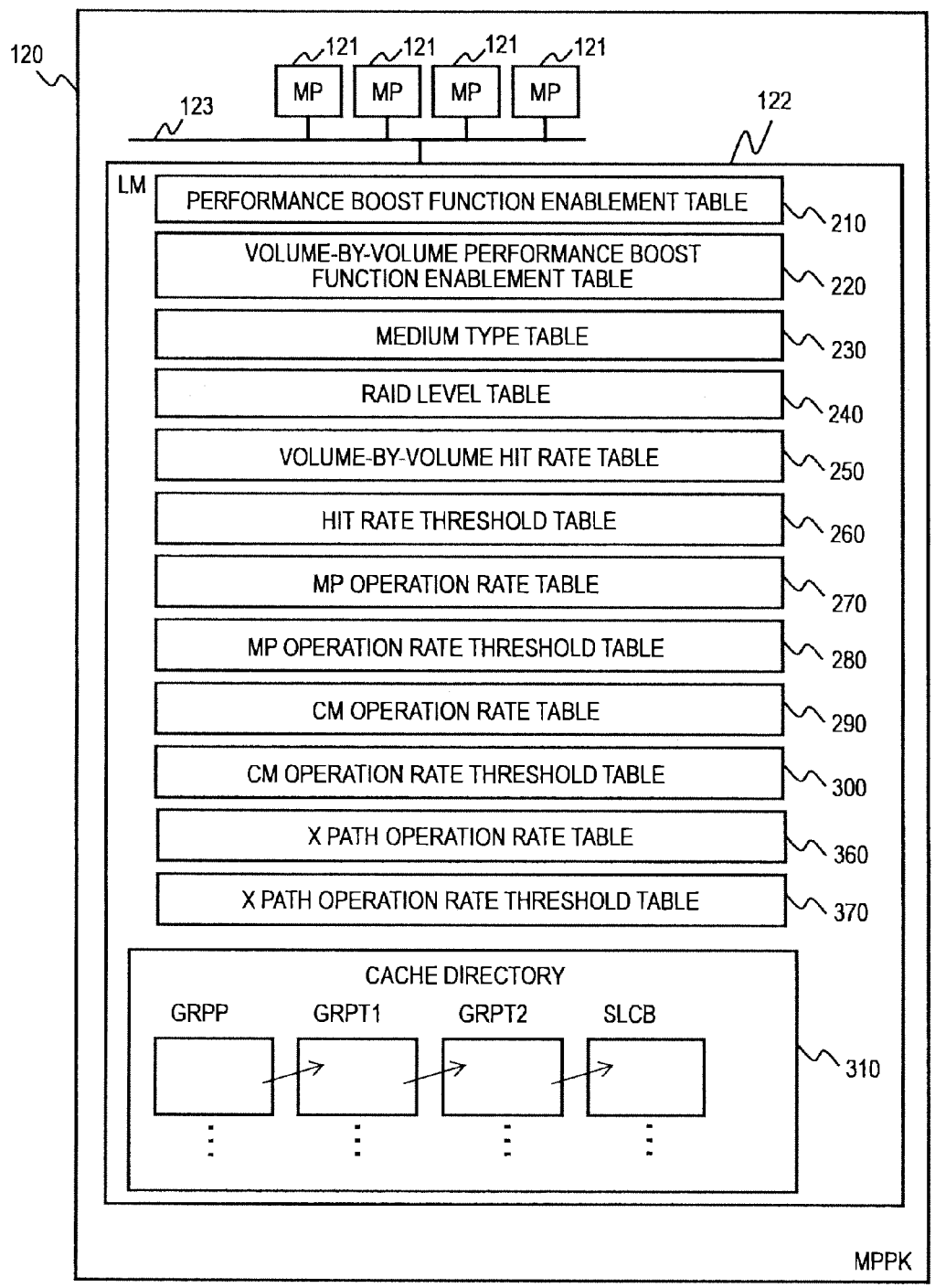
FIG. 50 is a drawing illustrating information held in a local memory in the fifth embodiment.

FIG. 50 illustrates control information held in a local memory 122 in this embodiment. In FIG. 50, an X path operation rate table 360 and an X path operation rate threshold table 370 are held in the local memory 122. FIG. 51 exemplifies the X path operation rate table 360. FIG. 52 exemplifies the X path operation rate threshold table 370.

The X path operation rate table 360 manages the operation rate of the X path. In this example, the X path operation rate table 360 includes columns of X path numbers 361, operation rates 362, and overload determination flags 363. The X path numbers are identifiers to uniquely identify X paths in the system. In the example of FIG. 51, the X path operation rate table 360 manages a plurality of X paths. This means that a plurality of X paths connect two or more storage modules. The plurality of X paths run through the same or different switches.

The operation rates are data transfer times per unit time. An operation rate of an X path is calculated by the controller of the X path and is stored in a register. The microprocessor 121 obtains the operation rates of the X paths from the registers in the switches and stores them in the X path operation rate table 360.

The microprocessor 121 compares the operation rates in the individual entries in the X path operation rate table 360 with a predetermined X path operation rate threshold to determine the values for the overload determination flags. If an X path operation rate is equal to or higher than the threshold, the microprocessor 121 sets the overload determination flag at 1. The X path operation rate threshold is held in an X path operation rate threshold column in an X path operation rate threshold table 370. For example, the X path operation rate threshold table 370 is loaded from a non-volatile storage area in the storage system and the value is determined by the administrator.

Figure 53:
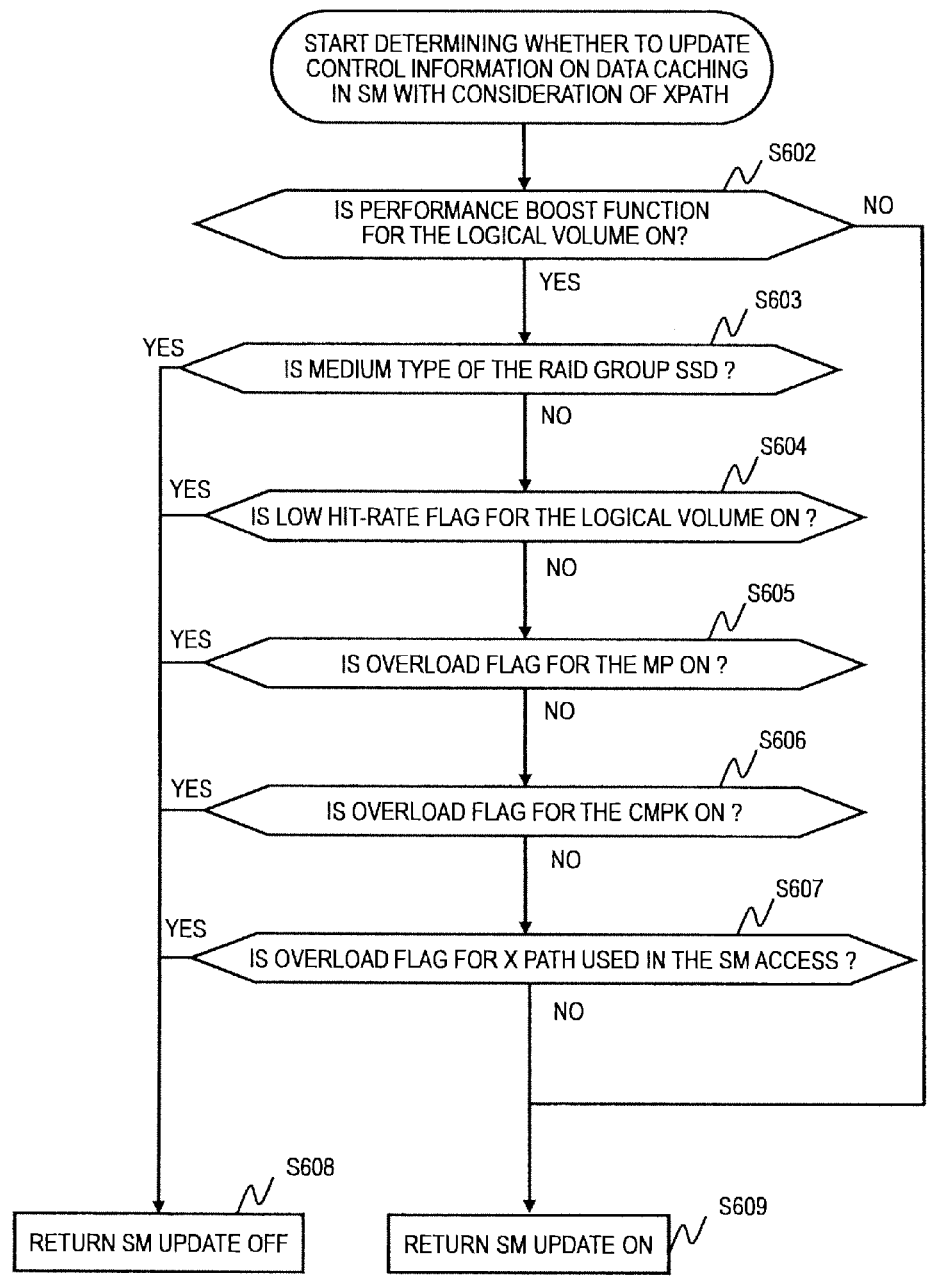
FIG. 53 is a flowchart of determining whether to update SM control information on data caching with consideration of an X path in the fifth embodiment.

Now with reference to the flowchart of FIG. 53, determining update of control information on data caching in the shared memory 132 with consideration of the operation rate of an X path. The basic part is the same as the first embodiment. In the flowchart of FIG. 53, the steps other than step S607 are the same as those in the flowchart of FIG. 16 in the first embodiment; accordingly, the explanation is omitted.

At step S607, the microprocessor 121 refers to the X path operation rate table 360 to determine whether the overload flag for the X path used for an access to the shared memory 132 is 1 (ON). The control information indicating the relationship between the CMPK 130 that the microprocessor 121 accesses and the X path to be used is held in the local memory 122 and the microprocessor 121 can locate the X path to be used.

If the overload flag is ON (YES at S607), the microprocessor 121 determines not to update the control information in the shared memory 132 (S608). If the overload flag is 0 (OFF) (NO at S607), the microprocessor 121 determines to update the control information in the shared memory 132 (S609). This example refers to the operation rate of the X path in determining whether to update the data caching control information, but the other determinations explained in the other embodiments can also refer to the operation rate of the X path.

Figure 54:
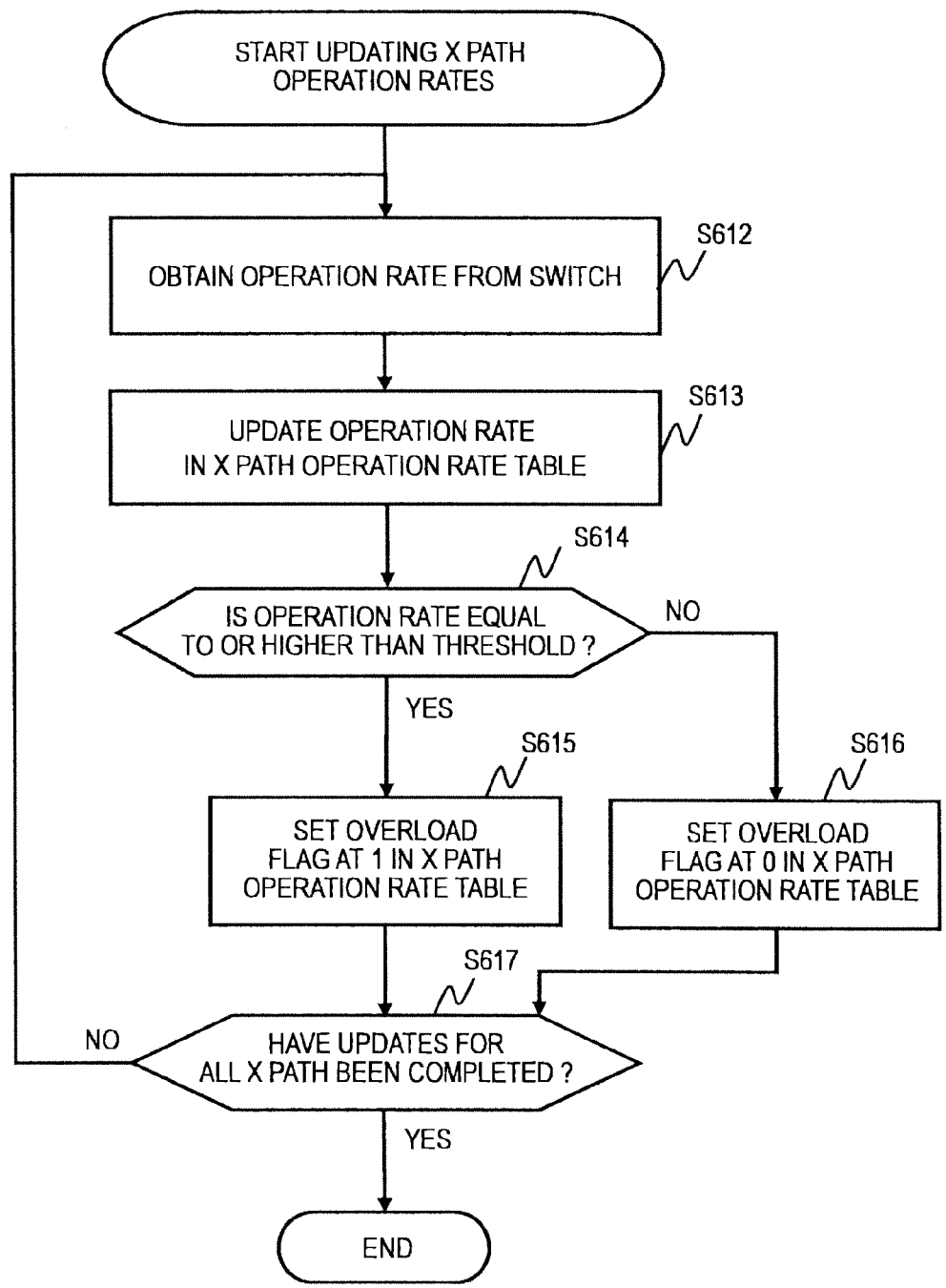
FIG. 54 is a flowchart of updating X path operation rates in the fifth embodiment.

Next, with reference to the flowchart of FIG. 54, updating the operation rates of X paths in the X path operation rate table 360 will be explained. Typically, this operation is performed on a periodic basis, for example, every one second. The microprocessor 121 selects an X path, the X path 195 by way of example, and obtains the operation rate of the X path 195 (S612).

The microprocessor 121 updates the value of the operation rate for the relevant entry in the X path operation rate table 360 (S613). The microprocessor 121 determines whether the obtained operation rate is equal to or higher than the X path operation rate threshold in the X path operation rate threshold table 370 (S614). If the operation rate is equal to or higher than the threshold (YES at S614), the microprocessor 121 sets the overload flag for the entry at 1 (ON) in the X path operation rate table 360 (S615).

On the other hand, if the operation rate is lower than the threshold (NO at S614), the microprocessor 121 sets the overload flag for the entry at 0 (OFF) in the X path operation rate table 360 (S616). The microprocessor 121 determines whether the operation rates for all the X paths have been updated (S617) and if determination on all the X paths has been completed (YES at S617), it terminates the flow. If any X path on which determination has not been made is left (NO at S617), it selects one of the remaining X paths and repeats this flow.

Sixth Embodiment

This embodiment explains a configuration in which an MPPK 120 is accessible to a plurality of shared memory areas distributed to a plurality of different kinds of devices. In this embodiment, differences from the foregoing other embodiments are mainly explained.

Figure 55:
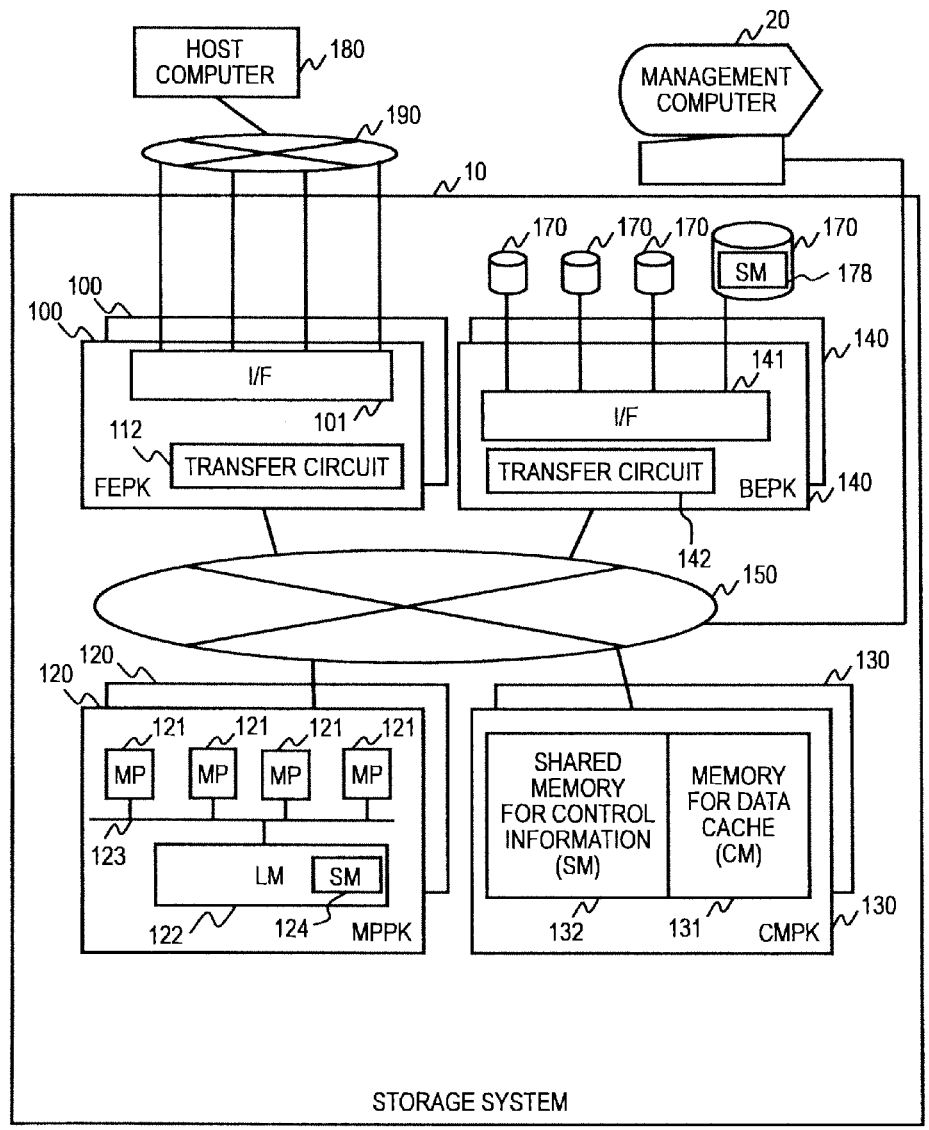
FIG. 55 is a drawing schematically illustrating an overall configuration of a computer system in the sixth embodiment.

FIG. 55 schematically illustrates a configuration of a computer system in this embodiment. In a storage system 10, a plurality of shared memories (storage areas) are provided in a plurality of different devices. Specifically, in addition to shared memories 132 in CMPKs 130, shared memories 124 are provided in MPPKs 120 and shared memories 178 are provided in storage drives 170. The area of a shared memory 124 in an MPPK 120 is a storage area in a local memory 122. The area of a shared memory 178 in a storage drive 170 is a storage area of a non-volatile storage medium in the storage drive.

Figure 56:
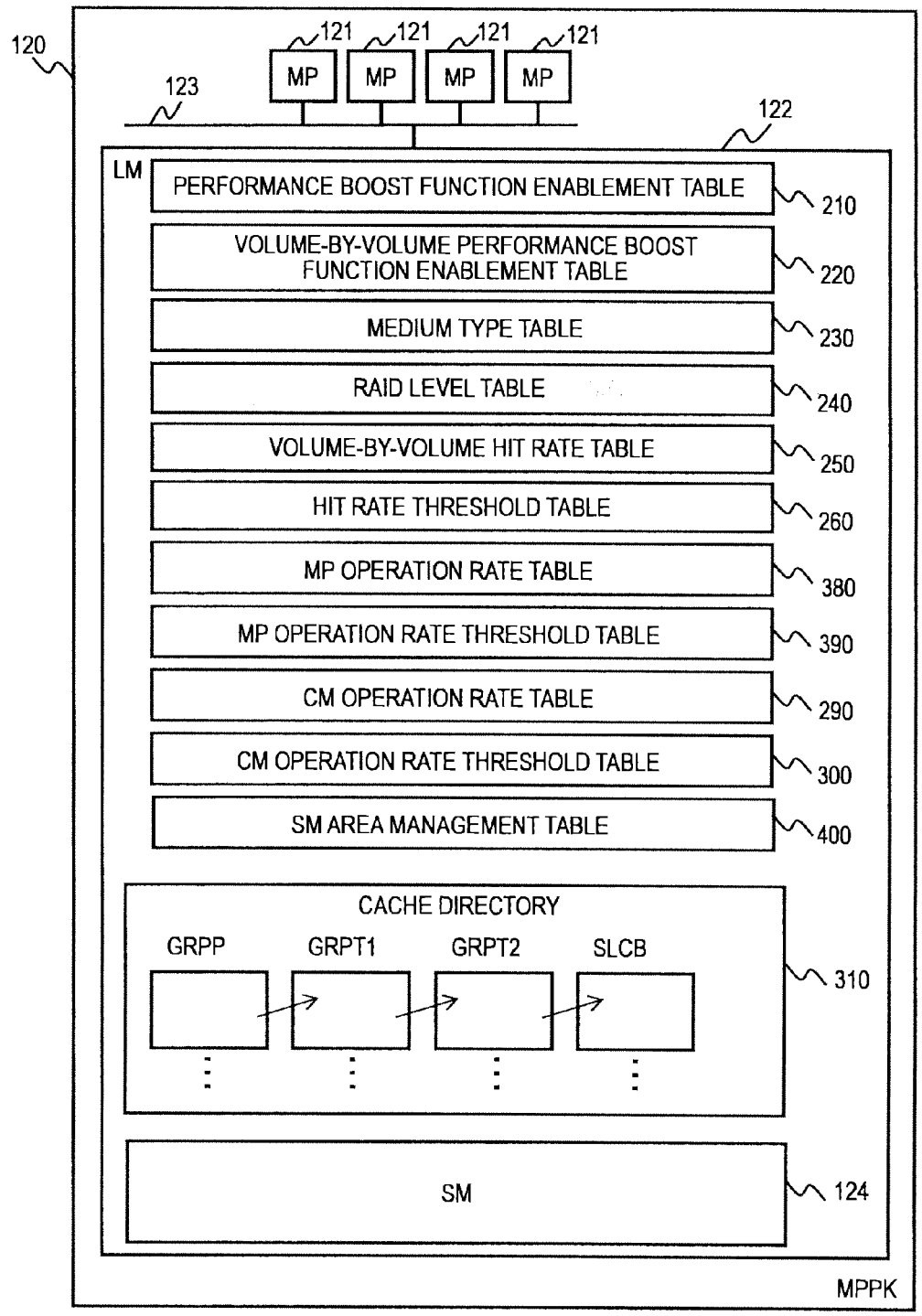
FIG. 56 is a drawing illustrating information held in a local memory in the sixth embodiment.

FIG. 56 illustrates control information held in the local memory 122 in this embodiment. In FIG. 56, a MP operation rate table 380, a MP operation rate threshold table 390, and a SM area management table 400 are held in the local memory 122.

FIG. 57 exemplifies the MP operation rate table 380. The MP operation rate table 380 includes columns of MP numbers 381, operation rates 382, overload determination flags ONE 383, overload determination flags TWO 384, and operation times 385. The columns other than the overload determination flags TWO 384 are the same as those in the MP operation rate table 270 shown in FIG. 11. The column of overload determination flags ONE 383 corresponds to the column of overload determination flags 273.

FIG. 58 exemplifies the MP operation rate threshold table 390. The MP operation rate threshold table 390 includes columns of MP operation rate threshold ONE 391 and MP operation rate threshold TWO 392. The value of the MP operation rate threshold ONE is higher than the value of the MP operation rate threshold TWO. The MP operation rate threshold ONE corresponds to the MP operation rate threshold in FIG. 12.

Figure 59:
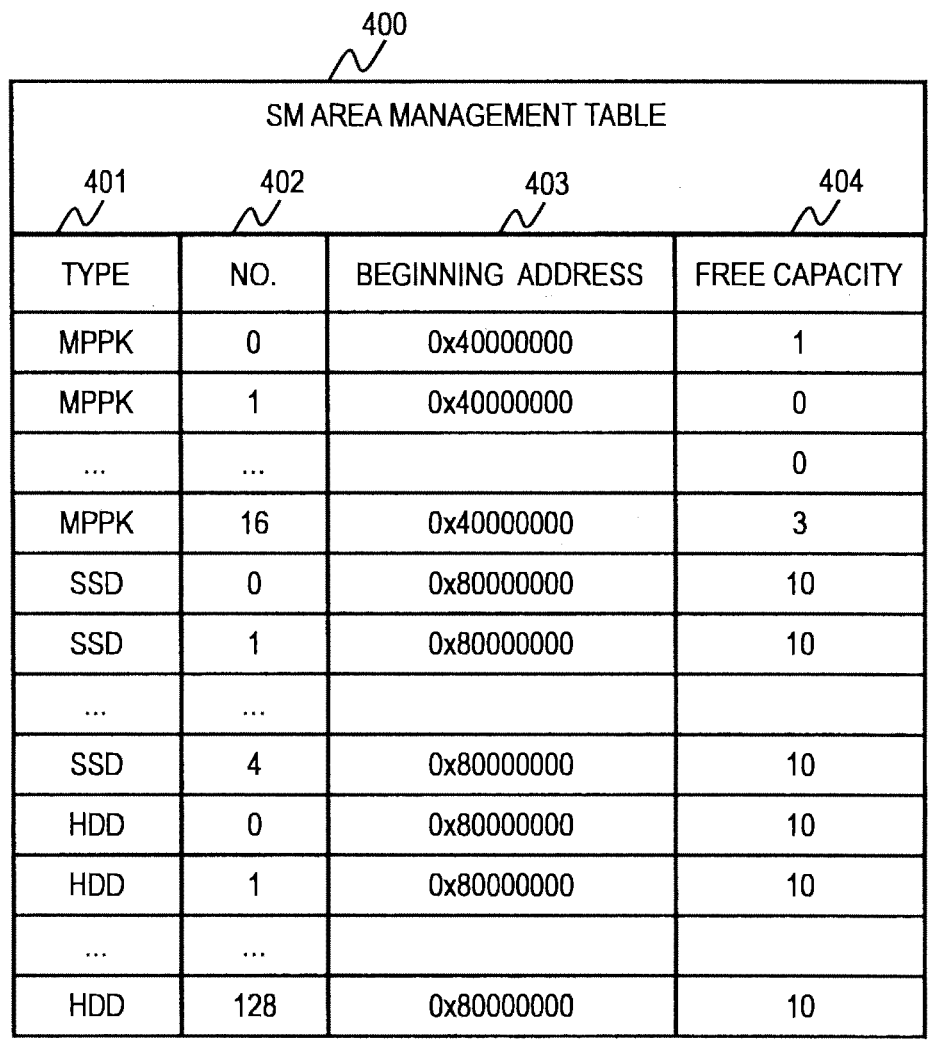
FIG. 59 is a drawing illustrating an example of a shared memory area management table in the sixth embodiment.

FIG. 59 exemplifies the SM area management table 400. The SM area management table 400 manages shared memory areas distributed in a plurality of devices. The SM area management table 400 includes columns of types 401, numbers 402, beginning addresses 403, and free capacities 404. The types indicate the types of devices to which shared memory areas are provided. The numbers are the identifiers among the same type of devices. The beginning addresses indicate the beginning addresses in the shared memory areas in the devices. The free capacities indicate free capacities in the shared memory areas.

In the columns of types 401, numbers 402, and beginning addresses 403, values are provided beforehand. A microprocessor 121 obtains values of the free capacities in the shared memory areas from the controllers in the individual devices (as to the MPPKs, the microprocessors 121) and stores them in the column of free capacities 404.

Figure 60A:
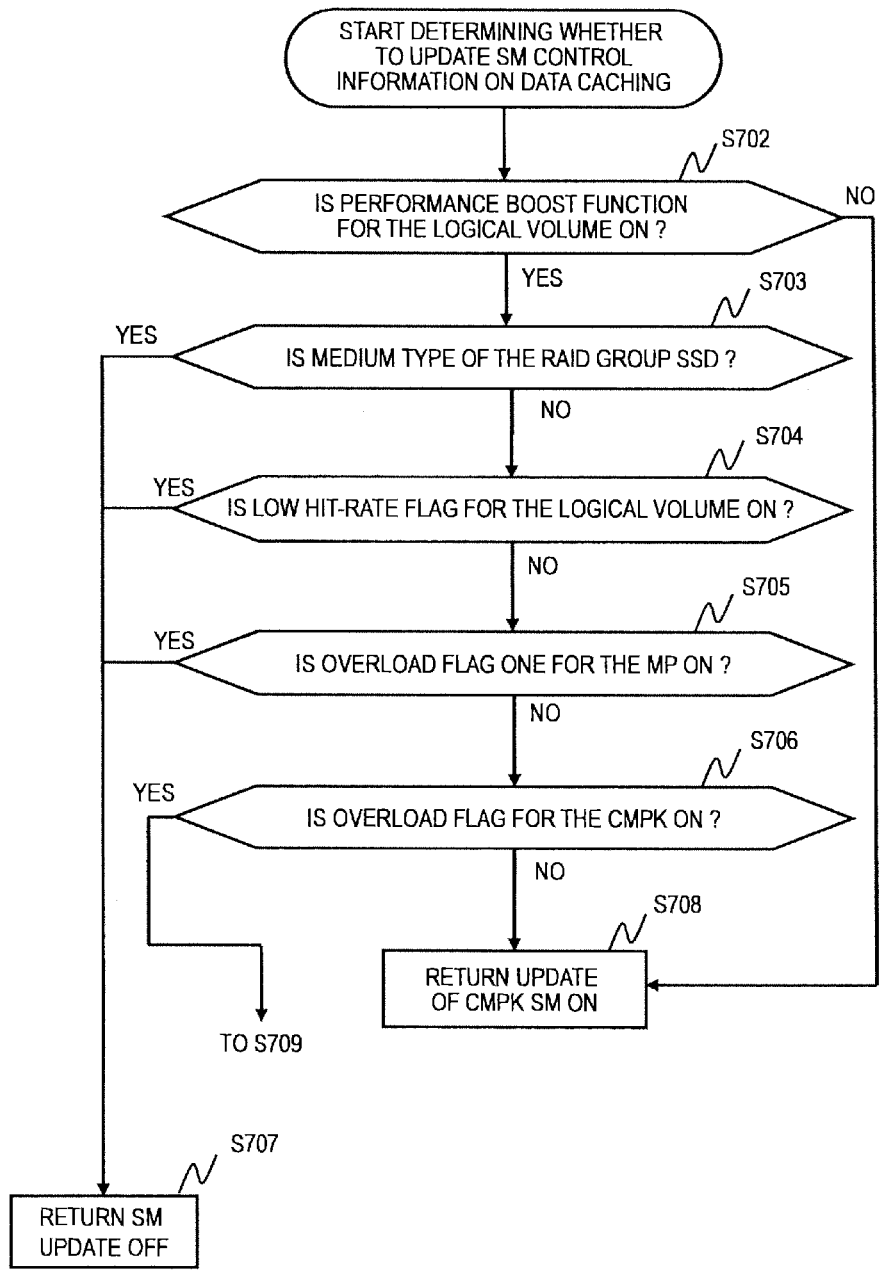
FIG. 60A is a part of a flowchart of determining whether to update SM control information on data caching in the sixth embodiment.

Now with reference to FIGS. 60A and 60B, determining whether to update the control information on data caching held in the shared memory areas will be explained. The steps S702 to S707 in the flowchart of FIG. 60A are the same as the steps S122 to S127 in the flowchart of FIG. 16. At step S706, however, if the overload flag for the CMPK 130 is ON (YES at S706), the microprocessor 121 proceeds to step S709 in FIG. 60B.

If the overload flag for the CMPK 130 is OFF (NO at S706) at step S706 or the performance boost function for the logical volume is OFF at step S702 (NO at S702), the microprocessor 121 determines to update the control information in the shared memory in the CMPK 130.

Figure 60B:
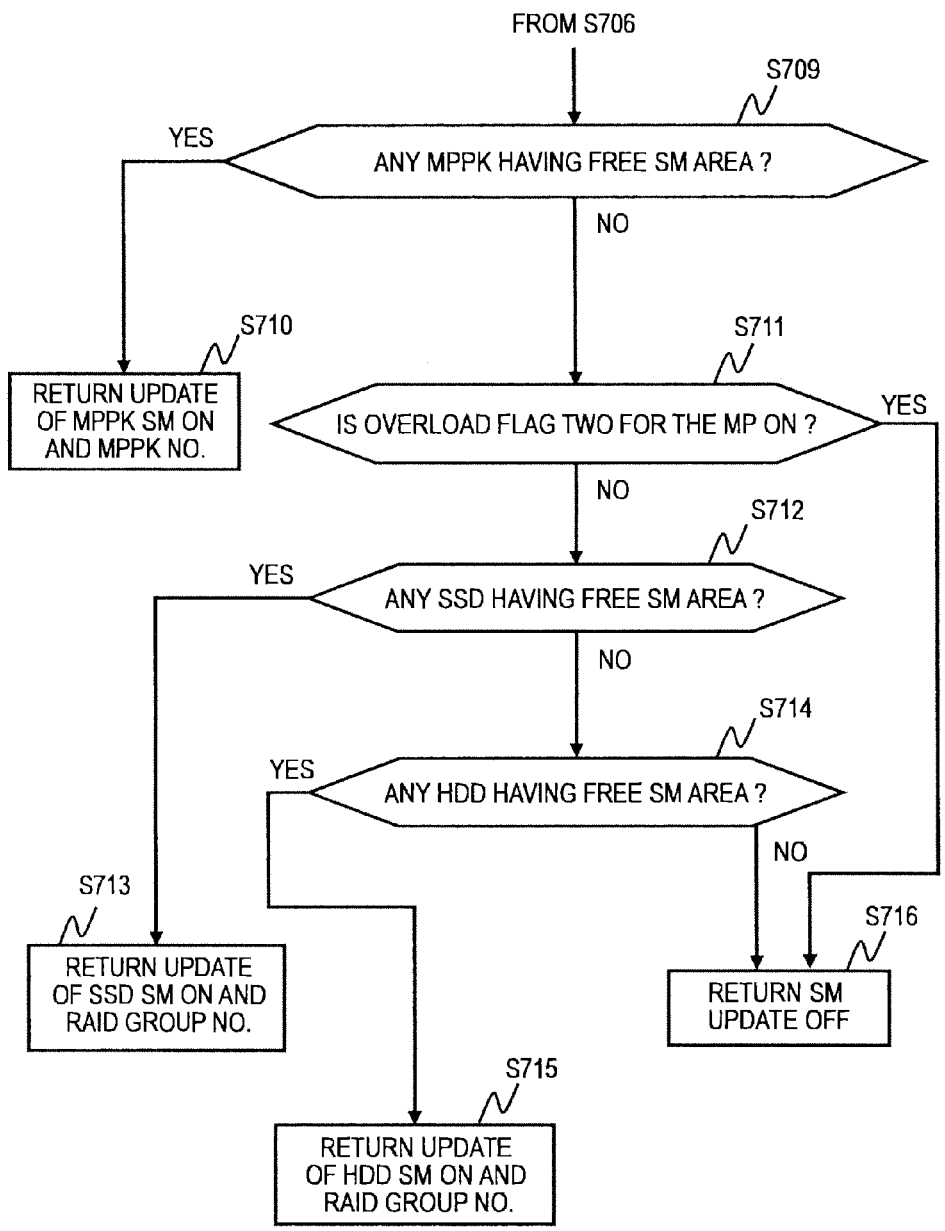
FIG. 60B is the other part of a flowchart of determining whether to update SM control information on data caching in the sixth embodiment.

At step S709 in FIG. 60B, the microprocessor 121 refers to the SM area management table 400 to determine whether any MPPK 120 has a required amount of free shared memory area. If any MPPK 120 has a required amount of free shared memory area (YES at S709), the microprocessor 121 locates the number of the MPPK 120, stores caching control information in the shared memory 124 in the MPPK 120, and determines to update the information (S710). The MPPK 120 is an MPPK which is different from the MPPK 120 with the microprocessor 121 mounted.

If no MPPK 120 has a required amount of free capacity (NO at S709), the microprocessor 121 determines whether its own overload flag TWO is 1 (ON) (S711). If the overload flag TWO is ON (YES at S711), the microprocessor 121 determines not to update the control information in the shared memory area (S716).

If the overload flag TWO is OFF (NO at S711), the microprocessor 121 refers to the SM area management table 400 to determine whether any SSD RAID group has a required amount of free shared memory area (S712).

If any SSD RAID group has a required amount of free shared memory area (YES at S712), the microprocessor 121 locates the number of the SSD RAID group, stores the cache control information in the shared memory area of the SSD RAID group, and determines to update the information (S713).

If no SSD RAID group has a required amount of free shared memory area (NO at S712), the microprocessor 121 refers to the SM area management table 400 to determine whether any HDD RAID group has a required amount of free shared memory area (S714). If no HDD RAID group has a required amount of free shared memory area (NO at S714), the microprocessor 121 determines not to update the control information in the shared memory 132 (S716).

If any HDD RAID group has a required amount of free shared memory area (YES at S714), the microprocessor 121 locates the number of the HDD RAID group, stores cache control information in the shared memory area of the HDD RAID group, and determines to update the information (S715).

If the microprocessor 121 determines to store control information in any of the shared memories other than the shared memory 132 and to update the control information, it copies the data caching control information in the local memory 122 to the selected shared memory.

As described, relocating the control information from the current area of the shared memory 132 to another shared memory area allows update of control information in the shared memory to be synchronized with update in the local memory, resulting in increase in cache hit rate at an occurrence of a failure. The above-described flow determines the availability of free shared memory areas in order from the device type with the highest access capability sequentially. Such determination allows control information to be stored in a shared memory with higher access capability and inhibit degradation in system performance.

The shared memory area management in this embodiment is applicable to the management of storage and update of the control information described in the foregoing embodiments other than the data caching control information. At a failure in an MPPK, a different MPPK 120 refers to the shared memory area management table 400 to search corresponding control information in the distributed shared memory areas.

Figure 61:
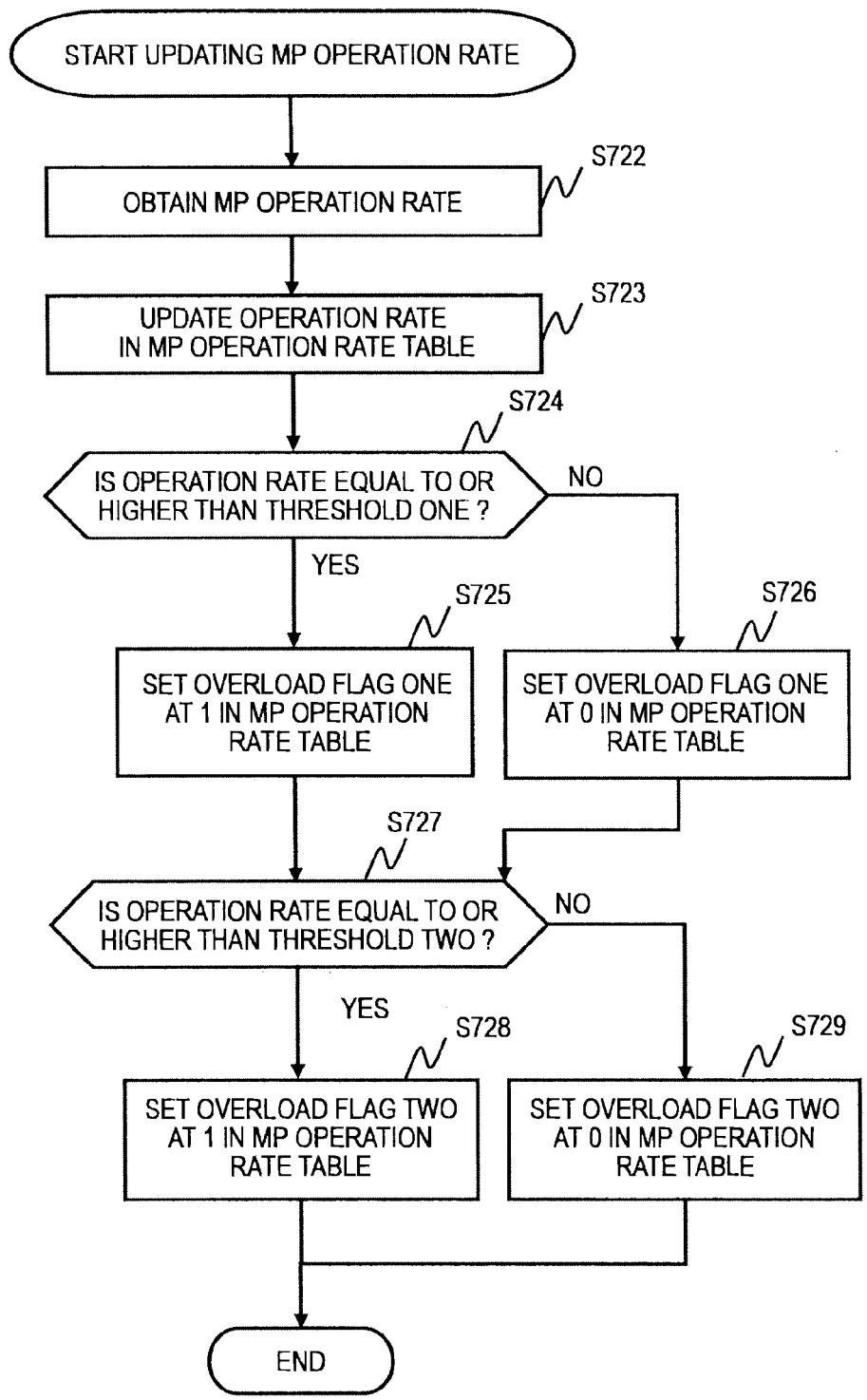
FIG. 61 is a flowchart of updating MP operation rates in the sixth embodiment.

With reference to the flowchart of FIG. 61, updating the MP operation rate will be described. This flow is invoked in a cycle of one second, for example. The microprocessor 121 obtains its own MP operation time (S722) and updates the value of the operation rate in the MP operation rate table 380 (S723). The steps S722 and S723 are the same as steps S232 and S233 in FIG. 24.

Next, at step S724, the microprocessor 121 determines whether the updated operation rate is equal to or higher than the MP operation rate threshold ONE. If the operation rate is equal to or higher than the MP operation rate threshold ONE (YES at S724), the microprocessor 121 sets the overload flag ONE at 1 (ON) in the MP operation rate table 380 (S725). If the operation rate is lower than the MP operation rate threshold ONE (NO at S724), the microprocessor 121 sets the overload flag ONE at 0 (OFF) in the MP operation rate table 380 (S726).

Next, at step S727, the microprocessor 121 determines whether the updated operation rate is equal to or higher than the MP operation rate threshold TWO. If the operation rate is equal to or higher than the MP operation rate threshold TWO (YES at S727), the microprocessor 121 sets the overload flag TWO at 1 (ON) in the MP operation rate table 380 (S728). If the operation rate is lower than the MP operation rate threshold TWO (NO at S727), the microprocessor 121 sets the overload flag TWO at 0 (OFF) in the MP operation rate table 380 (S729).

Seventh Embodiment

A storage system in this embodiment determines whether to turn ON or OP a low hit-rate flag depending on the improvement in access performance because of caching host data. The low hit-rate flag has been explained in the first embodiment. The access performance is expressed by, for example, response time or throughput. The configuration in the following explanation uses the response time.

If use of data caching significantly improves the response time, the low hit-rate flag (refer to the first embodiment) is set at OFF; if the use of data caching improves the response time a little, the low hit-rate flag is set at ON. This selection can improve average response time.

Figure 62:
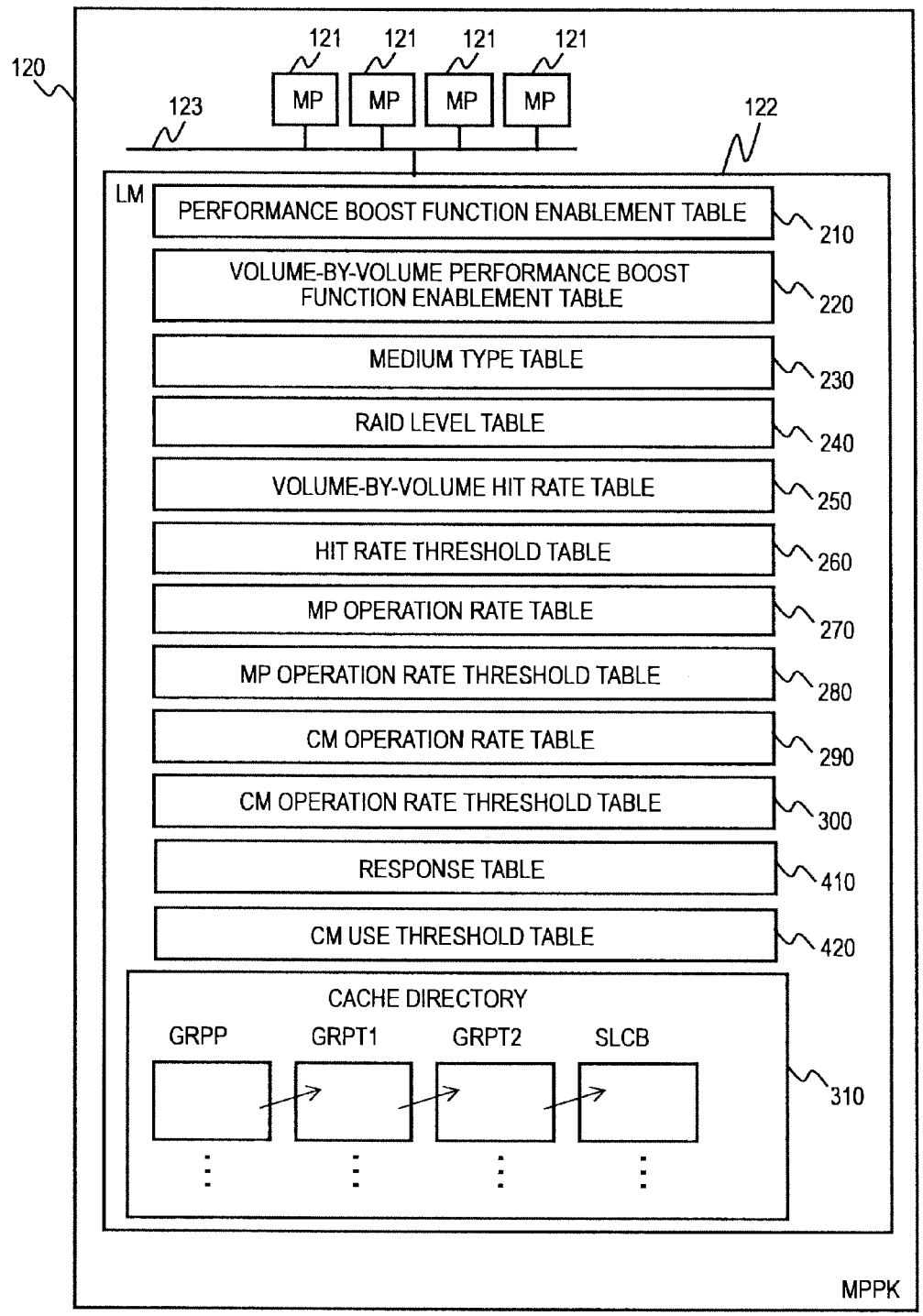
FIG. 62 is a drawing illustrating information held in a local memory in the seventh embodiment.

Hereinafter, this embodiment will be specifically explained. The differences from the foregoing other embodiments will be mainly described. FIG. 62 illustrates control information held in a local memory 122 in this embodiment. A response table 410 and a CM use threshold table 420 are held in the local memory 122. FIG. 63 shows an example of the response table 410 and FIG. 64 shows an example of the CM use threshold table 420.

The response table 410 is a table for managing the response times of media. In FIG. 63, the response table 410 includes columns of medium types 411 and response times 412. Although the response table 410 in this example manages response times depending on the medium type, the response times may be managed depending on RAID group or logical volume.

In this example, a response time is the time required to retrieve data from a medium. The column of response times 412 holds preset values. Alternatively, a microprocessor 121 may update the values in the column of response times 412. The microprocessor 121 measures response times while retrieving data, and stores, for example, the averages of the measured values in the column of response times 412.

In FIG. 64, the CM use threshold table 420 holds a threshold for values indicating response improvement in the column of response improvement 421. The threshold is predetermined. For example, a value determined by the administrator is held in a non-volatile storage area in the storage system.

As described later, the microprocessor 121 calculates a value indicating the response improvement using the difference between the response time of a medium and the response time of a CMPK 130 (cache memory 131). If the value is greater than the threshold, the response improvement is suitable for data caching.

Figure 65:
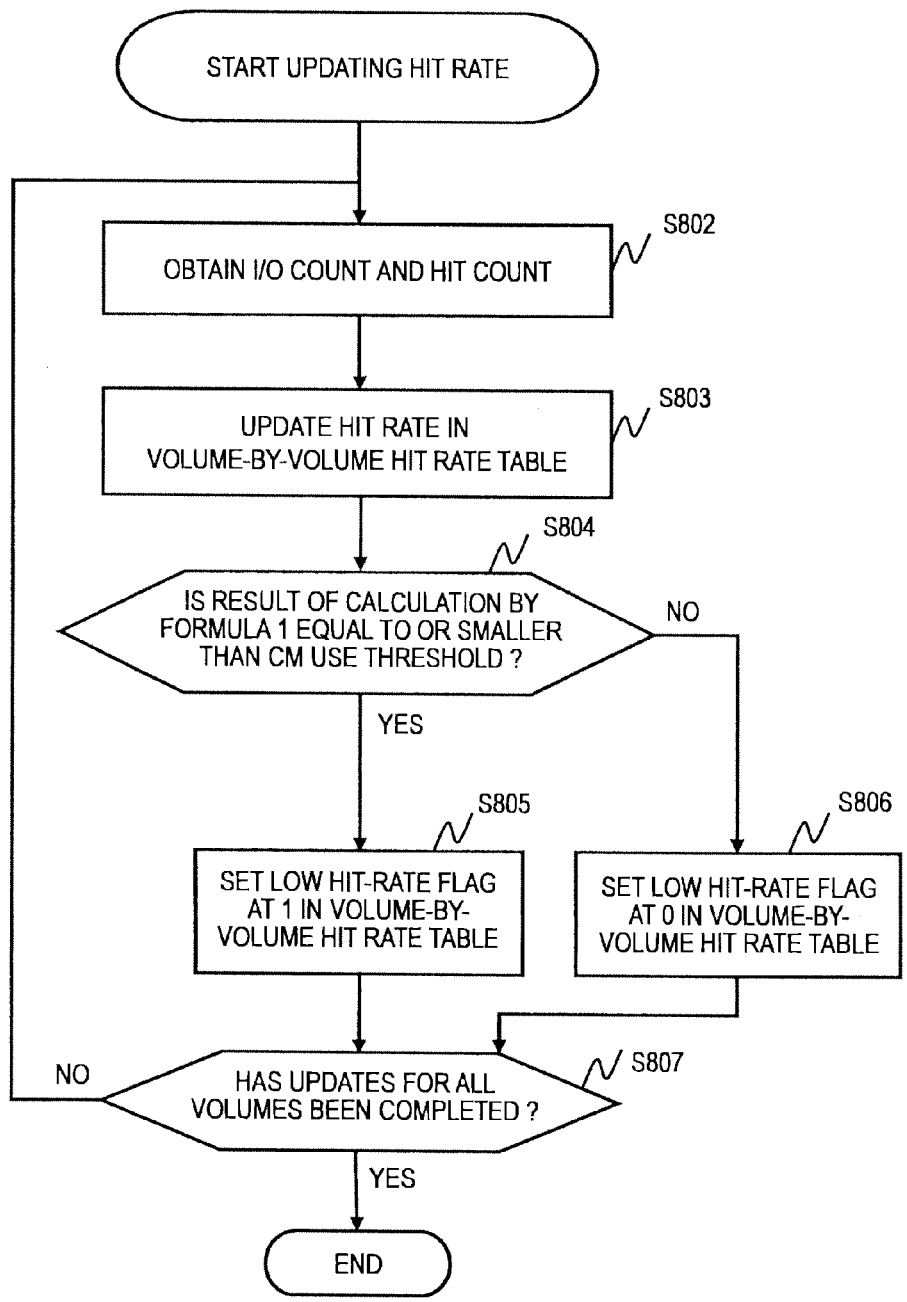
FIG. 65 is a flowchart of updating hit rates in the seventh embodiment.

Now with reference to the flowchart of FIG. 65, updating hit rates including updating low hit-rate flags depending on the response improvement in this embodiment will be described. An MPPK 120 executes this processing on a periodic basis, for example, every one second. The steps S802, S803, S805 to S807 in the flowchart of FIG. 65 are the same as steps S222, S223, and S225 to S227 in the flowchart of FIG. 23.

At step S804, the microprocessor 121 calculates the value indicating the response improvement using the following formula 1:

$$\text{Hit rate} * (\text{response time of the medium} - \text{CMPK response time})/100$$

The microprocessor 121 can identify the type of the medium by referring to the medium type table 230 with the RAID group of the volume. The value of the response time is held in the response table 410 as described above. The microprocessor 121 compares the calculated value with the CM use threshold in the CM use threshold table 420.

If the calculated value is equal to or smaller than the CM use threshold (YES at S804), the microprocessor 121 sets the low hit-rate flag for the volume at 1 (ON) (S805). If the calculated value is greater than the CM use threshold (NO at S804), the microprocessor 121 sets the low hit-rate flag for the volume at 0 (OFF) (S806).

As set forth above, preferred embodiments of this invention have been described, but this invention is not limited to the above-described embodiments. Those skilled in the art can easily modify, add, or convert each constituent in the above embodiments within the scope of this invention. A part of the configuration of one embodiment may be replaced with the one of another embodiment and the configuration of one embodiment may be added to another embodiment. A part of the configuration of each embodiment may be added, deleted, or replaced by a different configuration.

The above-described configurations, functions, processors, and means for processing, for all or a part of them, may be implemented by hardware: for example, by designing integrated circuits. The information of programs, tables, and files to implement the functions may be stored in a storage device such as a non-volatile semiconductor memory, a hard disk drive, or an SSD, or a computer-readable non-transitory data storage medium such as an IC card, an SD card, or a DVD.

In the above-described embodiments, control information is expressed by a plurality of tables, but the control information used by this invention does not depend on data structure. The control information can be expressed by data structures such as a database, a list, and a queue, in addition to a table. In the above-described embodiments, expressions such as identifier, name, and ID can be replaced with one another.

A CPU, a microprocessor, or a group of a plurality of microprocessors, which are processors, operates in accordance with a program to execute predetermined processing. Accordingly, the explanations in the embodiments having the subjects of "processor" may be replaced with those having the subjects of "program". The processing executed by a processor is processing performed by the apparatus or the system in which the processor is installed.

The invention claimed is:

1. A storage system comprising:
   a plurality of volumes, each of the volumes is configured on a plurality of flash drives, each of the flash drives including a plurality of flash memory chips and a memory controller controlling reading/writing data to the plurality of flash memory chips;
   a cache memory configured to temporarily store data of the volumes;
   a plurality of processor packages, each of the processor packages including a processor configured to be in charge of processing access request to one of the volumes and including a local memory configured to store caching control information indicating whether data of the one of the volumes is stored in the cache memory or not; and
   a shared memory accessible from the processors, the shared memory storing the caching control information which is backup information of the caching control information stored in the local memory of each of the processor packages,
   wherein:
   in response to receiving a read request from a computer to a first volume, a first processor, which is in charge of the first volume, in a first processor package of the processor packages, is configured to update the caching control information in a first local memory in the first processor package, the first processor is configured to determine whether to reflect the update of the caching control information in the first local memory to the shared memory and whether to store read target data of the read request into the cache memory, and when the read target data is stored in one of the flash drives for providing the first volume, the first processor is configured to determine to transfer the read target data retrieved from the one of the flash drives to the computer without storing the read target data into the cache memory and without reflecting the update of the caching control information to the shared memory.

2. The storage system according to claim 1, further comprising:

a plurality of types of non-volatile storage drives showing different access performance to provide a plurality of volumes; and wherein:

the first processor, which is in charge of a first volume of the volumes, is configured to determine whether to reflect the update of the caching control information in the first local memory to the shared memory, based on the type of the non-volatile storage drives for providing the first volume.

3. The storage system according to claim 2, wherein the first processor is configured to determine whether to reflect the update of the caching control information in the first local memory to the shared memory, based on at least one of a load to the first processor, a load of the cache memory, and a cache hit rate on the first volume.

4. The storage system according to claim 3, further comprising a storage module connected with the first processor package via a path including a switch, wherein:

the shared memory is installed in the storage module; and the first processor is configured to determine whether to reflect update of the control information in the first local memory to the control information in the shared memory based on a load to the path.

5. The storage system according to claim 1, wherein:

the caching control information in the shared memory includes a numerical value to be counted;

the caching control information in the first local memory includes a difference value indicating a variation in the numerical value after a previous update of the numerical value; and the first processor is configured to update the numerical value included in the caching control information in the shared memory based on the caching control information in the first local memory when the difference value reaches a predetermined number.

6. The storage system according to claim 1, further comprising one or more non-volatile storage drive for providing a volume, wherein:

the caching control information in the first local memory and the caching control information in the shared memory each includes information on the number of accesses to a storage area in the volume;

the first processor is configured to update the information on the number of accesses in the first local memory in response to an access to the storage area in the volume; and the first processor is configured to reflect the update of the information on the number of accesses in the first local memory to the information on the number of accesses in the shared memory when the number of times of the update of the information on the number of accesses in the first local memory reaches a predetermined value.

7. The storage system according to claim 1, further comprising:

a primary volume;

a secondary volume to be a copy pair with the primary volume;

a journal volume for storing update data in the primary volume in order of updating before copying the update data in the primary volume to the secondary volume; and journal management information including sequence numbers indicating the order of update data in the journal volume, wherein:

a journal control information in the shared memory includes a value indicating a top sequence number in the journal management information;

the journal control information in the first local memory includes a value indicating a top sequence number in the journal management information and a value indicating a difference between the top sequence number indicated by the value in the first local memory and the top sequence number indicated by the value in the shared memory;

the first processor is configured to update the value indicating the top sequence number and the value indicating the difference in the first local memory in response to storing update data in the journal volume; and the first processor is configured to reflect the update of the value indicating the top sequence number in the first local memory to the value indicating the top sequence number in the shared memory when the value indicating the difference reaches a predetermined value.

8. The storage system according to claim 7, further comprising:

a second processor which takes over assignment of the first processor because of an occurrence of a failure, wherein the second processor is configured to obtain the value indicating the top sequence number in the shared memory, to search the journal management information for an area of a sequence number ahead of the top sequence number indicated by the obtained value, and to locate a top sequence number in the journal management information.

9. The storage system according to claim 1, further comprising:

a primary volume; and a secondary volume to be a copy pair with the primary volume, wherein:

a copy pair control information in the shared memory includes a plurality of difference flags each of which is associated with each of a plurality of area segments in the primary volume and indicates whether any difference exists between the primary volume and the secondary volume;

the copy pair control information in the first local memory includes a plurality of difference flags each of which is associated with each of the plurality of area segments in the primary volume and indicates whether any difference exists between the primary volume and the secondary volume;

the copy pair control information in the first local memory includes a plurality of reflection control flags each of which is associated with a plurality of difference flags, which are a part of the plurality of difference flags in the first local memory, and indicates whether to reflect update of the plurality of the part of the difference flags to the copy pair control information in the shared memory; and the first processor is configured to reflect update of difference flags for which the associated reflection control flag indicates reflection to the copy pair control information in the shared memory.

10. The storage system according to claim 9, wherein each of the plurality of the reflection control flags indicates not to reflect update of the plurality of associated difference flags to the copy pair control information in the shared memory in a case where a proportion of difference flags indicating existence of difference out of the plurality of associated difference flags reaches a predetermined value.

11. The storage system according to claim 9, further comprising:

a second processor which takes over assignment of the first processor because of an occurrence of a failure, wherein the second processor is configured to refer to the plurality of reflection control flags in the shared memory;

the second processor is configured to locate a reflection control flag indicating not to reflect update to the copy pair control information in the shared memory out of the plurality of reflection control flags referred to; and the second processor is configured to copy all data in the area in the primary volume associated with the located reflection control flag to the secondary volume.

12. The storage system according to claim 1, wherein:

the first processor is configured to determine to change an area for storing at least a part of information of the caching control information in the shared memory from the shared memory to a storage area of a different type of device; and the first processor is configured to update the at least part of information in the storage area of the different type of device in synchronization with update in the first local memory.

13. The storage system according to claim 12, wherein the at least part of information includes the caching control information on a first volume assigned to the first processor;

conditions to determine not to reflect update of the caching control information on the first volume in the first local memory to the shared memory include that a load to the first processor is equal to or higher than a first threshold;

the storage area in the different type of device is a storage area in a non-volatile storage drives to provide volumes in the storage system; and conditions to determine to change the storage area of the at least part of information to the second shared memory include that a load to the first processor is lower than a second threshold which is lower than the first threshold.

14. The storage system according to claim 1, wherein the first processor is configured to determine whether to reflect the update of the caching control information in the first local memory to the shared memory based on improvement in access performance by data caching of the first volume.

15. A storage system comprising:

a plurality of volumes, each of the volumes is configured on a plurality of flash drives, each of the flash drives including a plurality of flash memory chips and a memory controller controlling reading/writing data to the plurality of flash memory chips;

a cache memory configured to temporarily store data of the volumes;

a plurality of processor packages, each of the processor packages including a processor configured to be in charge of processing access request to one of the volumes and including a local memory configured to store caching control information indicating whether data of the one of the volumes is stored in the cache memory or not; and a shared memory accessible from the processors, the shared memory storing the caching control information which is a backup information of the caching control information stored in the local memory of each of the processor packages, wherein:

in response to receiving a read request from a computer to a first volume, a first processor, which is in charge of the first volume, in a first processor package of the processor packages, is configured to update the caching control information in a first local memory in the first processor package, the first processor is configured to determine whether read target data of the read request is stored in one of the flash drives for providing the first volume, and when the read target data is stored in the one of the flash drives, the first processor is configured to transfer the read target data retrieved from the one of the flash drives to the computer without storing the read target data into the cache memory and without reflecting the update of the caching control information to the shared memory.

* * * * *